United States Patent
Zorzetto

(10) Patent No.: US 10,935,411 B2
(45) Date of Patent: Mar. 2, 2021

(54) DEVICE FOR DETECTING THE LEVEL OF A MEDIUM

(71) Applicant: ELTEK S.p.A., Casale Monferrato (IT)

(72) Inventor: Mauro Zorzetto, Casale Monferrato (IT)

(73) Assignee: ELTEK S.p.A., Casale Monferrato (IT)

(*) Notice: Subject to any disclaimer, the term of this patent is extended or adjusted under 35 U.S.C. 154(b) by 212 days.

(21) Appl. No.: 16/094,073

(22) PCT Filed: Apr. 12, 2017

(86) PCT No.: PCT/IB2017/052110
§ 371 (c)(1),
(2) Date: Oct. 16, 2018

(87) PCT Pub. No.: WO2017/182917
PCT Pub. Date: Oct. 26, 2017

(65) Prior Publication Data
US 2019/0128726 A1 May 2, 2019

(30) Foreign Application Priority Data
Apr. 18, 2016 (IT) .......................... 102016000039400

(51) Int. Cl.
*G01F 23/68* (2006.01)
*G01F 23/26* (2006.01)

(52) U.S. Cl.
CPC .......... *G01F 23/268* (2013.01); *G01F 23/265* (2013.01)

(58) Field of Classification Search
CPC .............................................. G01F 23/26–268
See application file for complete search history.

(56) References Cited

U.S. PATENT DOCUMENTS 6,164,132 A * 12/2000 Matulek ................ G01F 23/265
73/304 C
2003/0020494 A1    1/2003 Desmier et al.

FOREIGN PATENT DOCUMENTS

DE    195 04 608    8/1996
DE    299 18 237    3/2000
(Continued)

OTHER PUBLICATIONS

International Search Report and Written Opinion of the ISA for PCT/IB2017/052110, dated Aug. 2, 2017, 14 pages.

*Primary Examiner* — Justin N Olamit
(74) *Attorney, Agent, or Firm* — Nixon & Vanderhye P.C.

(57) ABSTRACT

A capacitive level-sensor device comprises: —a circuit substrate made of electrically insulating material (20) that extends longitudinally according to a level-sensing axis; —a first array of electrodes or capacitive elements on a sensing region (23) of the circuit substrate (20), which comprises at least one first series of first electrodes ($J_1$-$J_n$) coplanar to one another at a major face of the circuit substrate (20); —a circuit, which comprises circuit components associated to a second region (24) of the circuit substrate (20); and—a casing body (14-16), which comprises at least: a sensing portion (15), which is electrically insulating and fluid-tight and coats at least the sensing region (23) of the circuit substrate (20); and a mounting portion (14, 16), which coats at least partially the second region (24) of the circuit substrate (20) and is configured for fluid-tight fixing at an opening (6) of a container (1). The sensing portion (15) and at least part of the mounting portion (14, 16) comprise at least one material (M) overmoulded on at least part of the circuit substrate (20). The second region (24) of the circuit substrate (20) includes at least one restricted substrate portion (30), having a substrate width (Wr) smaller than the substrate width (W) of the sensing region (23). At least part (Continued)

of the at least one restricted substrate portion (30) extends axially in the mounting portion (16).

18 Claims, 32 Drawing Sheets

(56) References Cited

FOREIGN PATENT DOCUMENTS

DE      10 2011 05423      4/2013
WO      2015/181770      12/2015

\* cited by examiner

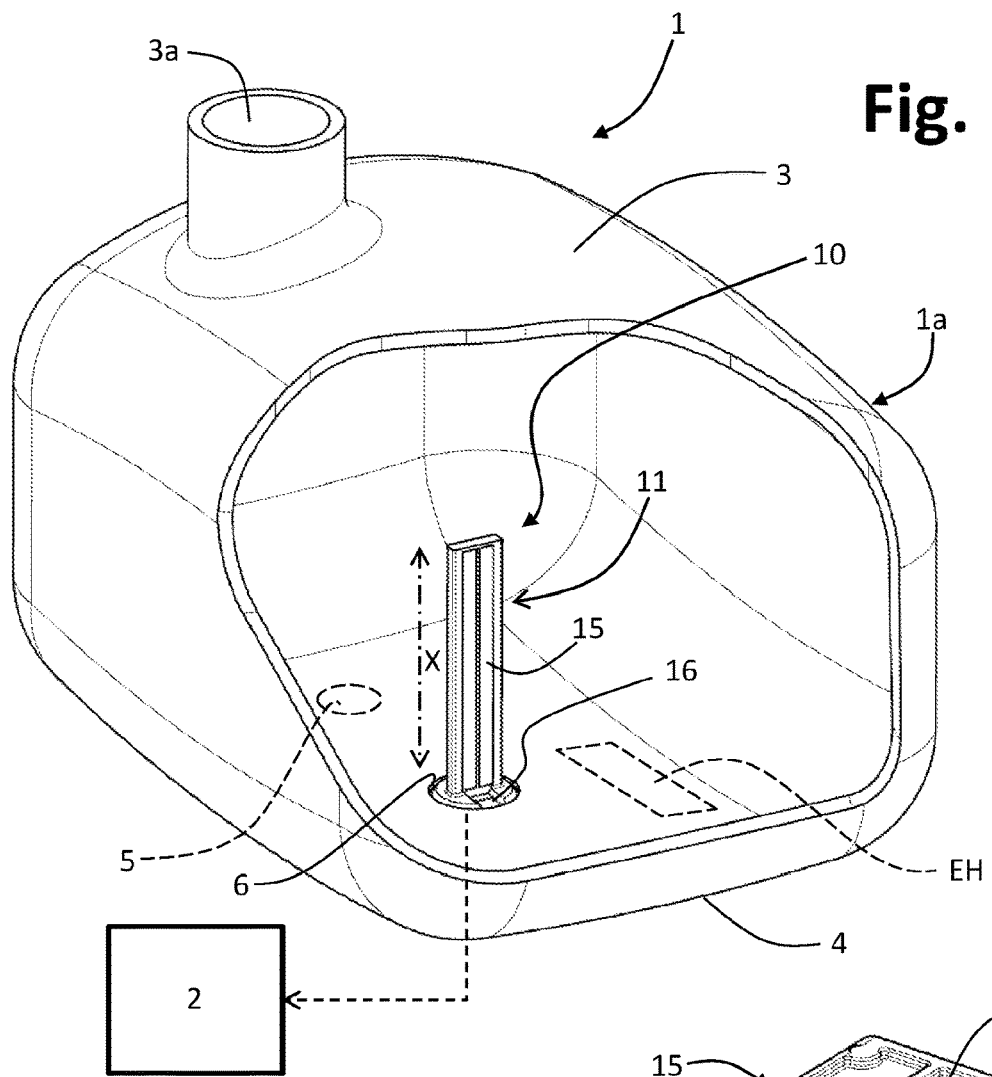
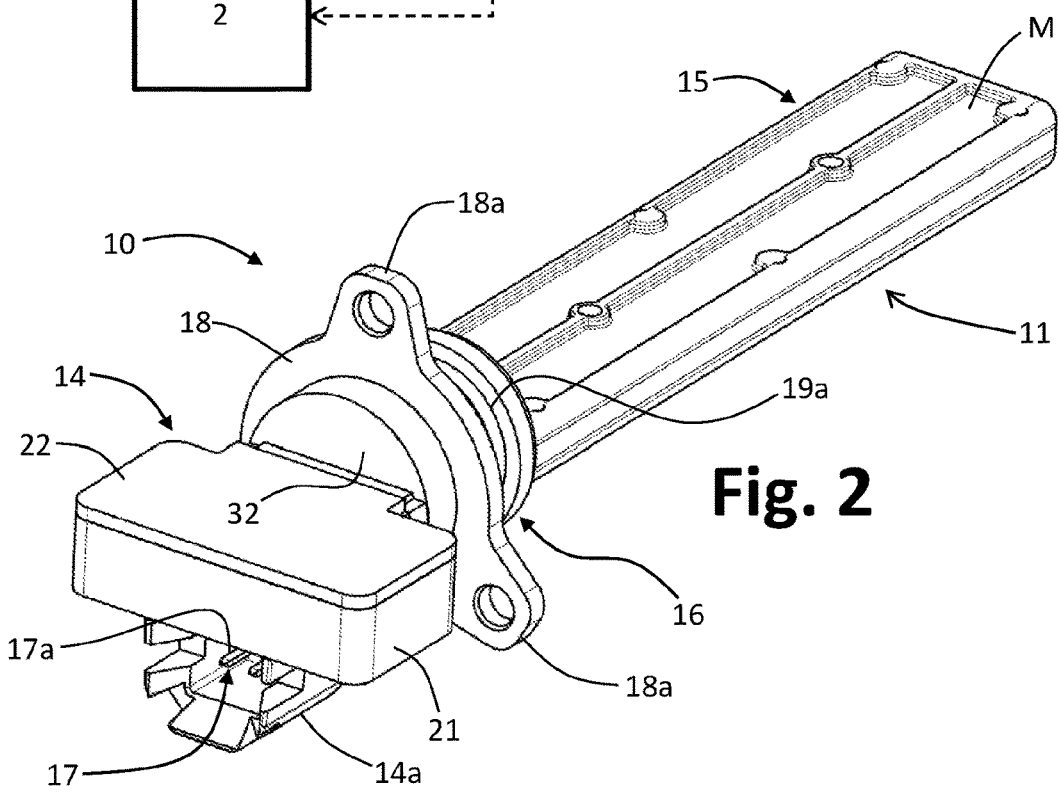

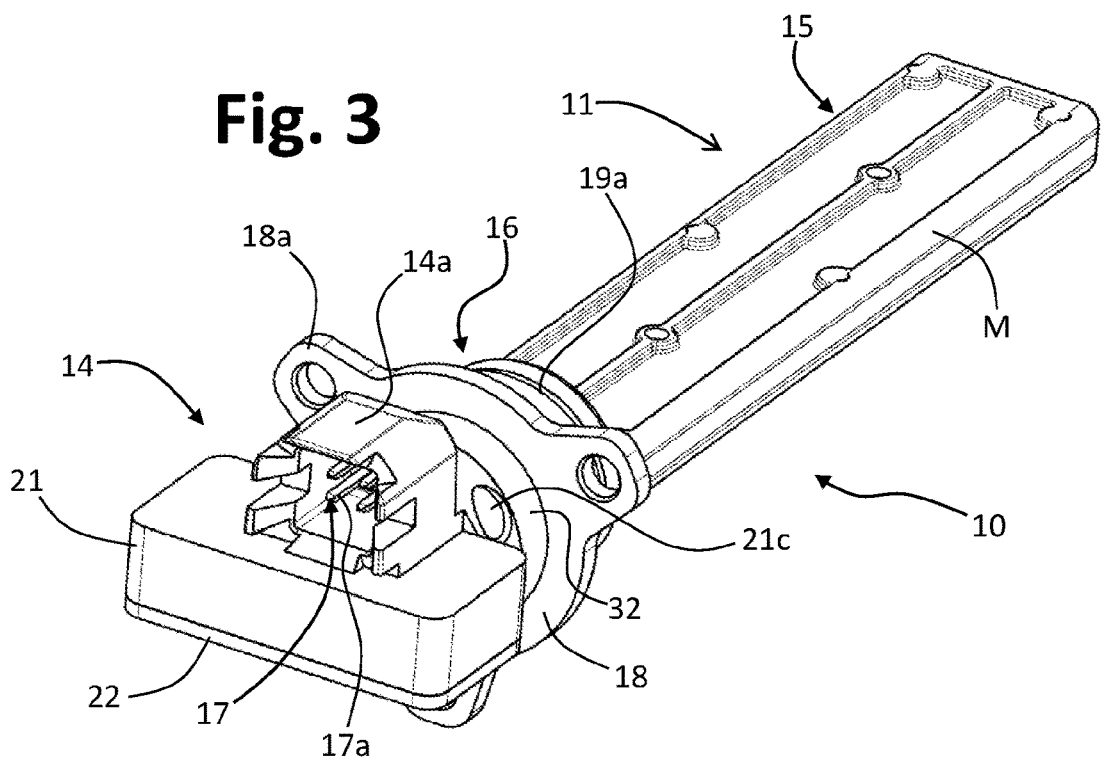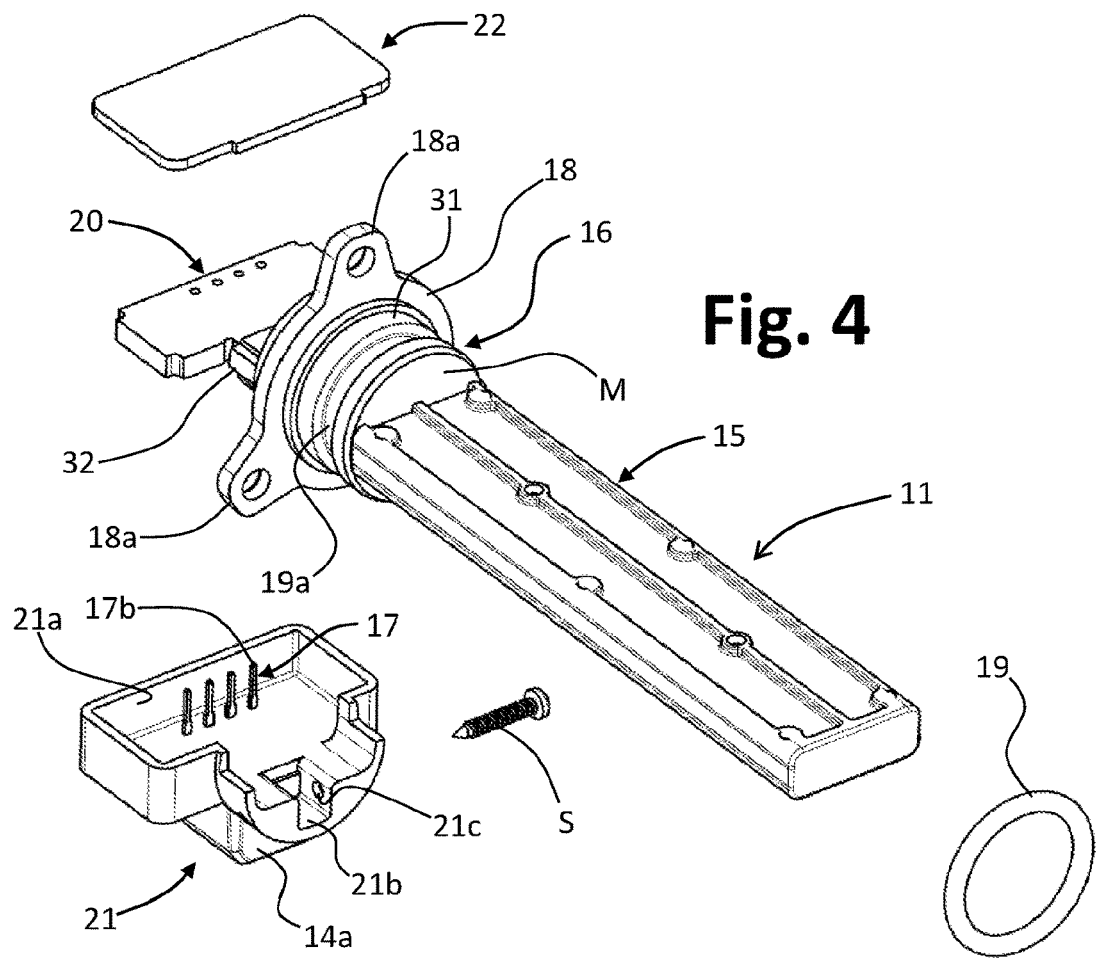

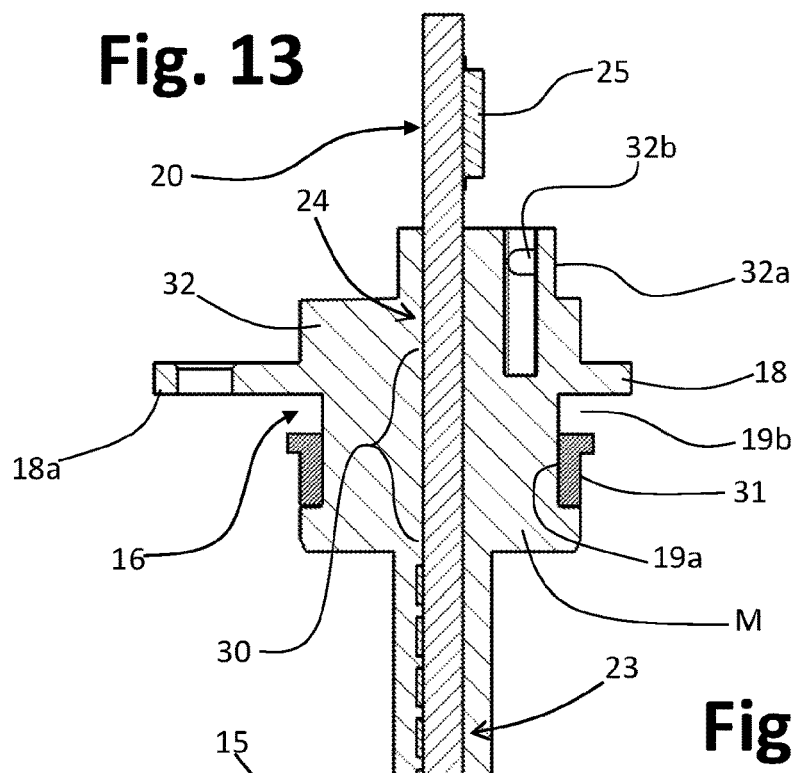
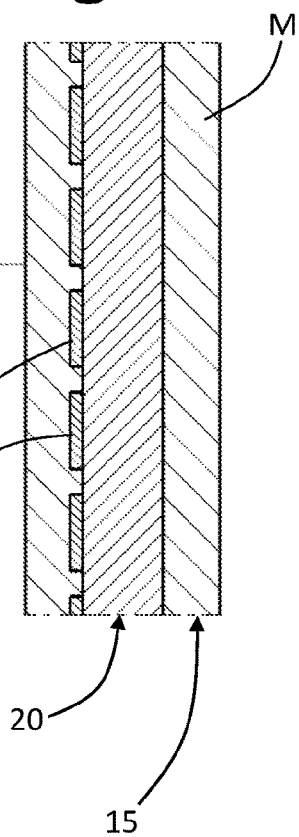
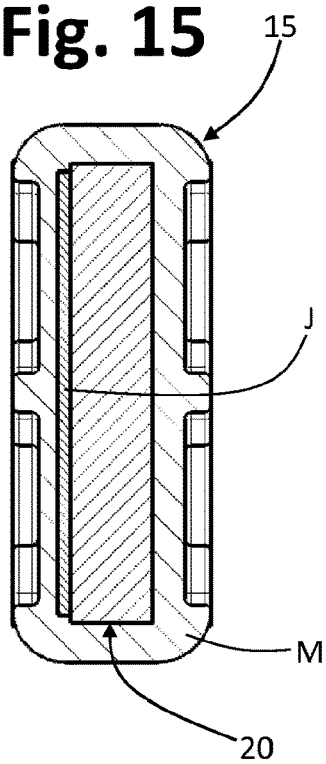

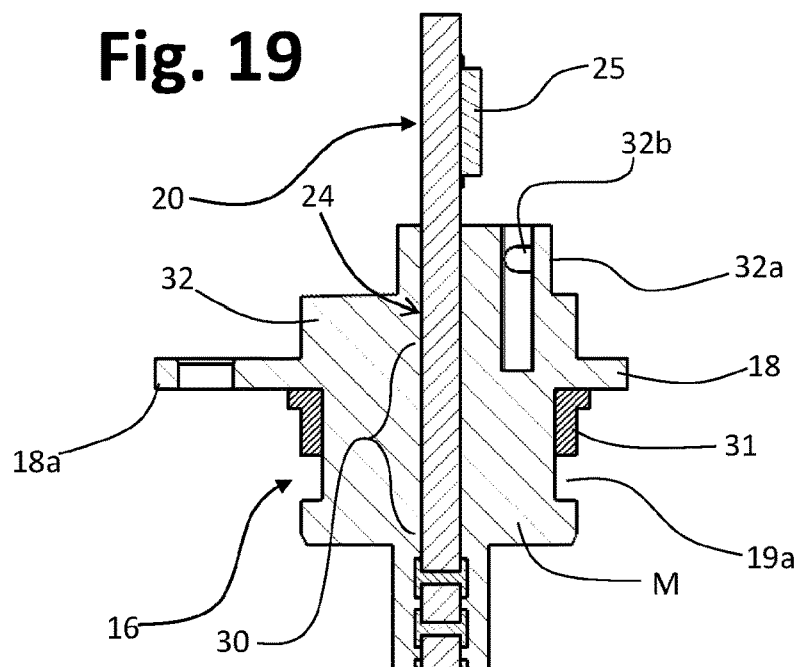
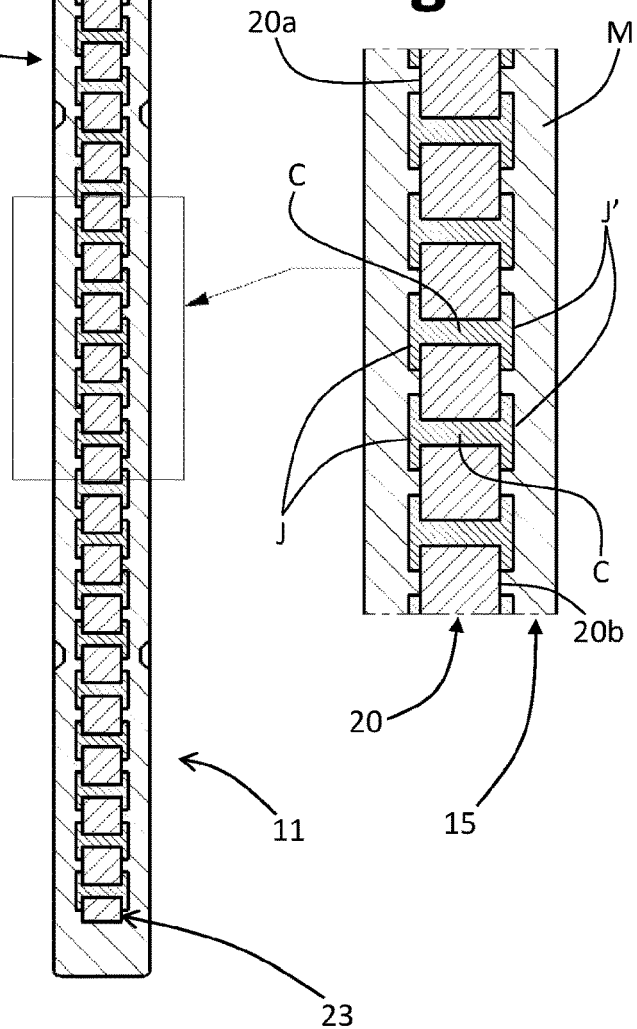

Fig. 23
Fig. 24
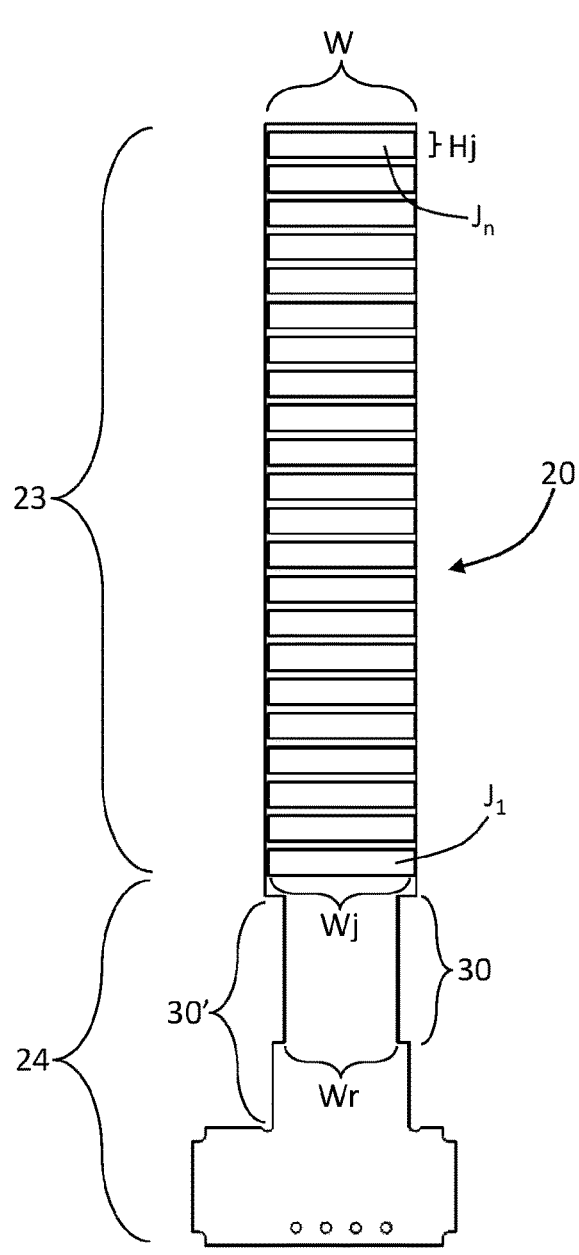
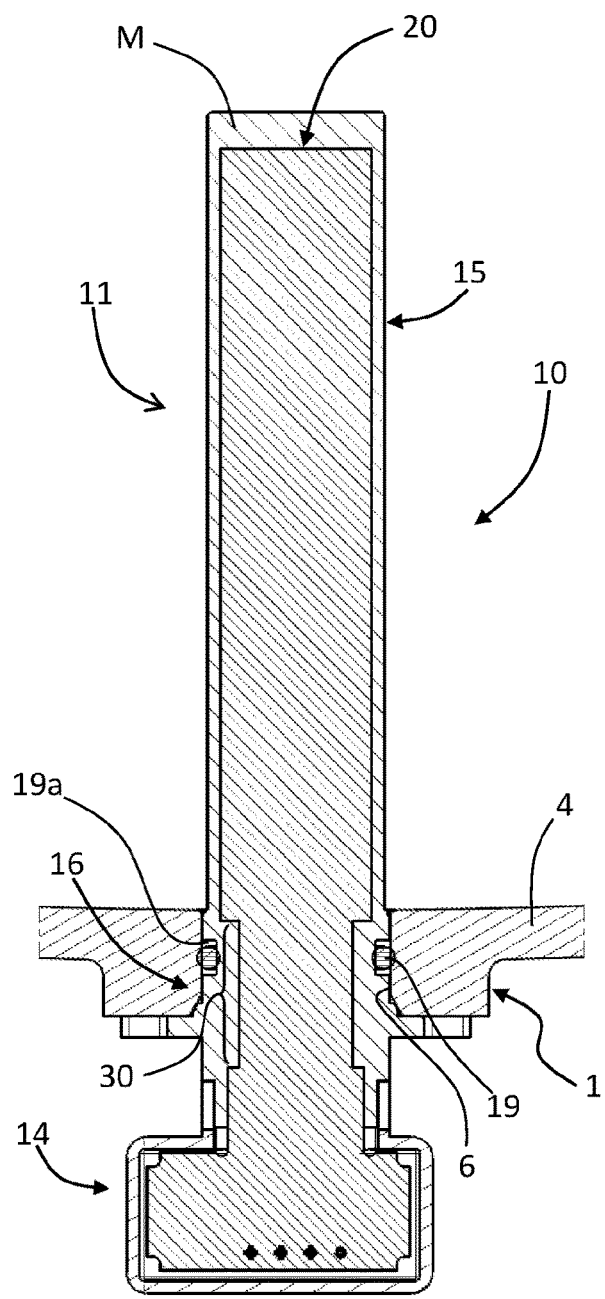

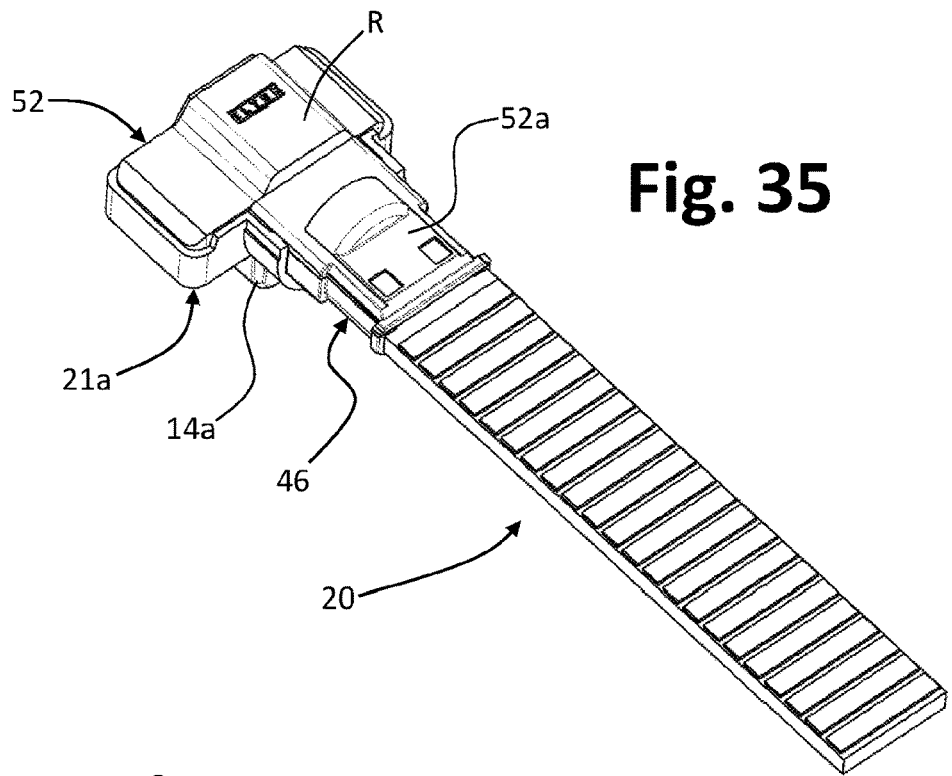
Fig. 35
Fig. 36
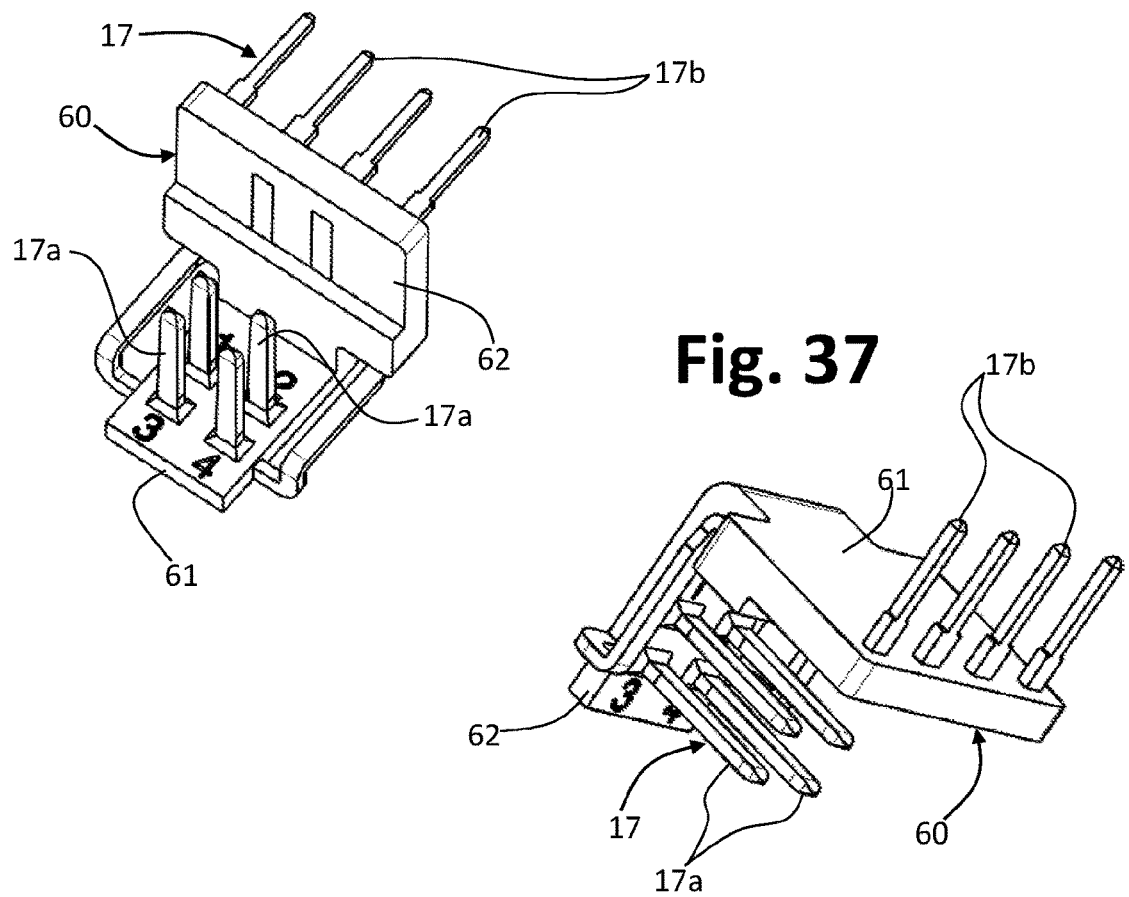
Fig. 37

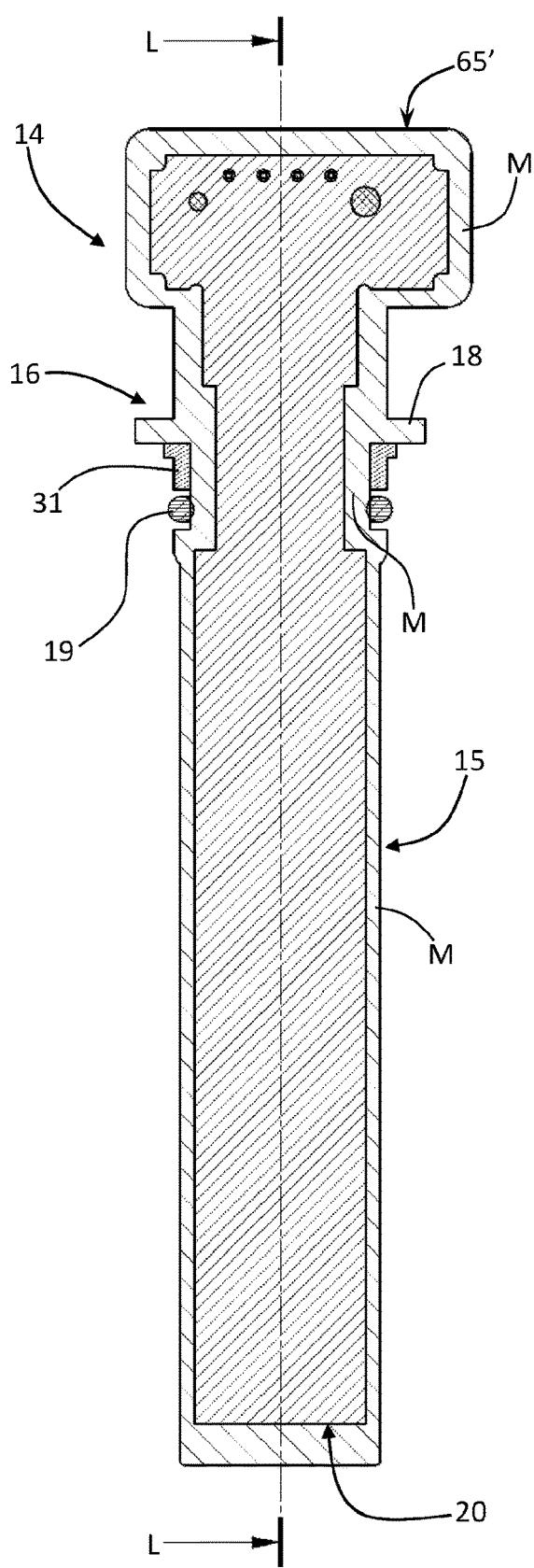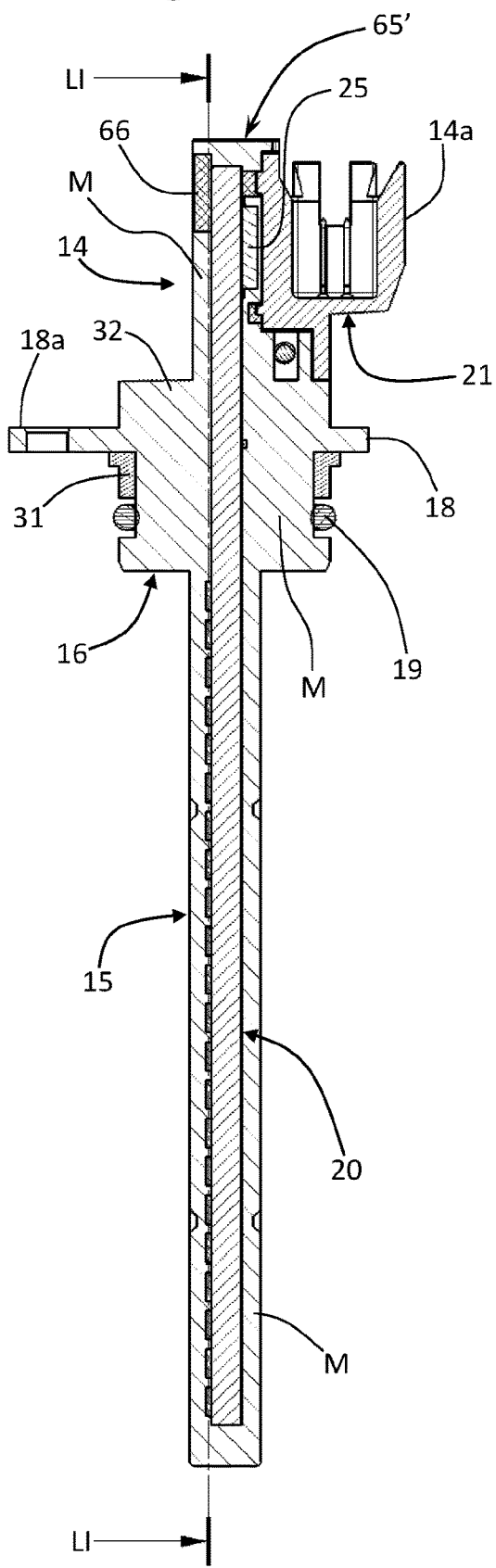

DEVICE FOR DETECTING THE LEVEL OF A MEDIUM

This application is the U.S. national phase of International Application No. PCT/IB2017/052110 filed 12 Apr. 2017 which designated the U.S. and claims priority to IT Patent Application No. 102016000039400 filed 18 Apr. 2016, the entire contents of each of which are hereby incorporated by reference.

FIELD OF THE INVENTION

The present invention relates to a sensor device for detecting the level of a generic medium, such as a liquid, a fluid substance, a powdery material or a material in the bulk state, etc. The invention has been developed with particular reference to level sensors used on vehicles, preferably level sensors of a capacitive type.

PRIOR ART

A level sensor of the type referred to above is known, for example, from WO 2015/181770 A, on which the preamble of claim 1 is based. This known sensor is, on average, precise and reliable. However, at least an improvement in its precision and sensitivity in level measurement would be desirable.

SUMMARY AND OBJECT OF THE INVENTION

In its general terms, the present invention has the aim to provide a level-sensor device that is simple and inexpensive to produce, but distinguished by an enhanced precision and sensitivity in level measurement as compared to known devices designed for similar applications.

The above and other aims still, which will emerge more clearly hereinafter, are achieved according to the invention, by a level-sensor device having the characteristics specified in the annexed claims. The claims constitute an integral part of the technical teaching provided herein in relation to the invention.

BRIEF DESCRIPTION OF THE DRAWINGS

Further purposes, characteristics, and advantages of the invention will emerge from the ensuing description, with reference to the annexed drawings, which are provided purely by way of non-limiting example and in which:

FIG. 1 is a sectioned perspective view of a generic container that comprises a level-sensor device according to possible embodiments of the invention;

FIGS. 2 and 3 are schematic perspective views, from different angles, of a level sensor according to possible embodiments of the invention;

FIGS. 4 and 5 are exploded perspective views, from different angles, of a level-sensor device according to possible embodiments of the invention;

FIGS. 13, 14, and 15 are a schematic longitudinal section of the part of device of FIG. 12, a corresponding detail, and a schematic cross section of the part of device of FIG. 12, respectively;

FIGS. 19 and 20 are views similar to those of FIGS. 13 and 14, respectively, regarding a part of a sensor device according to a further possible embodiment of the invention;

FIGS. 23 and 24 are schematic views similar to those of FIGS. 21 and 22, but regarding devices according to possible embodiments of the invention;

FIG. 35 is a schematic perspective view of a semi-finished product that can be obtained with the equipment of FIGS. 33-34;

FIGS. 36 and 37 are schematic perspective views, from different angles, of a component that can be used in a level-sensor device according to possible embodiments of the invention;

FIG. 49 is a schematic longitudinal section of a device according to FIGS. 47-48;

FIGS. 50 and 51 are schematic cross-sectional views according to the lines L-L and LI-LI of FIG. 49 and of FIG. 50, respectively;

DESCRIPTION OF PREFERRED EMBODIMENTS OF THE INVENTION

Figure 5:
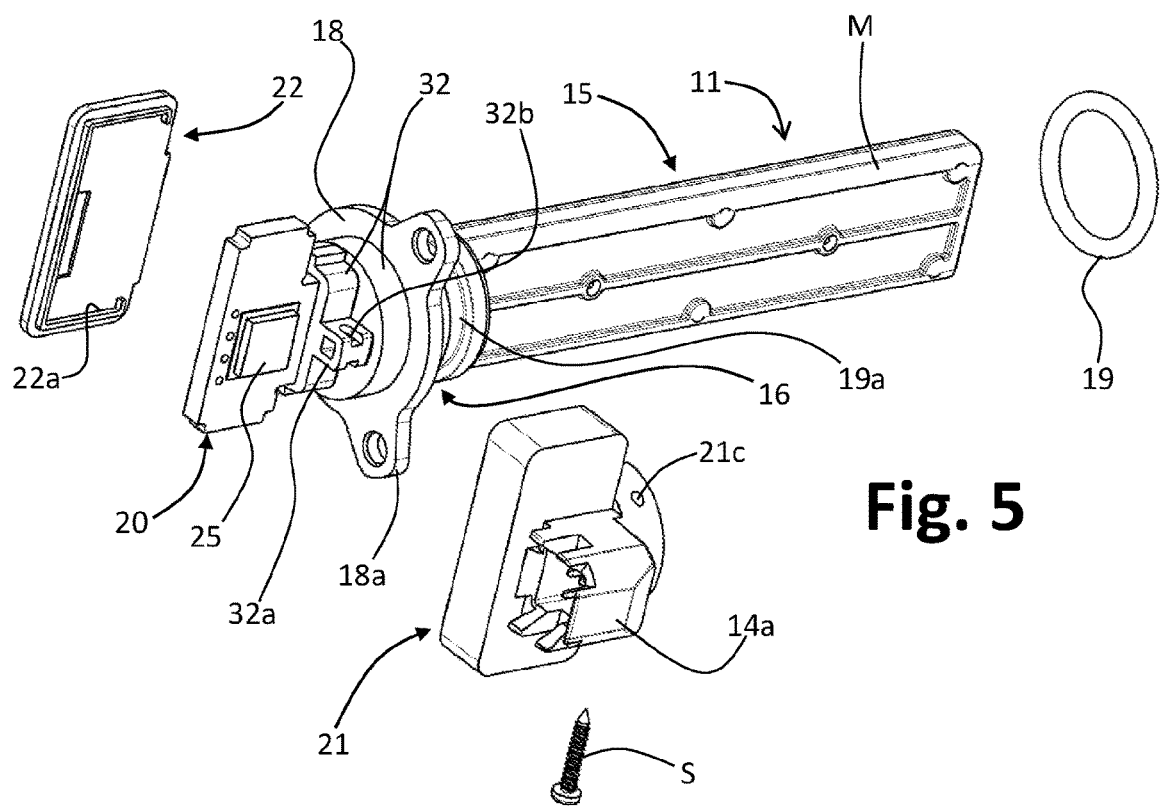

Reference to "an embodiment", "one embodiment", "various embodiments", and the like in the present description is intended to indicate that at least one particular configuration, structure, or characteristic described in relation to the embodiment is comprised in at least one embodiment. Hence, phrases such as "in an embodiment", "in one embodiment", "in various embodiments", and the like, that may be present in various points of the present description, do not necessarily refer to one and the same embodiment, but may, instead, refer to different embodiments. Moreover, particular conformations, structures, or characteristics defined in the context of the present description may be combined in any adequate way in one or more embodiments, that may even differ from the ones represented. The reference numbers and spatial references (such as "upper", "lower", "top", "bottom", "front", "back", "vertical", etc.) used herein, in particular with reference to the examples in the figures, are only provided for convenience and hence do not define the sphere of protection or the scope of the embodiments. In the figures, the same reference numbers are used to designate elements that are similar or technically equivalent to one another.

In FIG. 1, designated as a whole by 1 is a generic container, in particular a tank of a motor vehicle. In the sequel of the present description it is to be assumed that the container 1 (referred to for simplicity also as "tank") is preferably designed to contain a liquid additive, or a reducing agent, and form part of a system for treatment of exhaust gases of an internal-combustion engine, represented schematically by the block 2. In various embodiments, the treatment system 2 is of an SCR type, used for abatement of nitrogen-oxide emissions of an internal-combustion engine, for example a diesel engine of a motor vehicle. The aforesaid reducing agent is hence preferably a liquid solution, in particular urea in solution of distilled water, such as the one commercially known by the trade name AdBlue™. The container 1 could in any case be used for other purposes and/or in sectors different from the automotive sector, and be designed to contain a different liquid substance, for example a fuel.

The main body 1*a* of the tank 1 may be made of any material, in particular a material that is chemically resistant to the substance contained and, preferably, electrically insulating, for example a suitable plastic material according to known technique, such as a high-density polyethylene (HDPE). To the tank 1 there may possibly be associated a heater of a type in itself known, used for heating the tank itself and/or its contents, for example in the event of freezing. An electric heater is represented schematically in the figure by the block designated by EH. In various embodiments, one such heater EH is advantageously associated to or integrated in a sensor device according to the invention.

In the schematic example illustrated, the tank has an upper part 3, for example an upper wall thereof, at which an opening 3*a* is provided for topping up with the liquid solution. A lower part 4 of the tank 1, for example a bottom wall thereof, has an outlet opening 5, via which the solution exits or is drawn out, for example via a pump, for supplying the liquid to the system 2. Once again at the lower part 4, the tank 1 has a second opening, designated by 6, sealingly fixed at which is the body of a sensor device according to various possible embodiments of the invention. In various preferred embodiments, in fact, a sensor device according to the invention is to be installed in the lower part of a container, in such a way that an outer surface of its body will be at least partially in contact with the liquid substance, even when this has a minimal level.

The sensor device, designated as a whole by 10, includes a level-sensing part 11, designed to extend at least partially within the tank 1, in particular according to a level-sensing axis X, which is preferably substantially vertical (but, if need be, may be inclined with respect to the vertical). Preferably, a proximal end region of the sensing part 11 extends within the tank 1 to a height relatively close to the bottom wall 4, in order to be able to detect the presence of an even very low level in the tank. It should be noted that, instead of being directly mounted at the opening 6 of the tank 1, the device 10 according to the invention may provide, or be associated to, or be integrated in, a further body or component that is sealingly mounted at a different opening of the tank, for example a component of the type known in the sector as UDM (Urea-Delivery Module).

In FIGS. 2 and 3, a sensor 10 according to possible embodiments is represented in isolation, from different angles. The device 10 has a casing body in which there may be identified:
- a connection and/or control portion 14, for electrical connection of the device 10 to an external system, for example an electronic control unit of the SCR system on board the vehicle, and/or for its control;
- a sensing portion 15, which is electrically insulating and fluid-tight and belongs prevalently to the sensing part 11; and
- a mounting portion 16, which is configured for being sealingly coupled and/or fixed and/or positioned at the opening 6.

In various embodiments, the connection portion 14 includes a generally hollow connector body 14*a*, extending in which are respective portions 17*a* of electrical terminals 17. In various embodiments, the terminals 17, preferably obtained via stamping or blanking from a metal strap, provide with the connector body 14*a* an interface for external connection of the device 10, for example to the aforesaid electronic control unit of the SCR system. Preferably, each terminal 17 has a lamina-like contact portion 17a, designed for being positioned within the cavity of the connector body 14a, and a restricted interconnection portion 17b (see, for example, FIG. 4), designed for electrical and mechanical coupling with respective contact elements (24a, FIG. 8) present on a circuit board or substrate described hereinafter.

In various embodiments, the mounting portion 16 extends axially between the electrical-connection portion 14 and the sensing portion 15 and has a bottom wall, which is designed to be in contact with the liquid contained in the tank 1, the sensing part 11 projecting from this wall. In various embodiments, the portion 16 defines a flange part 18, preferably provided with radial formations 18a that can be used for anchorage of the body of the device 10 as a whole. In various preferred embodiments, the portion 16 has, at an outer peripheral surface thereof, at least one seat 19a for an annular sealing element, such as a gasket, which may possibly perform also functions of elastic mounting of the sensor 10 with respect to the tank.

In FIGS. 4 and 5, a sensor device according to possible embodiments of the invention is represented from different angles, via partially exploded views. In these figures, designated by 19 is the aforementioned sealing annular element or gasket, for example an O-ring, designed for being positioned in the corresponding seat 19a provided at the mounting portion 16.

Partially visible in FIGS. 4 and 5 is also an electronic circuit board or substrate, designated as a whole by 20, with a corresponding proximal end portion that projects from the mounting portion 16. In these figures, designated by 21 and 22 are two body parts or casing, which are configured as distinct parts and are to be coupled together with the aforesaid projecting portion of the circuit substrate 20 set in between so as to define at least partially the connection portion 14 of FIGS. 3-4. In this example, the body part 21 defines integrally the connector body 14a, and integrated therein are the electrical terminals 17. As may be appreciated in particular from FIG. 4, in various embodiments, the body part 21 defines a cavity 21a projecting within which is the second portion 17b of the terminals 17, designed for electrical connection with the circuit substrate 20.

According to an inventive aspect, the sensing portion 15 and at least one part of the mounting portion 16 of the body of the device 10 are made of at least one material M overmoulded on at least part of the circuit substrate 20.

Figure 6:
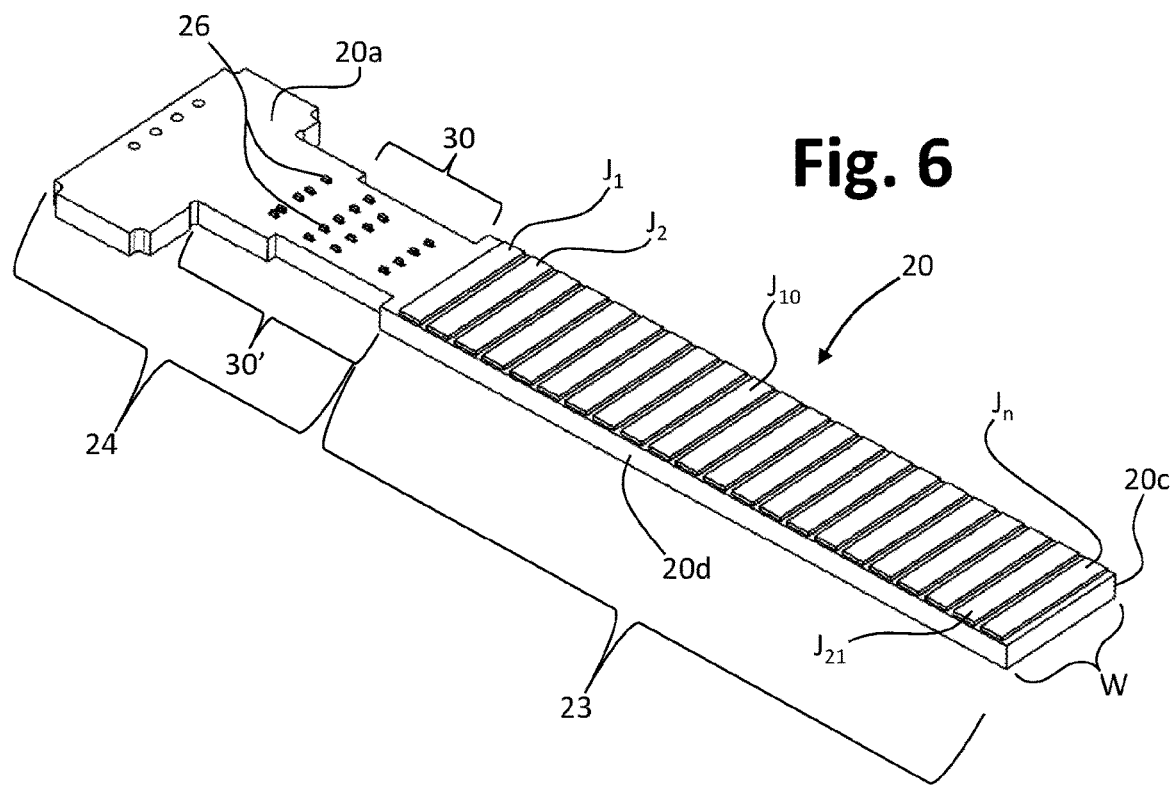
FIGS. 6 and 7 are perspective views, from different angles, of a circuit component that can be used in level-sensor devices according to possible embodiments of the invention.
Figure 7:
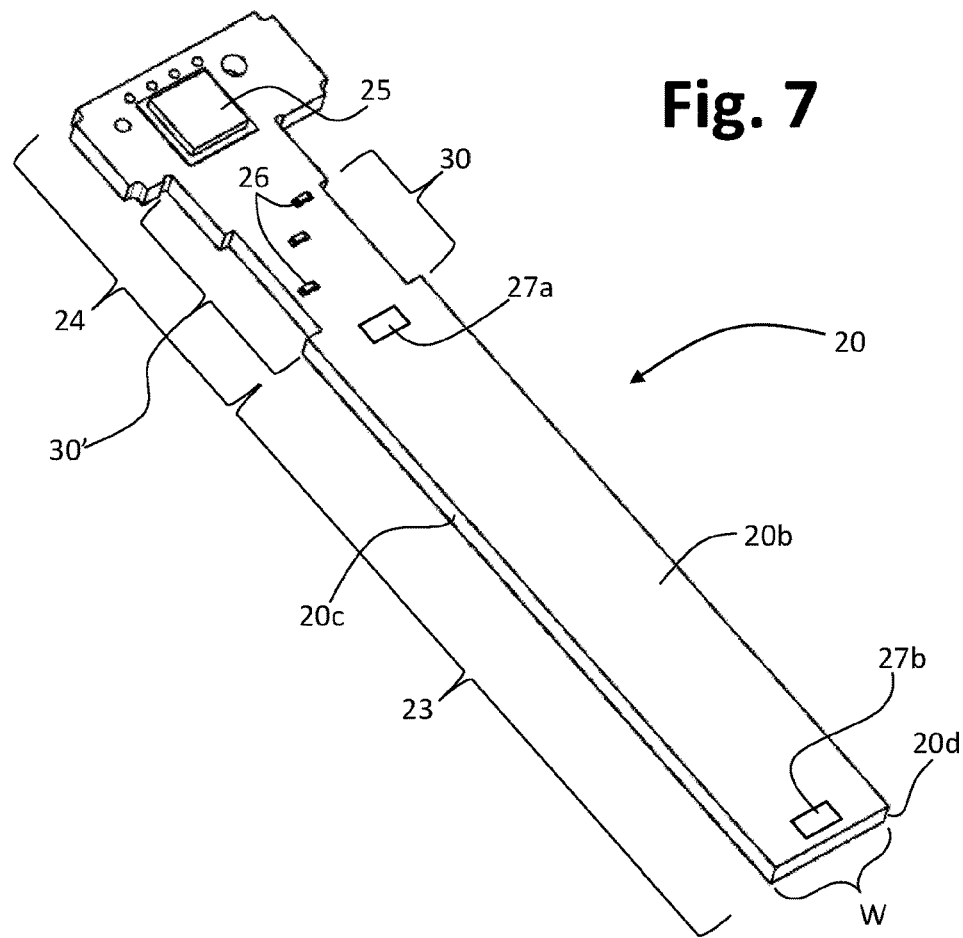
Figure 8:
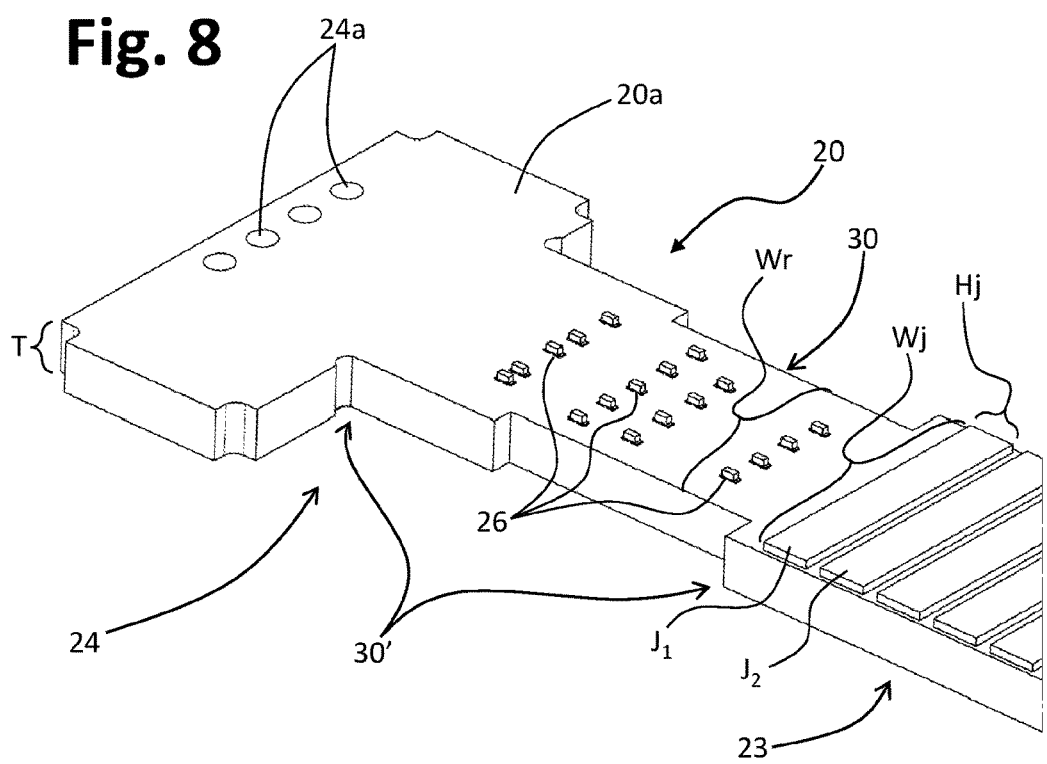
FIG. 8 is a detail at an enlarged scale of a circuit component of the type illustrated in FIGS. 6-7.

FIGS. 6, 7, and 8 are different views of a circuit board or substrate 20 that can be used in sensor devices according to possible embodiments of the invention. The substrate 20 is made of electrically insulating material suitable for producing printed circuits, such as for example FR4 or a similar composite material of a fibreglass type, or again of a ceramic material or a material with polymeric base, preferably a mouldable material. Provided on the substrate 20 is at least part of the electrical-connection elements (such as conductors or electrical paths) and/or of the electrical and electronic level-sensing and/or control components, such as electrodes.

The substrate 20 extends longitudinally between two ends according to the level-sensing axis X and has a generally flattened or substantially two-dimensional shape, which includes two major opposite faces 20a and 20b, which define between them a substrate thickness T (FIG. 8), and two opposite longitudinal edges 20c, 20d, which define between them a substrate width W (FIGS. 6 and 7).

In the substrate 20 there may be identified a sensing region 23, which belongs to the sensing part 11 of the device 10 and includes the distal end of the substrate, as well as a second region 24, referred to hereinafter for simplicity as "control region", which includes the proximal end of the substrate. Prevalently associated to the region 24 of the substrate 20 are the electrical and electronic processing and/or control components of the sensor 10, with the terminals 17 for external electrical connection of the sensor 10.

Prevalently associated to the region 23 of the substrate 20 are, instead, the level-sensing components. More in particular, associated to the region 23 is at least one first array of capacitive elements, which comprises at least one first series of first electrodes at a major face 20a of the substrate, here the face designated by 20a. Some of the aforesaid electrodes which in the example are "n" in number, where "n" is equal to 22 are designated in FIG. 6 by the letter J followed by the number that identifies the position of the electrode in the corresponding series.

In various embodiments, the electrodes J of the aforesaid series are substantially equal to each other and spaced apart from one another along the level-sensing axis X, in a pre-defined and preferably homogeneous way. On the other hand, according to possible embodiments not illustrated, the array of capacitive elements associated to one face of the substrate may also include a different number of series of electrodes, the electrodes of one series having a different geometry from those of another series of the same array.

The electrodes J are made of electrically conductive material, for example a metal material or a metal alloy, and are associated to at least one major face 20a, 20b of the substrate 20. The electrodes J are preferably coplanar to one another and may be, for example, in the form of plates or laminas etched or applied on the substrate 20, or else constituted by an electrically conductive layer deposited on the substrate 20, for example with screen-printing technique or the like. In various embodiments, the substrate 20 has through holes, which contain conductive material for electrical connection between the electrodes J provided on the face 20a of the substrate and corresponding conductive connection paths and/or other possible electrodes present on the face 20b, not represented.

In general, and as indicated in FIG. 8, the electrodes J provided at at least one face of the sensing region 23 of the substrate 20 have at least two opposite side edges, which define between them a maximum electrode width $W_j$, and two opposite transverse edges, which define between them a maximum electrode height $H_j$.

In various embodiments, and as may be visually appreciated from FIGS. 6-7 and 8, the difference between the maximum electrode width $W_j$ and the substrate width W at the sensing region 23 is very small, in particular less than the spacing or distance between the two facing transverse edges of two electrodes J adjacent to one another in the direction of the sensing axis X. For this purpose, preferably, the electrodes J extend in a transverse direction substantially throughout the whole substrate width W, it being understood thereby that the difference is minimal or zero, preferably between 0 mm and 1 mm, in particular between 0.3 mm and 0.6 mm. An albeit minimal difference between the values of W and $W_j$ may be useful for the purposes of production or cutting of the circuit substrate 20, for example in the case of complex shapes and/or of laser cutting or cutting with CNC (Computer Numerical Control) devices, where it is preferable to leave an albeit minimal area without electrodes so as to prevent the cutting tolerances from possibly involving also the aforesaid electrodes J (i.e., prevent cutting tolerances from possibly varying even in a non-uniform way the capacitance of the electrodes J and/or the corresponding measurement of capacitance or electrical field).

As will be seen, the aforesaid preferential structure of the electrodes J is advantageous for the purposes of the level-sensing quality.

The region 24 is preferably comprised between the proximal end of the substrate 20 and the first electrode J of the series (here the electrode $J_1$). Falling within the scope of the invention is the case where electronic control and/or processing components belonging to the circuit arrangement of the device are arranged throughout the entire substrate 20 or within the sensing region 23, i.e., in the proximity and/or between the electrodes J. In this perspective, the connection and/or control region may extend also substantially throughout the whole length of the substrate 20, with a part thereof in common to the sensing region.

In various embodiments, located within this region 24 are components belonging to a measurement and/or control circuit arrangement 25-26 of the device 10. These components preferably include at least one control unit or controller for example, selected or comprising at least one from among a microcontroller, a microprocessor, a CPU (Central Processing Unit), a DSP (Digital Signal Processor), a memory, an integrated circuit, an operational circuit, an A/D converter circuit, an electronic switching circuit designated by 25 in FIG. 7, as well as further active and/or passive components, such as transistors, MOSFETs, resistors, capacitors, diodes, etc., some of which are represented schematically and designated by 26. In the case exemplified, the controller 25 is mounted on the face 20b of the substrate 20 opposite to the one bearing the electrodes J, but this is in no way intended to limit the scope of the invention. Also the components 26, when envisaged, may be mounted indifferently at one or both of the major faces 20a and 20b of the substrate 20, in the control region 24. In various embodiments, the controller 25 has a plurality of inputs electrically connected to which are the electrodes J. The controller 25 preferably comprises at least one processing and/or control logic unit, a memory, and inputs and outputs, amongst which inputs of an analog/digital type. The controller may be, for example, a microprocessor identified by the code PIC16F1517 manufactured by Microchip Technology Inc. or a microprocessor identified by the codes of the series CY8C4200M manufactured by Cypress Semiconductor Corporation.

As mentioned, provided on the surface of the substrate 20, or at least partially inside it, are electrically conductive paths, not represented, for connection of the various circuit components, such as the electrodes J, the components 25 and 26, and the terminals 17. Preferably, the substrate 20 also has metallized holes, for connecting to one another different paths and/or paths and/or circuit components provided on opposite and/or internal faces of the substrate. It should be noted in this regard that the circuit substrate 20 could be of a multilayer type, where the aforesaid paths may even be just internal, i.e., made on internal layers of the substrate, for example leaving on the outside only the electrodes J.

In various embodiments, the device according to the invention includes at least one further sensor for detection of at least one further quantity other than the level of the liquid. The further sensor or sensors may, for example, be selected from among temperature sensors, pressure sensors, quality sensors, and sensors designed to detect characteristics of composition and/or chemico-physical characteristics of the fluid (such as a sensor of an optical type).

In various embodiments, mounted on the substrate 20 are also one or more sensing components other than the electrodes J, in particular for detection of one or more further quantities of interest. For example, in various embodiments, the circuit arrangement of the device 10 includes at least one temperature sensor, in particular a sensor with electrical resistance variable in temperature, such as a sensor of an NTC or PTC type. Such a sensor may be mounted at at least one from among the proximal end area, the distal end area, and an intermediate area of the sensing region 23 of the substrate 20. In the example represented in FIG. 7, mounted in the region 23, in particular on the face 20b of the substrate, are two temperature sensors 27a and 27b, in opposite end areas of the region 23 itself, which are connected to the circuit arrangement provided in the control region 24 via corresponding conductive paths. Assuming an installation of the sensor 10 in the tank 1 of the type illustrated in FIG. 1, the temperature sensor 27a can be used for detecting the temperature of the liquid, in particular in an area close to the bottom wall of the tank, whereas the sensor 27b may be used for detecting the temperature of the liquid in a central area or in an area close to the upper wall of the tank or, with the tank not completely full, the temperature that exists in the internal volume of the tank above the liquid, for example the temperature of the air. A configuration of the type represented in FIG. 7, in particular with two temperature sensors 27a and 27b, enables installation of the sensor 10 in the tank 1 either in the configuration of FIG. 1 or in a configuration turned upside down with respect to that of FIG. 1, for example by reversing at a software level the functions, and in particular the functions of the electrodes J and of the sensors 27a, 27b. A sensor for detection of temperature may possibly be provided in the control region 24 of the substrate, in particular within the connection portion 14 of the body of the device 10, for example for detection of an ambient temperature outside the tank 1. In various embodiments, a number of temperature sensors are provided along the development of the series of electrodes J, at least one of which in an intermediate position between the two end electrodes of the array of capacitive elements.

As may be appreciated from FIGS. 6-8, according to an inventive aspect, the second region 24 of the circuit substrate 20 includes at least one restricted substrate portion, designated as a whole by 30, having a substrate width Wr (FIG. 23) smaller than the width W (FIG. 23) of the sensing region 23.

At the above restricted portion 30 there may be possibly provided circuit components 26, as exemplified in FIGS. 7 and 8. In various embodiments, the restricted portion 30 may be defined within a portion having a width that is intermediate between the width Wr of the restricted portion 30 and the width W of the sensing region 23. Such a portion of intermediate width, the presence of which must in any case be considered optional, is designated by 30' in FIGS. 6-8. The restricted portion could also extend throughout the entire length of the region 24.

According to an inventive aspect, at least part of the restricted substrate portion 30 extends axially in the mounting portion 16 of the body of the device, which is overmoulded on the substrate 20, with the advantages that will emerge clearly hereinafter.

Figure 9:
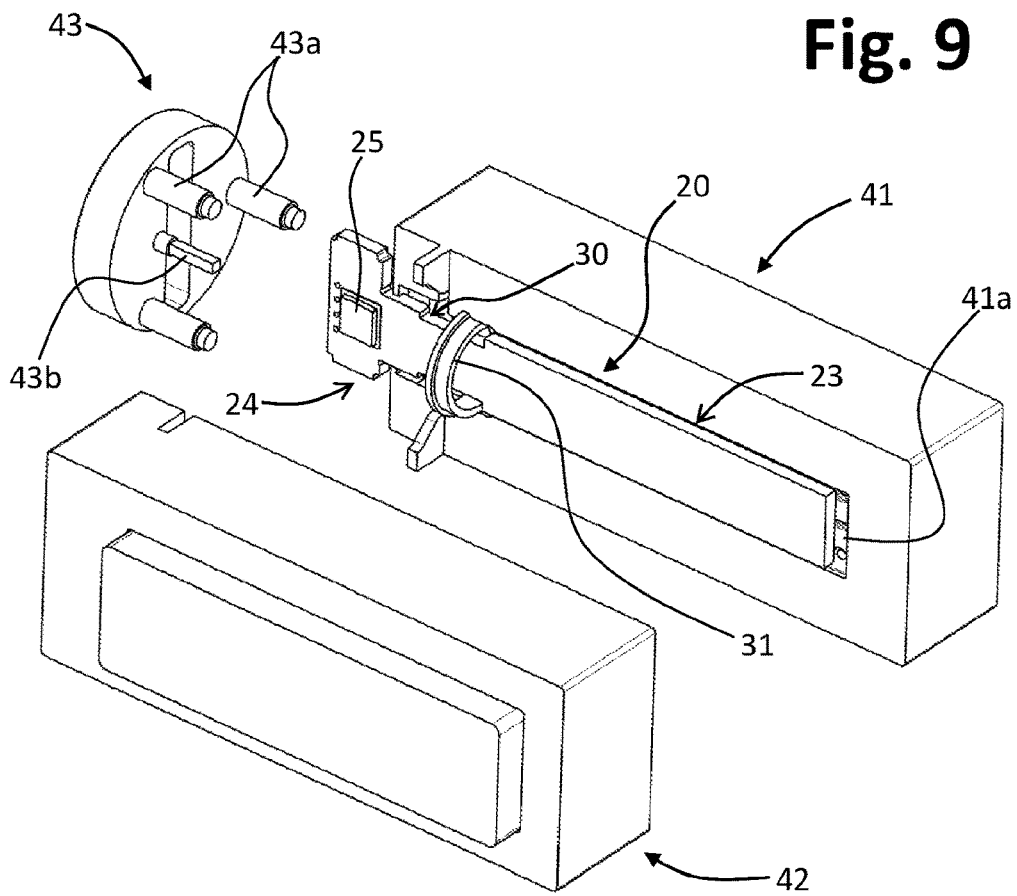
FIGS. 9-11 are schematic representations of moulding equipment that can be used for obtaining level-sensor devices according to possible embodiments of the invention, in different operating conditions.
Figure 10:
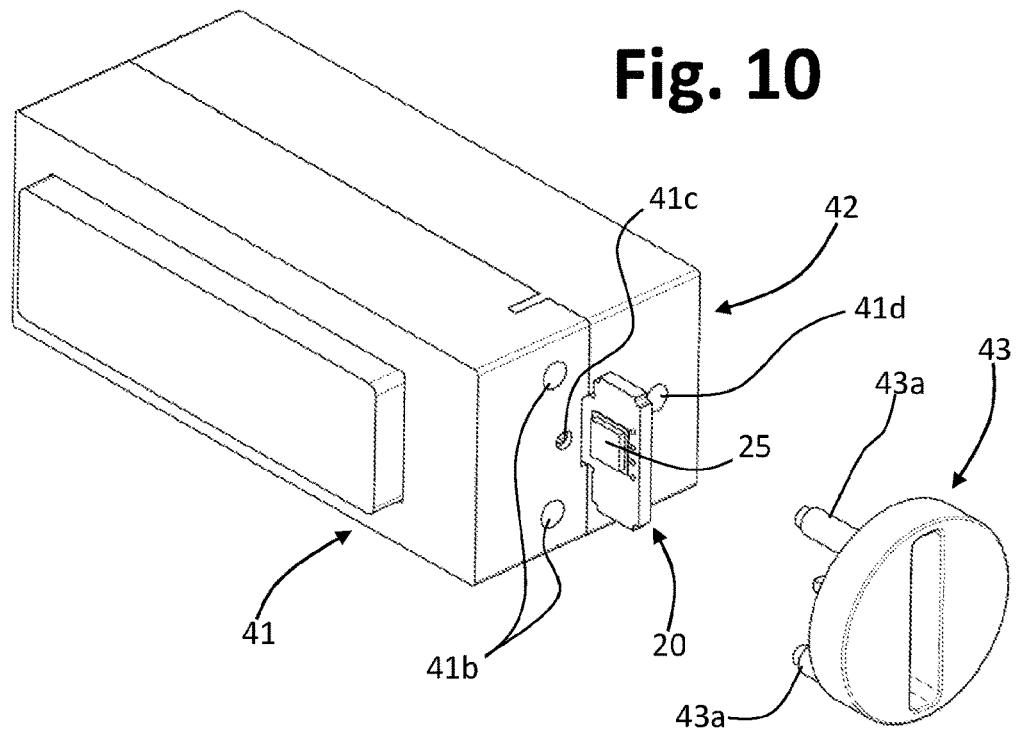
Figure 11:
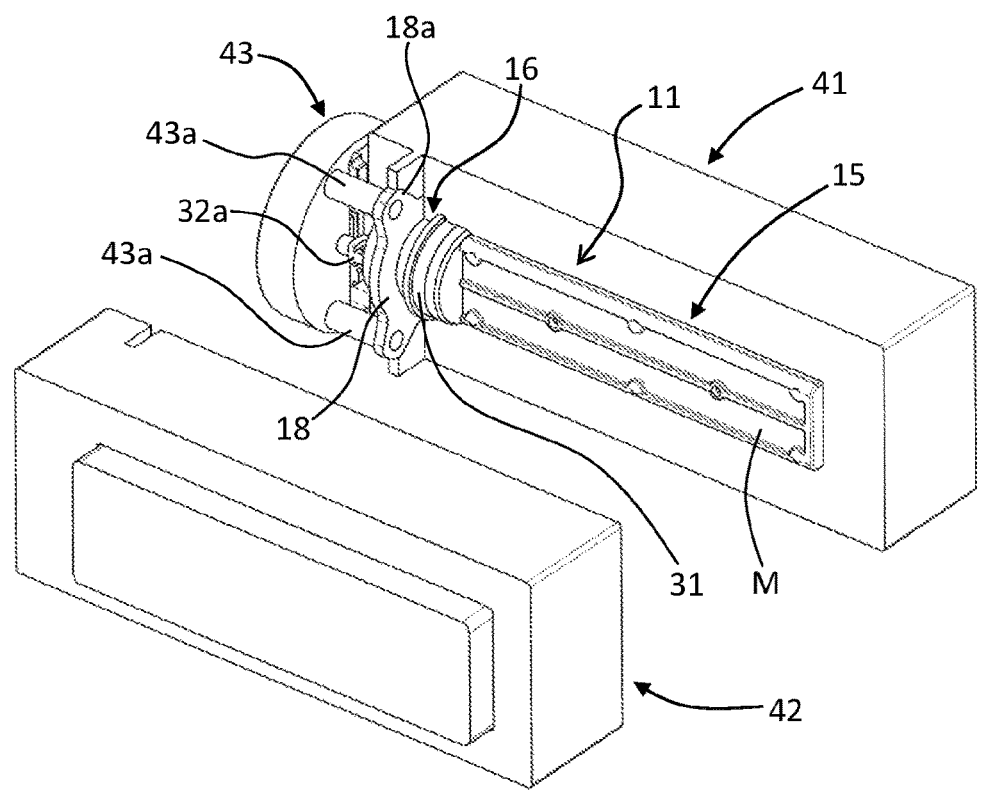

FIGS. 9-11 are a schematic illustration of a possible operating sequence for overmoulding of the sensing portion 15 and of at least part of the mounting portion 16 of the body of a sensor device 10 according to possible embodiments of the invention. It should be noted that, in various embodiments, the body of the device 10 also includes an annular element, for example a shaped metal ring that is associated to the overmoulded material M that provides the sensing portion 15 and at least part of the mounting portion 16.

FIGS. 9-11 illustrate a process in which the use of the aforesaid ring, designated by 31, is envisaged.

In various embodiments, the ring 31 is used for providing at least part of a seat for a sealing element, such as the gasket previously designated by 19. In embodiments of this type, and as explained hereinafter, the ring 31 is configured for being displaced axially on the overmoulded body, to enable definition in the latter of a circular or cylindrical surface designed to guarantee a good resting portion and a good seal for the gasket 19, in particular a surface without burrs or reliefs (which are generally present at the areas of closing or joining of two parts of a mould). In order to facilitate the aforesaid displacement, the ring 31 is preferably shaped so as to present at least one portion in relief, such as a radial or annular relief, on which an axial thrust may be exerted using appropriate equipment.

As will be seen, on the other hand, the ring 31 might even be absent, and the corresponding shape could be obtained by means of the overmoulded material M.

With initial reference to FIG. 9, designated by 41 and 42 are two parts of a mould, each of which defines respective cavities or impressions necessary for the formation of the outer profile of the aforesaid portions 15 and 16 of the casing body of the device. These impressions (just one of which is partially visible, designated by 41a) are prearranged also for the purposes of positioning of the aforesaid shaped ring 31.

In various embodiments, the ring 31 is positioned in a corresponding area of the impression of one of the two mould parts, here the part 41, and then the circuit substrate 20, with the corresponding circuit components (J, 24a, 25, 26 and possibly 27a, 27b) already associated thereto is positioned within the impression 41a itself, with the ring 31 that surrounds at least a part of the control region 24 of the substrate, in particular of its restricted portion 30.

In various embodiments, before the substrate 20 is positioned in the mould, it is provided with a further protective barrier, for example by coating with a thin layer of polymer or resin at least its part that is to be coated with the overmoulding material M, for example a polymer or a resin of the type referred to as "conformal coating", in particular designed to spread evenly so as to coat the substrate 20. Hence, in various embodiments, the substrate has a multi-layer covering, in particular comprising a first layer of a first protective material applied to the substrate (for example the cited polymer or resin) and at least one second layer of a second protective material moulded over the first layer of the first material.

The mould parts 41, 42, in particular the corresponding impressions, are configured in such a way that at least an end portion of the control region 24 of the substrate (FIGS. 6-8), here the portion including the controller 25, will remain on the outside of the impressions themselves, as is clearly visible, for example, in FIG. 10. In various embodiments, the equipment also comprises a further mould part 43, in particular a movable insert or carriage, provided with projections 43a necessary for creating at least through holes of the radial formations 18a of the flange 18 of the body of the sensor, when the aforesaid flange is envisaged. In the non-limiting example illustrated, a projection 43b of the carriage 43 is also used to obtain the axial cavity of a formation (designated hereinafter by 32a), which, in various embodiments, is exploited for fixing a further component of the casing body of the device 10.

FIG. 10 illustrates the condition of closing of the mould, followed by coupling of the carriage 43, with the corresponding projections 43a, 43b that are inserted in passages 41b, 41c and 41d of the parts 41, 42, respectively. This is followed by injection in the mould of the plastic material M necessary for formation of the sensing portion 15 and of the prevalent part of the mounting portion 16, to which also the ring 31 is here associated. The material M used for overmoulding may, for example, be a thermoplastic material or else a thermosetting material. Preferred materials are high-density polyethylene (HDPE), polybutene (PB), polypropylene (PP), polyphthalamide (PPA), polyamide (PA, PA6, PA66), and polyphenylene sulphide (PPS).

In preferred embodiments, the thickness of the material M at the sensing portion 15, i.e., its walls that isolate and separate the substrate 20 from the medium of which the level to be detected, has a thickness of between 1 mm and 2.4 mm, preferably between 1.4 mm and 1.8 mm, very preferably between 1.5 and 1.6 mm. These preferential thicknesses prevent operating faults due to the albeit minimal permeability of the overmoulded insulating material. In configurations of this type, it is also preferable for the height Hj of the electrodes J to be comprised between 2.5 mm and 3.5 mm, in particular approximately 3 mm, and the spacing between two adjacent electrodes J is comprised between 0.8 mm and 1.2 mm, in particular approximately 1 mm.

FIG. 11 represents schematically the subsequent step of re-opening of the mould (note that, in this figure, the carriage 43 is still inserted in the mould part 41, but only for purposes of explanation of the operating positioning of the carriage). From the mould, i.e., from its part 41, a semi-finished product can then be extracted, which presents, as visible in FIG. 12, as substantially including the circuit substrate 20 partially embedded in the material M that provides corresponding portions of the body of the device. In particular, in the example represented, the overmoulded part includes the sensing portion 15, which entirely coats the sensing region 23 of the substrate (FIGS. 6-7), and the mounting portion 16, which here coats part of the control region 24 of the substrate (FIGS. 6 and 7), including the restricted portion 30 and, in the example, a prevalent part of the portion of intermediate width 30'. The overmoulded material M leaves, instead, the remaining part of the control region 24, which here includes a minimal part of the portion of intermediate width 30', exposed.

Figure 12:
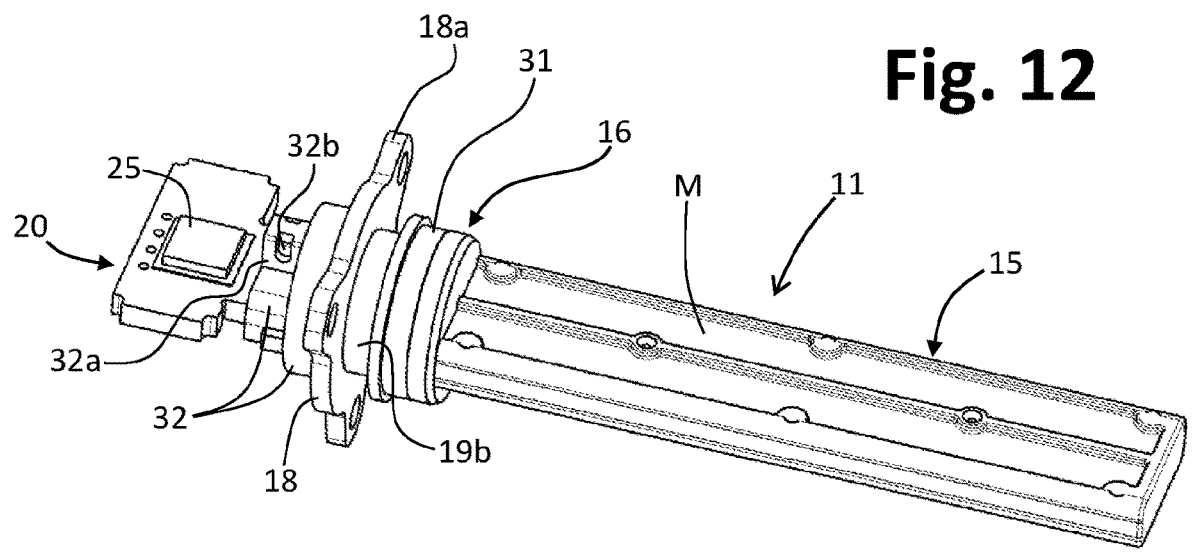
FIG. 12 is a schematic perspective view of a part of a sensor device that can be obtained using the equipment of FIGS. 9-11.

As will be appreciated, in the semi-finished product of FIG. 12, the ring 31 surrounds both a part of the restricted portion 30 of the substrate 20 and a corresponding part of the overmoulded material M in which the restricted portion is enclosed.

Starting from the condition represented in FIG. 12, the ring 31 is then translated axially towards the flange 18. For a better understanding of this aspect, reference may be made to FIG. 13, which illustrates a condition substantially corresponding to that of FIG. 12, and to FIG. 19, where the ring 31 is already displaced axially, up to contact with the flange 18. In order to enable this displacement and maintenance in position of the ring 31, the body portion designated by 19b in FIG. 13 is overmoulded with an outer profile or diameter substantially corresponding to the profile 19a of the body portion circumscribed by the ring 31.

As already mentioned, the presence of the ring 31, and in particular of its inner surface, has the purpose of defining a substantially smooth and homogeneous outer profile or cylindrical surface (see the reference 19a of FIG. 13) of the overmoulded body, at which a seal gasket is to be positioned: for this purpose, in various embodiments, the inner cylindrical surface of the ring 31 has a roughness Ra of between 0 and 3.2, preferably between 0.4 and 1.2, very preferably between 0.7 and 0.9, in particular in order to obtain a similar roughness on the aforesaid outer surface or profile of the seat for the gasket 19.

As will be appreciated, then, starting from the condition of FIGS. 12 and 13, the ring 31 is displaced up to the position of FIG. 19, in such a way that the aforesaid smooth surface will remain directly exposed, so that the aforesaid gasket can rest thereon: the seat that includes the resting surface, as has been said, is designated by 19*a* in the figures. The ring 31 continues, however, to form part of the body of the device, to the advantage of structural strength of the mounting portion 16 at the narrower part of the substrate 20, here represented by the restricted portion 30.

Figure 16:
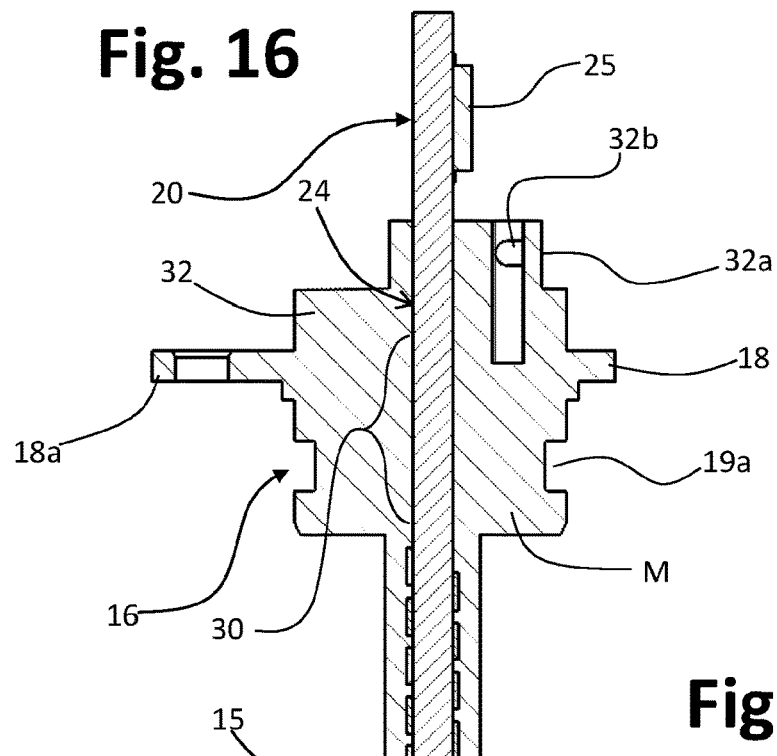
FIGS. 16, 17, and 18 are views similar to those of FIGS. 13, 14, and 15, respectively, regarding a part of a sensor device according to a further possible embodiment of the invention.

As already mentioned, however, the presence of the ring 31 is to be understood as optional, as emerges, for example, from FIG. 16, where the seat 19*a* for a seal gasket is entirely defined by the overmoulded material M.

In various embodiments, the overmoulded material M also defines at least a fixing part, which extends axially beyond the mounting portion, towards the proximal end of the substrate 20, which can be exploited for anchorage of one or more further components of the body of the device. With reference to the case exemplified, an aforesaid fixing part formed by the overmoulded material M is designated by 32 in FIG. 12 and extends beyond the flange 18, from the opposite side with respect to the sensing portion 15; in the example, this part 32 defines an axial formation 32*a*, preferably axially hollow, provided with a transverse passage 32*b*.

In various embodiments, the casing body of the device 10 may be completed by associating to the semi-finished product of FIG. 12 one or more further body parts, in particular in order to provide the corresponding connection portion 14. For this purpose, with reference for example to the embodiment of FIGS. 2-3, the connection portion 14 includes the body parts 21 and 22 of FIGS. 4 and 5, which are coupled together, with at least a portion of the control region 24 of the substrate 20 set in between, where one of the body parts here the part 21 defines the connector body 14*a* associated to which are the terminals 17 provided for being electrically connected to circuit components on the substrate 20.

In the case of the embodiment of FIGS. 2-5, also set between the two body parts 21 and 22 is an end portion of the overmoulded part 15-16, and in particular at least a portion of the fixing part 32 that includes the formation 32*a* (see FIGS. 5 and 12).

As may be noted from FIG. 4, the body part 21 defines a cavity 21*a*, projecting within which are the end portions 17*b* of the terminals 17. For this purpose, for example, the body part 21 may be made of electrically insulating plastic material, overmoulded on the terminals 17 so as to leave the end portions 17*a* and 17*b* thereof exposed. The body part 21 likewise defines an axial seat 21*b*, delimited laterally by two walls provided with respective coaxial holes, one of which is designated by 21*c* in FIGS. 3 and 4.

The body part 21 is positioned on the semi-finished product of FIG. 12 in such a way that in the seat 21*b* the formation 32*a* of FIGS. 5 and 12 is inserted, with the corresponding transverse hole 32*b* coaxial to the holes 21*c*. Following upon this positioning, moreover, the ends 17*b* of the terminals are inserted in purposely designed contact elements provided in the control region 24 of the substrate 20, these contact elements being designated by 24*a* in FIG. 8. In the example, these elements 24*a* comprise through metallized holes of the substrate 20, connected to which are respective electrically conductive paths of the type mentioned previously (the aforesaid holes could be replaced by, or have associated thereto, electrically conductive pads).

Figure 27:
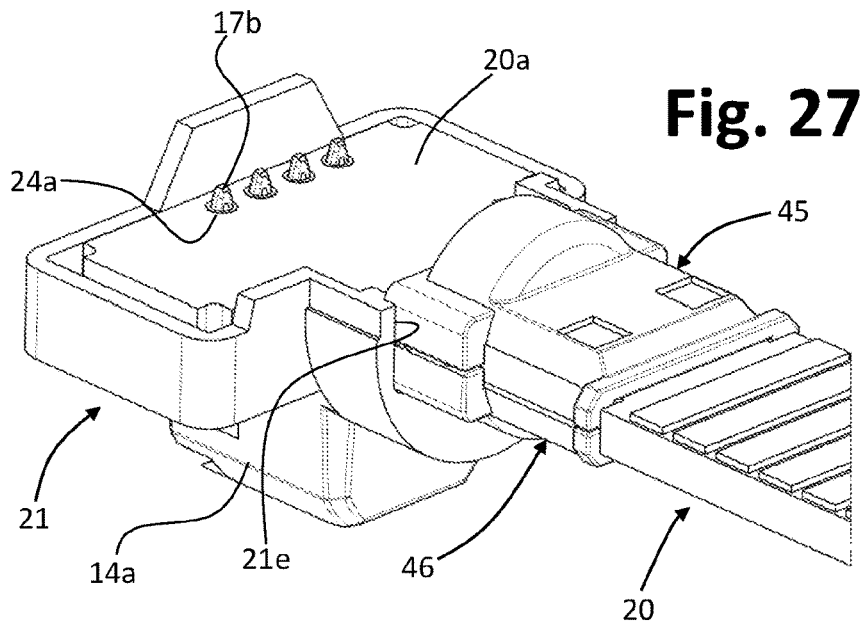
FIG. 27 is a partial view of the components of FIG. 25 assembled together.
Figure 40:
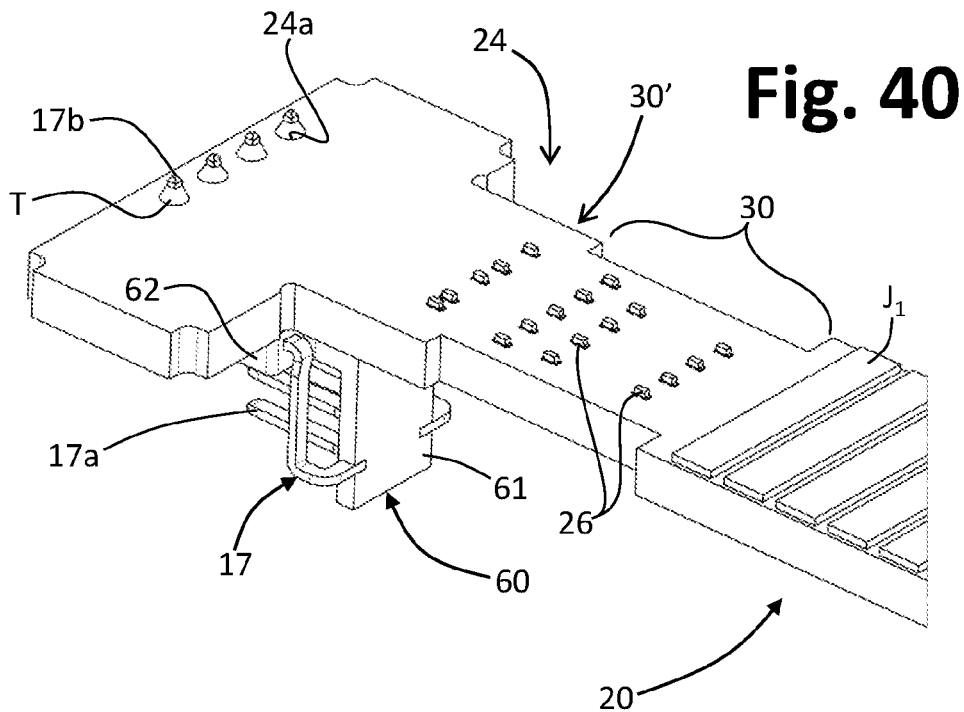
FIG. 40 is a partial and schematic perspective view of a semi-finished product that uses the component of FIGS. 36-37.
Figure 41:
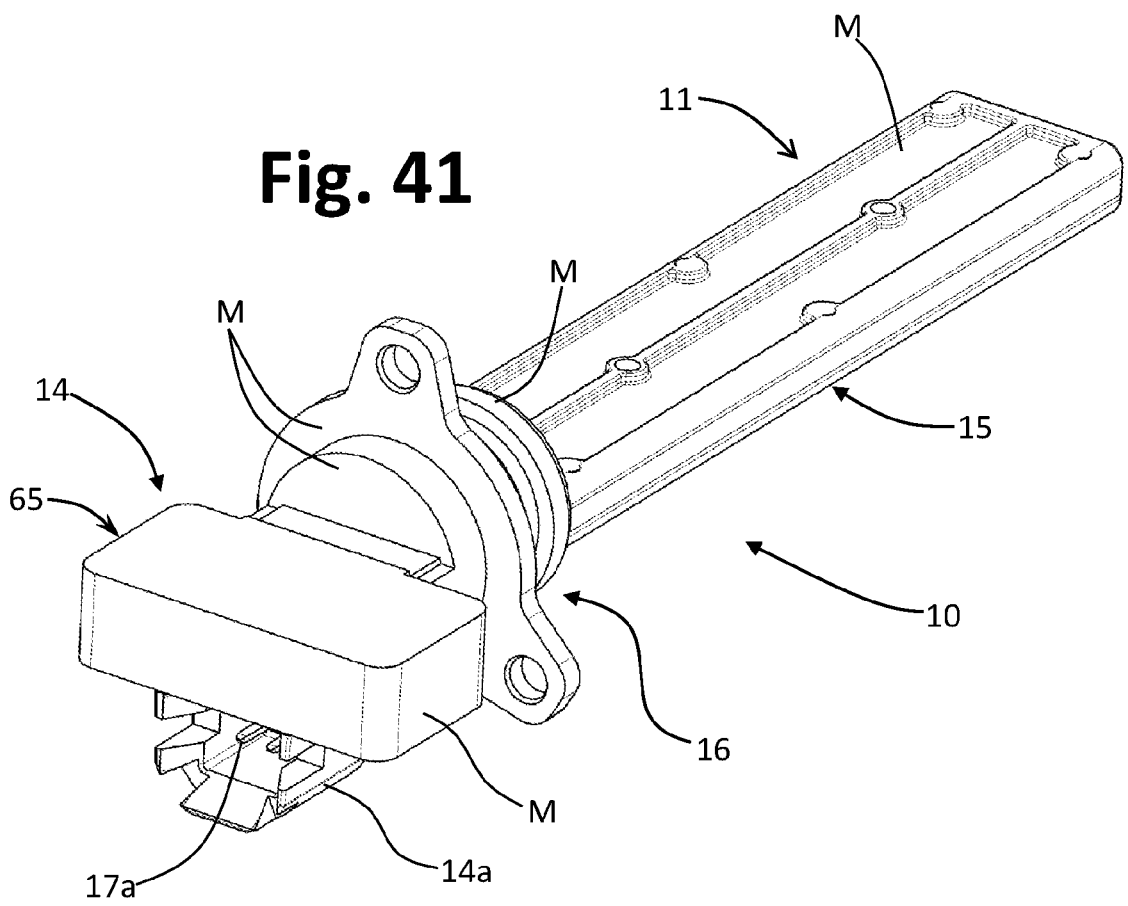
FIG. 41 is a schematic perspective view of a level-sensor device that uses the semi-finished product of FIG. 40.
Figure 42:
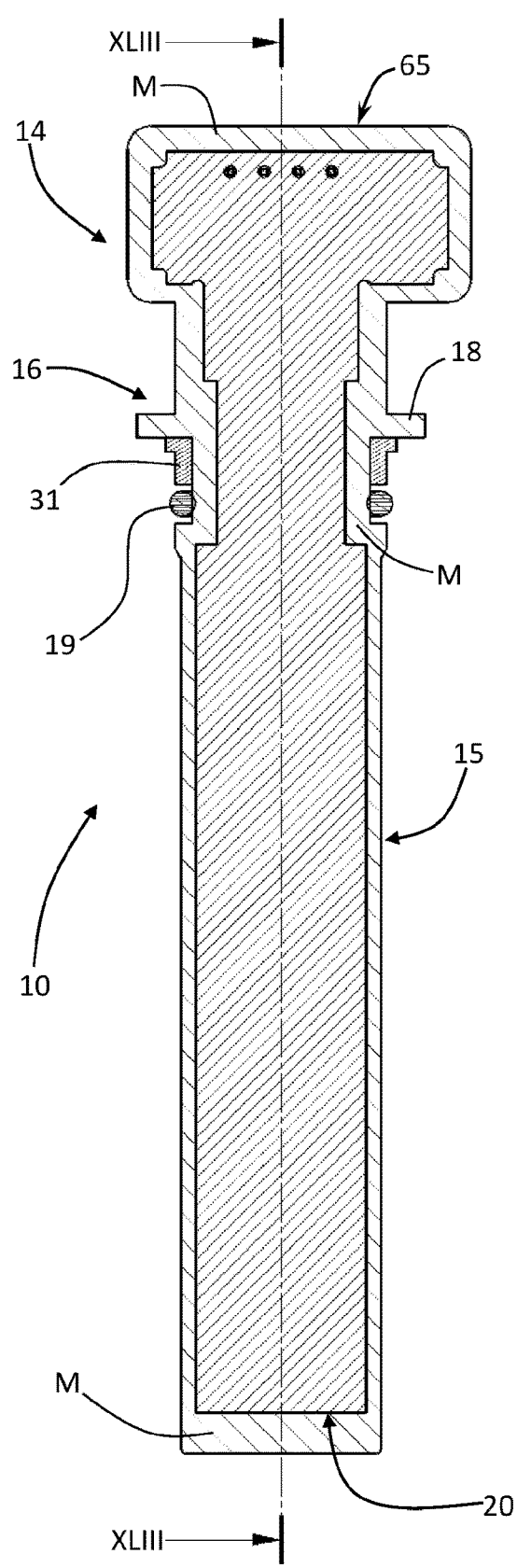
FIG. 42 is a schematic longitudinal section of the device of FIG. 41.

The ends 17*b* of the terminals can then be soldered at the aforesaid metallized holes (and/or the aforesaid conductive pads) see FIG. 40, only as regards the soldering operation or else the aforesaid holes (and/or the aforesaid pads) may be provided with electrical connections of the generally known press-fit type (see FIG. 27, only as regards this type of connection). Alternatively, the aforesaid electrical connections could be at least partially of an elastic type. For this purpose, to the connection elements 24*a* and/or to the ends 17*b* of the terminals 17 there could be associated electrical contacts that are at least in part elastic.

The body part 21 can then be fixed to the semi-finished product of FIG. 12, in particular by tightening a screw S (see FIGS. 4-5) through the holes 21*c*, with the screw that hence passes through the corresponding transverse hole 32*b* of the formation 32*a*. In variants not represented, as an alternative to the screw, a fixing pin or else means for mutual engagement between the parts 21 and 32 may be provided. Advantageously, the cavity 21*a* may be filled with a protective resin, preferably designed to coat also a respective portion of the substrate 20, in particular in order to provide a seal in regard to any infiltration and/or contamination from outside.

Next, associated to the body part 21 is the body part 22 so as to close the cavity 21*a* of the part 21, located in which is the part of the substrate 24, which projects axially from the overmoulded material M. In various embodiments, the part 22 hence provides a sort of lid for closing the part 21 and, for this purpose, preferably has a coupling and/or sealing element 22*a* (FIG. 5), at its face facing the body part 21. Fixing between the two parts, which may be a sealed fixing, may be obtained for example by gluing or welding the part 22 on the part 21, albeit not excluded is a snap-action fixing or a fixing via the aid of further threaded members. Finally, in the seat 19*a* provided at the mounting portion 16 of the body of the device 10 there may be mounted the annular sealing element or gasket 19.

In FIGS. 13-15, the semi-finished product of FIG. 12 is represented via corresponding cross-sectional views, from which it may be noted how the substrate 20 is prevalently englobed in the overmoulded material M, which provides in a single piece the sensing portions 15 and the mounting portion 16, with the corresponding fixing part 32. From FIG. 13 it may in particular be noted how the restricted portion 30 is completely embedded in the overmoulded material M. The presence of the steps defined at the two axial ends of the restricted portion 30 (see for reference FIGS. 6-8), favours anchorage of the substrate 20 as a whole within the overmoulded body.

As has been said, FIG. 13 illustrates a non-definitive position of the ring 31, which is to be translated axially upwards (as viewed in FIG. 13), preferably until it bears upon the flange 18 (see FIG. 19). Following upon this displacement, the seat 19*a* for the seal ring 19 of FIGS. 4-5 is defined between the bottom part of the ring 31 and a part projecting in a radial direction of the mounting portion 16 (see FIG. 19).

In embodiments in themselves autonomously inventive, i.e., also in the absence of the aforesaid restricted portion of the circuit substrate 20, a level-sensor device 10 comprises a second array of capacitive elements on the sensing region 23 of the substrate 20, where the second array comprises at least one second series of second electrodes, which are preferably substantially equal to each other, are coplanar, and are spaced apart from one another along the level-sensing axis, and are provided at the second major face 20*b* of the substrate 20. Embodiments of this type are illustrated schematically in FIGS. 16-18, which are similar to FIGS.

13-15, and in FIGS. 19-20, which are similar to FIGS. 13-14, where the aforesaid second electrodes are designated by J'.

Figure 17:
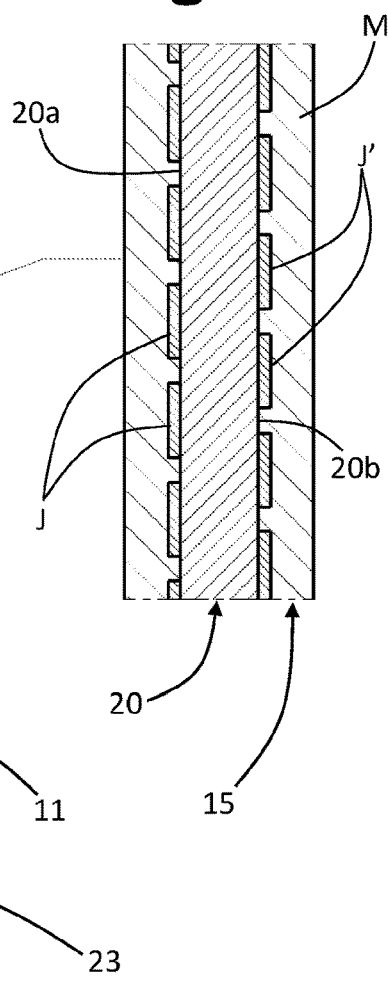
Figure 18:
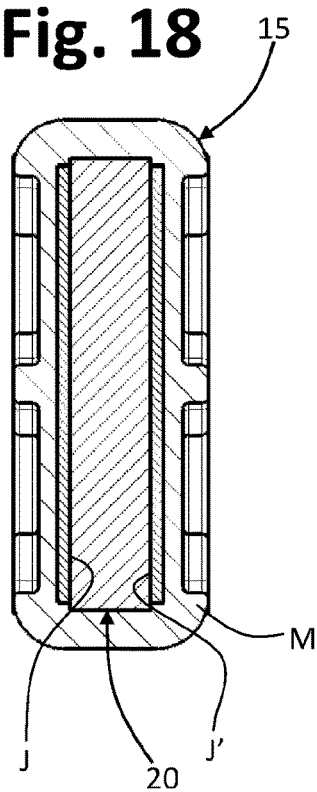

In various embodiments, and also in the absence of the aforesaid restricted portion of the substrate 20, the second electrodes J' at the face 20b of the substrate 20 are in positions staggered with respect to the first electrodes J at the face 20a, having as reference the level-sensing axis X. An example of this type is represented in FIGS. 16-18. Embodiments of this sort enable a considerable increase in the level-measurement resolution of the sensor device 10. For this purpose, it is preferable for the electrodes J' on one face 20b of the substrate 20 to extend in intermediate positions with respect to the electrodes J present on the other face 20a, and vice versa. Such a characteristic may be clearly appreciated in the detail of FIG. 17. In embodiments of this type, the electrodes J and J' are preferably connected individually to respective inputs of the controller 25. Preferably, the electrodes J and J' have equal geometrical shapes, or else have different shapes but equal surface dimensions or, in general, have equal capacitance. In this configuration, the electrodes J' enable detection of the levels of liquid intermediate between the ones that can be detected by just the electrodes J.

FIG. 16 enables to highlight also a possible alternative embodiment of the mounting portion 16, which in this case is without the metal ring 31, with the seat 19a for the annular sealing element or gasket 19 that is defined entirely by the overmoulded material M.

In various embodiments, and also in the absence of the aforesaid restricted portion of the substrate 20, at least one first electrode J, or each first electrode J, provided on a major face of the substrate 20, is connected to a corresponding second electrode J' provided on the other major face of the substrate, by means of an electrical-connection part, such as a metallized hole. An example of this sort is represented in FIGS. 19-20. Embodiments of this type enable—given the same dimensions of the substrate 20 and/or arrangement of the electrodes J—increase (or doubling) of the surface (or the capacitance or electrical field) and hence of the sensitivity and resolution of the sensor device 10. In embodiments of this sort, each pair of electrodes J, J' is connected to a respective input of the controller 25. Preferably, the electrodes J and J' are in specular positions on the two faces 20a and 20b of the substrate, i.e., not staggered with respect to one another, unlike the case of FIGS. 16-18.

In advantageous embodiments, the aforesaid electrical-connection parts extend through respective through openings of the circuit substrate 20, for example as is clearly visible in the detail of FIG. 20, where some of the aforesaid parts are designated by C. In embodiments of this type, the connection parts C preferably comprise electrically conductive material that fills through holes in the substrate 20, the ends of each hole being at two opposite electrodes J and J'. According to other embodiments, instead, the connection parts may be defined on the outer surface of the substrate, for example in the form of electrically conductive paths or wires that connect the two opposite electrodes J and J', for example straddling a longitudinal edge of the substrate 20. The two opposite electrodes J and J' could be connected to one another also indirectly; i.e., the aforesaid electrical-connection parts or metallized holes could also be connected to respective intermediate electrical paths or connections, such as electrical paths inside the substrate.

FIG. 19 enables at highlighting also the final preferred position of the metal ring 31, as already explained: in this case, the upper part of the ring 31 is substantially in contact with the flange 18, and the seat 19a for the seal ring 19 is defined between the lower end of the ring 31 and a widened lower part of the mounting portion 16.

The presence of the restricted portion 30 of the substrate 20, which is located at the mounting portion 16 of the body of the device, is particularly advantageous for production purposes, in view of the increase in the level-sensing quality, as compared to the known art cited previously.

Figure 21:
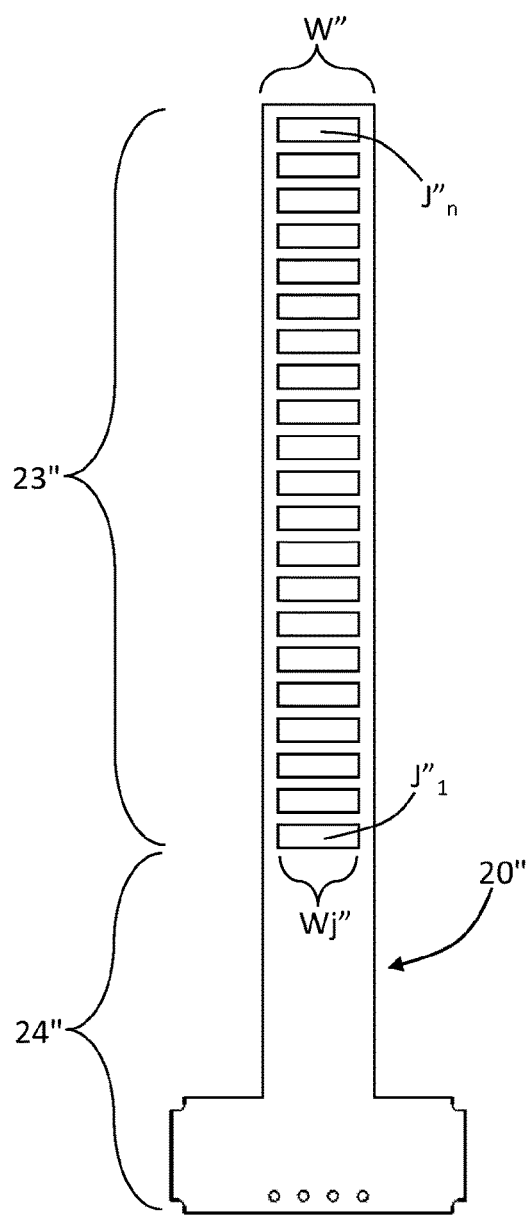
FIGS. 21 and 22 are, respectively, a schematic view in front elevation of a circuit component and a schematic cross section of a level-sensor device that uses such a circuit component, according to a known art.
Figure 22:
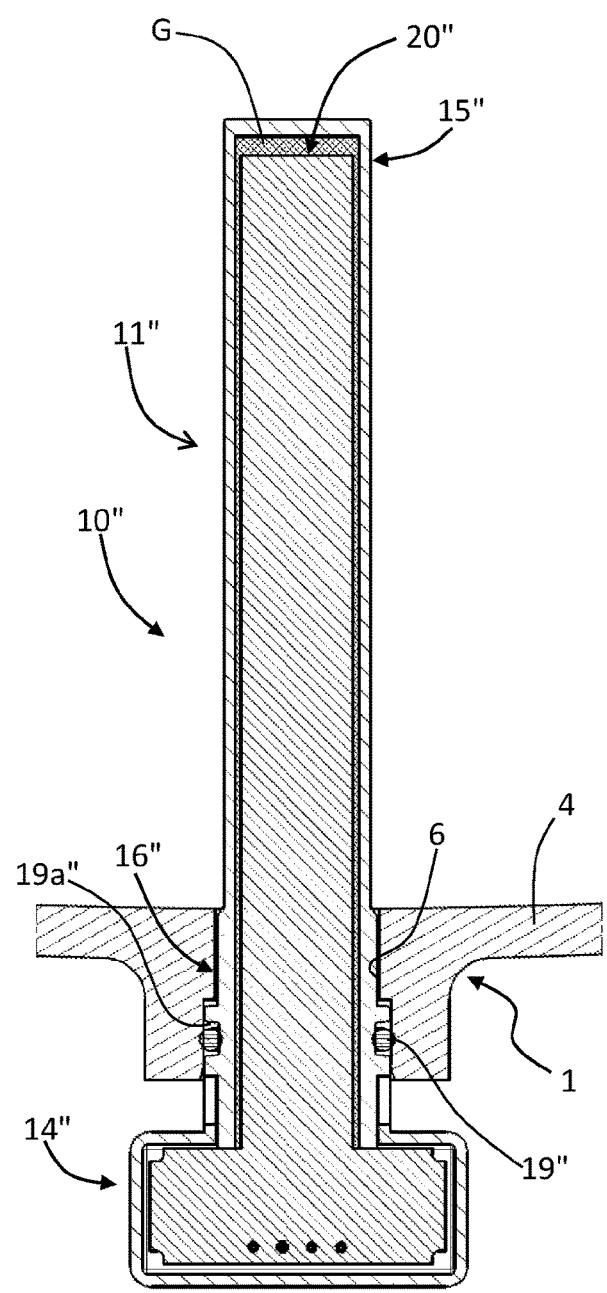

For a better understanding of this aspect, FIG. 21 is a schematic representation in front elevation of a circuit substrate 20" of the type used according to the teachings of WO 2015/181770 A, whereas FIG. 22 is a schematic representation in vertical section of a level-sensor device 10" once again according to the teachings of WO 2015/181770 A, in a condition thereof where it is installed on a tank, for example a tank 1 similar to that of FIG. 1.

As may be noted, the substrate 20" bearing electrodes J" does not present any restriction with respect to its sensing part 23". In other words, the width W" of the substrate 20" is constant, as far as the widened portion of the substrate itself that is included in the control region 24", at its proximal end.

With reference now to the known configuration of FIG. 22, which is substantially equivalent to the known configuration of WO 2015/181770 A, the substrate 20" is inserted in a pre-formed sensor body, the sensing portion 15" of which is axially hollow and has inside longitudinal ribs (not visible) for positioning of the substrate itself.

Moreover introduced into the sensing portion 15" is a resin or a gel, designated by G, basically having the function of filling the gaps existing between the substrate 20" bearing the electrodes J" and the inner surfaces of the sensing portion 15" itself. A part of the control region 24" of the substrate 20" passes through the mounting portion 16" of the body of the device 10", where a corresponding seat 19a" for an annular sealing element 19" is defined. As may be understood, the substrate 20" is axially inserted within the sensing portion 15", through the mounting portion 16"; i.e., it is inserted so that it passes through a portion 14" provided for housing at least one substrate part.

The diameter of the annular sealing element 19", and hence of the corresponding seat 19a", obviously depends upon the diameter of the through opening 6 provided in the tank 1. The consequence of the presence of the seat 19a" is that the width of the cavity inside the portions 16" and 15" cannot be greater that a certain value, which is much smaller than the diameter of the bottom of the seat 19a" itself (i.e., smaller than the inner diameter of the sealing element mounted, from which the thickness of the wall on which the sealing element rests is to be subtracted): in fact for structural reasons it is in any case necessary to have available a minimum thickness of the wall of the body of the device at the seat 19a". For this reason, and in view of the need for the aforesaid axial insertion of the substrate 20" in the cavity of the portions 16" and 15", the width W" of the sensing region 23" of the substrate will necessarily have to be smaller than the width of the cavity of the portions 16" and 15" themselves. Consequently, the width Wj" of the electrodes J" will be further reduced.

FIGS. 23 and 24 illustrate, instead, with views similar to those of FIGS. 21 and 22, a substrate 20 and a device 10 according to possible embodiments of the invention, in a condition where they are mounted on a tank 1, the opening 6 of which has a diameter corresponding to that of the opening 6 of FIG. 22. It should be noted, for this purpose, that, preferably, the device according to the invention is prearranged for being mounted in tanks already available on the market (i.e., with pre-defined attachment or mounting opening); i.e., it is interchangeable with known devices.

As may be appreciated from a comparison between FIGS. 23-24 and 21-22, thanks to the presence of the restricted portion 30 and to the fact that the portions 15 and 16 of the body of the device are made of the material M overmoulded on the substrate 20, the sensing region 23 may have a width W greater than the corresponding width W" of the substrate 20" used in the known device 10" of FIG. 22, given the same diameter of the opening 6 of the tank and hence given the same diameter of the ring 19 and of the corresponding seat 19a, with respect to that of the ring 19" and of the seat 19a" provided in the known device, in any case guaranteeing an adequate wall thickness at the seat 19a.

The fact that the substrate width W at the sensing region may be greater than the substrate width W" of the known art enables an increase in the dimensions of width Wj (FIG. 23) of the electrodes J, and hence in the capacitance and/or electrical field and in the sensitivity of the level-sensor device 10, considering that the capacitance and/or intensity of the electrical field on which level measurement of a capacitive type is based depends in a directly proportional way upon the surface of the electrodes. Advantageously, moreover, in various embodiments, the electrode width $W_j$ is equal to or greater than the width Wr of the restricted substrate portion 30 (see, for example, FIG. 23).

From FIG. 21 it may moreover be noted how the electrodes J' provided on the known substrate 20' are sized in such a way that the corresponding side edges are set at quite a distance apart from the longitudinal edges of the substrate itself, and are in any case sized in such a way that the difference between the electrode width Wj" and the substrate width W" in the sensing region 23" is appreciably greater than the distance between two electrodes J", i.e., between two facing transverse edges of two electrodes J".

On the other hand, as already mentioned, in various embodiments of the invention, the difference between the electrode width Wj and the substrate width W at the sensing region 23 is minimal, and preferably less than the spacing or distance between two electrodes J, i.e., between the facing transverse edges of two electrodes J, which also remains in any case very limited, preferably comprised between 0.8 mm and 1.2 mm, in particular approximately 1 mm. This enables a further increase in the width of the electrodes, and hence an increase in the capacitance and/or electrical field and in the sensitivity of the device as compared to the known device.

In various embodiments, such as the one illustrated in FIG. 24, the minimum thickness of the overmoulded material M on the lateral surfaces (20c, 20d) of the substrate 20 at the region 23 (for example, 1.5-1.6 mm) is equal to or smaller than the minimum thickness of material M overmoulded on the aforesaid lateral surfaces at the restricted portion 30 (and in the possible portion of intermediate width 30').

In various embodiments, the depth "h" of the seat 19a for the gasket 19 is equal or close to approximately ¾ of the diameter "d" of the chord of the gasket itself (where by "chord" is meant the cross section of the body of the gasket, as visible in FIG. 24); i.e., twice the depth "h" (at the two sides of the restricted portion 30) is approximately 1.5 times (¾+¾) the diameter "d". In this perspective, in preferred embodiments, the width of the restricted portion 30 may be defined as $$Wr \leq W-(h \cdot 2) \text{ or else } Wr \leq W-(d \cdot 1.5)$$

It should moreover be noted that known solutions of the type described above with reference to FIG. 22 prevent the circuit substrate 20" from the possibility of it being equipped with electrodes on both of its two major faces. In these known solutions, in fact, the cavity of the portions 15" and 16" must necessarily present, for production reasons, a so-called draft angle, i.e., slightly inclined walls designed to allow extraction without any damage to the mould portions that form the internal cavities. The consequence of this is that just one of the major faces of the substrate 20", i.e., the one bearing the electrodes J", can be "straight" in the axial direction and in strict contact with a corresponding inner surface of the portion 15", rendering in effect unusable for measurement purposes the other "inclined" major face (to compensate for this inclination of the wall and in any case provide a correct resting position and thrust of the substrate towards the "straight" sensing wall, the prior art typically envisages that on this inclined wall axial ribs or reliefs will be provided, which further increase the distance between the substrate and the fluid to be detected, thus rendering impossible detection at the aforesaid inclined wall).

In various embodiments, at least part of the components of the circuit arrangement that equips the substrate 20 is located in an intermediate area of the control region 24 that may be involved in the process of overmoulding of the material M, in particular an area that includes or comprises the restricted portion 30: see for example FIG. 8, where within the portion 30 a series of components 26 are provided. In embodiments of this type, it may prove advantageous to provide a protective body that will protect at least partially or surround at least partially the aforesaid intermediate area of the substrate 20, preferably a tubular body or at least a shell. In this way, the material M that defines the sensing portion 15 and at least part of the mounting portion 16 may be overmoulded at least partially on the aforesaid protective body, which thus performs at least a function of safeguarding of the circuit components in the course of the overmoulding step, and preferably also a function of structural strengthening of the mounting portion 16.

In various embodiments, the aforesaid protective body is a shell or a tubular body, which preferably comprises at least one shell or two shells coupled together.

Figure 25:
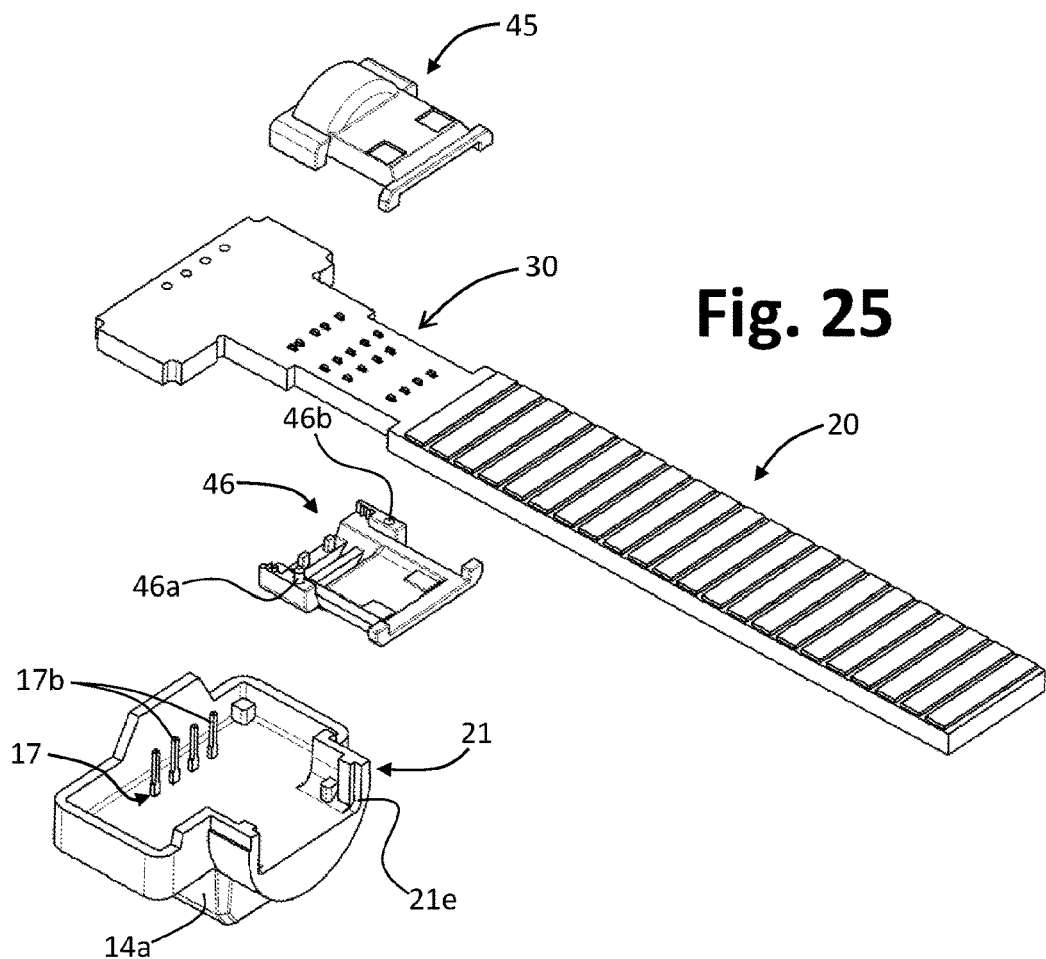
FIGS. 25 and 26 are partially exploded views of some components of level-sensor devices according to possible embodiments of the invention.
Figure 26:
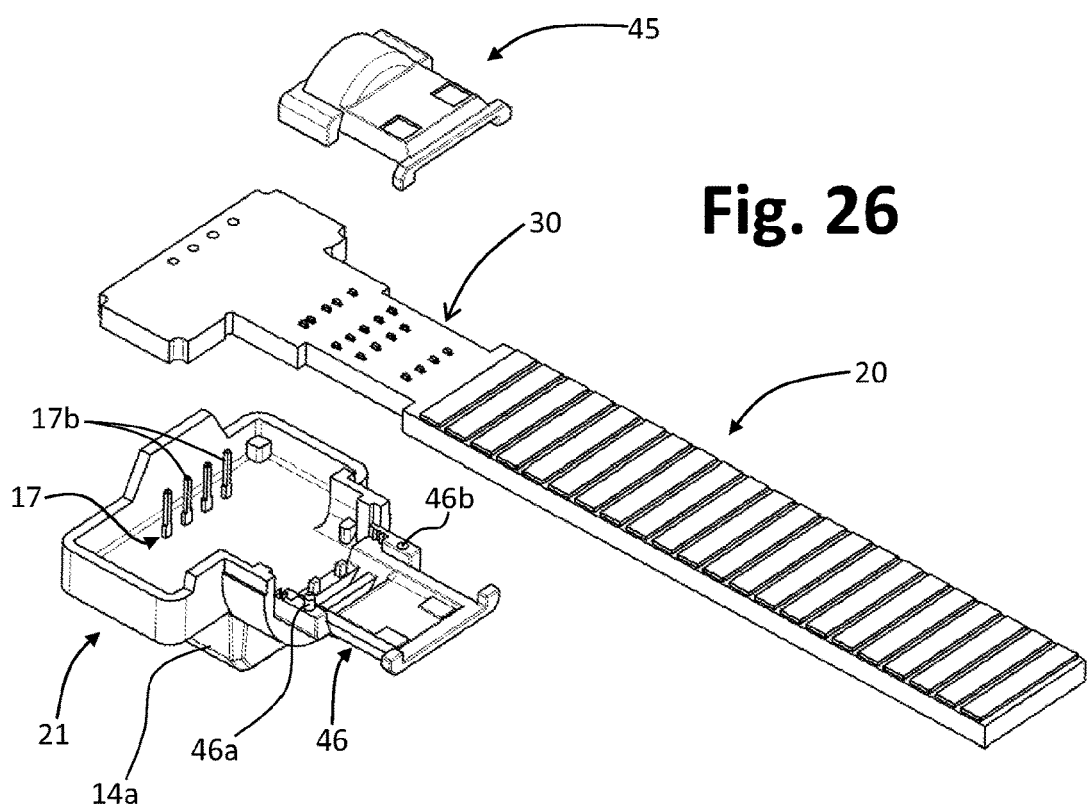

FIG. 25 illustrates the case of two shells 45 and 46 designed for mutual coupling, with, set in between, the aforesaid intermediate area provided with circuit components, which corresponds to or includes at least part of the restricted portion 30. For this purpose, the two shells 45 and 46 are preferably provided with coupling means, such as pins 46a and seats 46b of the shell 46 designed to couple with corresponding seats and pins of the shell 45. FIG. 25 moreover highlights a body part 21, which integrates the connector body 14a and the terminals 17 and has a shape slightly modified with respect to the body part 21 of FIGS. 4-5. In various embodiments, also the part 21 and at least one of the two shells, preferably both of the shells, are configured for mutual coupling. In the case exemplified in FIGS. 25-26, for this purpose, the body part 21 defines an end seat 21e configured for receiving corresponding end portions of the shells 45 and 46 (see also FIG. 27). Advantageously, in other embodiments, the body part 21 and the shell 46 are made of a single piece.

In various embodiments, the aforesaid protective body (comprising, for example, the two shells 45, 46, or else just one shell 46, or else a single piece that integrates the body 21 and the shell 46) is made of a polymer having a melting point higher than 260° C. or in any case a polymer designed to withstand this temperature, in particular in order to withstand overmoulding thereon of at least one polymer at a temperature lower than 250° C. For this purpose, in various embodiments, the material for the protective body (for example, the shells 45-46, or the shell 46, or the body 21 integrating also the shell 46) is selected from among polyphthalamide (PPA), polyamide copolymers (PA66), and polyphenylene sulphide (PPS).

For the purposes of assembly, for example, the two shells 45 and 46 are coupled together, to form the aforesaid tubular body, with the corresponding intermediate area of the substrate 20 set in between. The tubular body 45-46 thus formed is associated to the body part 21 so that positioned within the cavity 21a of the body part 21 itself is the proximal end area of the substrate 20, with the portions 17b of the terminals that couple together in the respective contact elements 24a of the substrate 20, as exemplified in FIG. 27, where the contact elements 24a are provided with connections of a press-fit type. Obviously, the connection between the contact elements 24a and the portions 17b of the terminals 17 may be made via soldering with application of electrically conductive material, for example tin.

Next, the portion of the substrate 20 that has associated to it the body part 21 and the shells 45-46 is inserted in a mould for application of at least one polymer or resin, such as a thermoplastic material. The material used is preferably of the type with low melting point or polymerisation temperature, in particular a transformation temperature that is such as not to damage the electronic components (such as a temperature of between 180° C. and 240° C., preferably close to 200° C.). A thermoplastic material designed for the purpose may be of the type defined as "hot melt" or "hot glue".

Such a step is illustrated schematically in FIG. 28, where designated by 50 and 51 are two mould parts, the part 50 having an impression shaped for housing the body part 21 and the shell 46, the part 51 having instead an impression shaped for housing the shell 45 and for defining the outer profile of a protective covering (designated hereinafter by 52) obtained with the aforesaid polymer or resin. After closing of the parts 50-51 of the mould, injected into the latter is the material (polymer or resin) necessary for formation of the aforesaid covering, defined hereinafter for simplicity as "resin". This step is represented schematically in FIG. 29, where the resin is designated by R. In this step, a part of the injected resin R occupies the empty spaces between the inner surfaces of the shells 45, 46 and the corresponding portion of the substrate 20 (i.e., it fills the tubular body 45-46), whereas the other part of the resin R coats the remaining part of the substrate 20 within the mould, i.e., the part housed within the body part 21.

Figure 30:
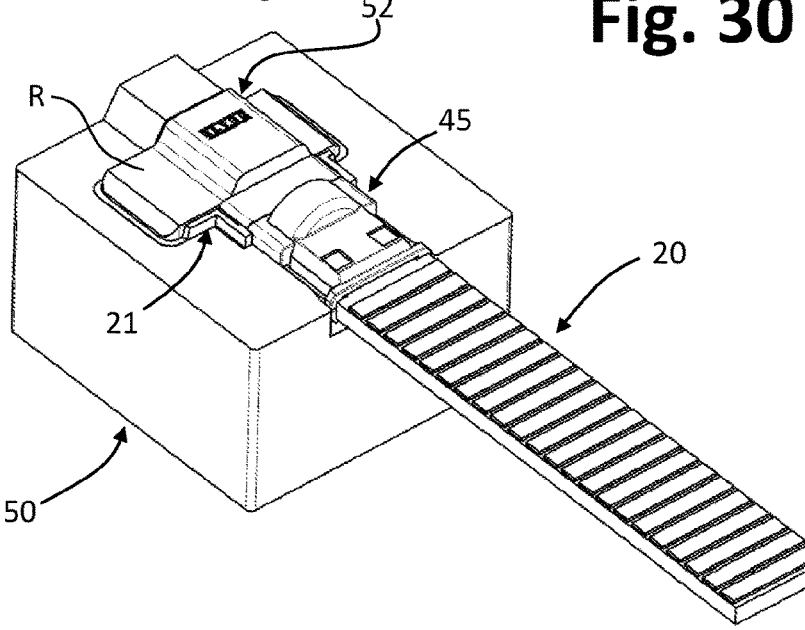

In this way, after subsequent solidification of the resin R and re-opening of the mould as exemplified in FIG. 30 the proximal end area of the substrate 20 is enclosed and protected between the body part 21 and the covering obtained by the resin R, designated as a whole by 52, preferably with a part of the latter that occupies also the inside of the tubular body 45-46, surrounding and protecting the restricted portion 30 of the substrate.

Next, after extraction from the mould 50-51, the semi-finished product visible in FIG. 30 may be positioned in a further mould, for carrying out the further overmoulding of the material M necessary for formation of the casing portions 15 and of the outer part of the mounting portion 16, with modalities substantially similar to the ones described with reference to FIGS. 9-11 (obviously using equipment modified accordingly, in a way in itself clear to the person skilled in the art, with mould parts provided with impressions designed to house at least the tubular body formed by the shells 45 and 46). In the course of this operation, the circuit components 26 provided in the restricted portion of the substrate 20, albeit located within the area where the material M is overmoulded, are in any case protected, both by the respective part of the coating 52 and by the shells 45, 46, and hence cannot be reached by the overmoulded material M.

Figure 31:
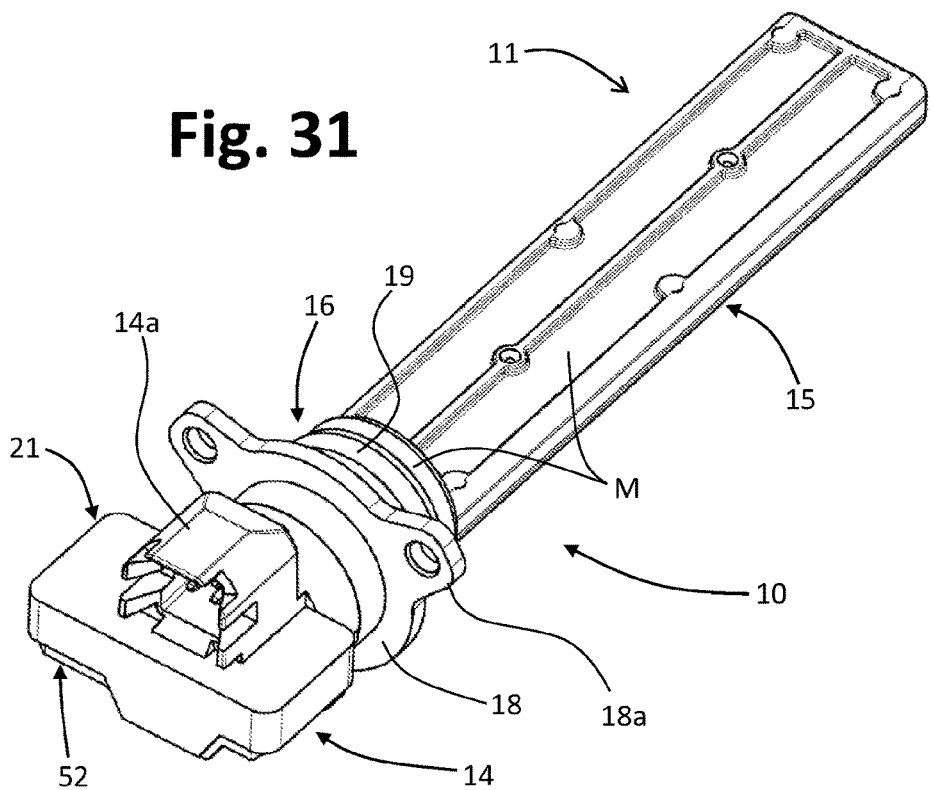
FIGS. 31 and 32 are, respectively, a schematic perspective view and a schematic partial cross section of a sensor device that can be obtained with the semi-finished product represented in FIG. 30.
Figure 32:
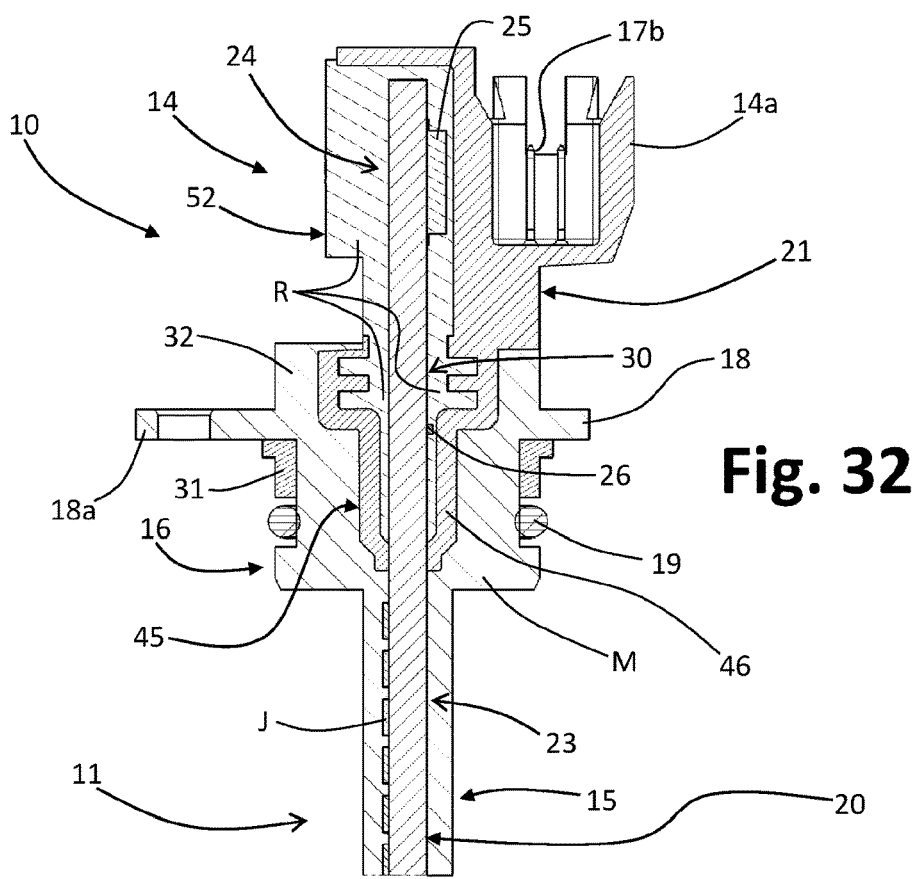

The result of the overmoulding operation is exemplified in FIG. 31, where the device 10 illustrated comprises the portion 15 and the mounting portion 16, the outside of the latter being prevalently obtained from the overmoulded material M at the shells referred to previously. The result may likewise be fully appreciated from FIG. 32, which illustrates the case of a shell 46 made of a single piece with the body part 21 (i.e., a shell 46 that integrates at least the connector body 14a and/or the electrical terminals 17). From this figure, it may be noted how the connection portion 14 is basically formed by the body part 21 and by a first part of the coating 52, a second part of which is located between the shells 45 and 46, surrounding the restricted portion 30 that bears the components 26, and thereby preventing the overmoulded material M from possibly reaching these components. Once again from FIG. 32, it may likewise be noted how, preferably, the inner profile of the shells 45, 46 is shaped for example, by means of projecting parts to favour anchorage of the resin R that forms the coating 52 and/or to render the shell more rigid and/or stronger.

For this purpose, it should be considered that, preferably, the material R of the coating 52 is relatively elastic or non-rigid, in particular in order to prevent mechanical stresses on the electronic components, for example stresses present during shrinkage subsequent to the step of moulding or overmoulding. Preferably, the material M of the body of the sensing portion 15 is, instead, relatively more rigid and/or dimensionally more stable, in particular in order to guarantee a greater dimensional stability of the seat 19a for the gasket 19. The presence of a further internal rigid structure, preferably formed by at least one of the shells 45, 46 made of an even more rigid material, contributes to obtaining an overall structural stiffness and/or the aforesaid dimensional stability of the seat 19a.

According to a preferential configuration (see FIGS. 25 to 32), the coating 52 is made of PA, the body 21 (or 21, 46) is made of PA66 or PPA, at least one of the protective bodies 45, 46 is made of PPS, and the body of at least the sensing portion 15 is made of HDPE.

It will hence be appreciated that, in various embodiments, at least a portion of the substrate 20 (such as an intermediate portion 30 and/or a restricted portion 30 and/or a portion 30 comprising electronic components 26), has a multilayer coating or casing that comprises at least three layers of material, such as the layers of material corresponding to the elements designated by R or 52, 45 and/or 46, M or 16, in particular three layers of materials different from one another and/or moulded in different steps. According to preferred embodiments, there may be provided also a further layer, represented by the aforesaid thin coating and protective layer made of polymer or resin (preferably of a conformal-coating type) applied on at least part of the substrate 20 prior to overmoulding of the material M.

It will likewise be appreciated that, according to other aspects in themselves autonomously inventive, a methodology of production of the device may envisage at least one of the following:

two distinct steps of overmoulding of at least one polymer M, R, or overmoulding of at least two different polymers M, R, in particular on at least part of the aforesaid protective body 45-46 or 46 or 21+46;

overmoulding of at least two different materials or polymers M, R, preferably both having melting or moulding or transformation temperatures comprised between 180° C. and 240° C.; and at least three distinct steps of moulding and overmoulding, such as:

moulding by itself of the aforesaid protective body 45-46, or 46, or 21+46, preferably with a polymer having a melting point higher than 260° C.;

overmoulding of a first polymer R on at least part of the aforesaid protective body and/or of the substrate 20, preferably a polymer having a melting point lower than 250° C.; and overmoulding of a second polymer M on at least part of the aforesaid protective body and/or of the substrate 20, preferably a polymer having a melting point lower than 250° C.

Also in this case at least part of the substrate may be previously coated at least partially by a thin protective layer of polymer or resin of the type mentioned previously. This thin protective layer may be applied for example via spraying or else by dipping the substrate 20 completely in a container containing the polymer or resin in question in a fluid state.

According to other embodiments not represented, a device similar to that of FIGS. 25-32 may envisage a shell or tubular body shaped for coating and insulating a proximal end area of the substrate 20 and/or the restricted portion 30, i.e., shaped for preventing the overmoulded polymer R from possibly penetrating into the shell or tubular body (i.e., enabling overmoulding of the covering 52 only on the outside of the aforesaid shell or tubular body).

According to other embodiments not represented, a device similar to that of FIGS. 25-32 may be obtained by providing a mould shaped differently to obtain the entire shape of the covering 52 on the proximal end area of the substrate 20 and/or on the restricted portion 30. After extraction from the mould, mounted on the semi-finished product that comprises the substrate 20 and the covering 52 is a protective body (for example, of the same type as the ones designated by 45-46, or 46 or 21+46). The semi-finished product may then be set in a further mould, for carrying out the further overmoulding of the material M necessary for formation of the sensing portion 15 and of at least one outer part of the mounting portion 16.

In various embodiments, the shell 45 may be omitted, keeping just the shell 46 coupled or formed integrally with the body part 21. Such a case is exemplified in FIGS. 33-35.

Figure 28:
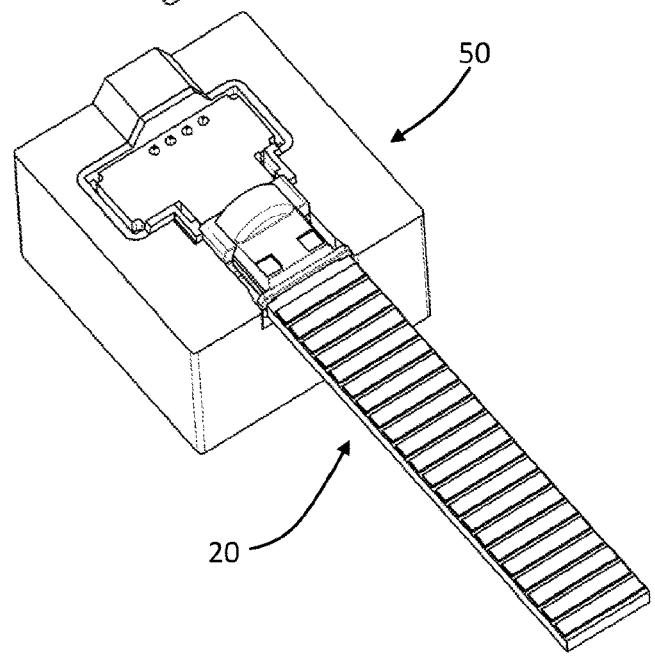
FIGS. 28-30 are schematic representations of moulding equipment that can be used for obtaining a semi-finished product that uses the components of FIG. 25.
Figure 29:
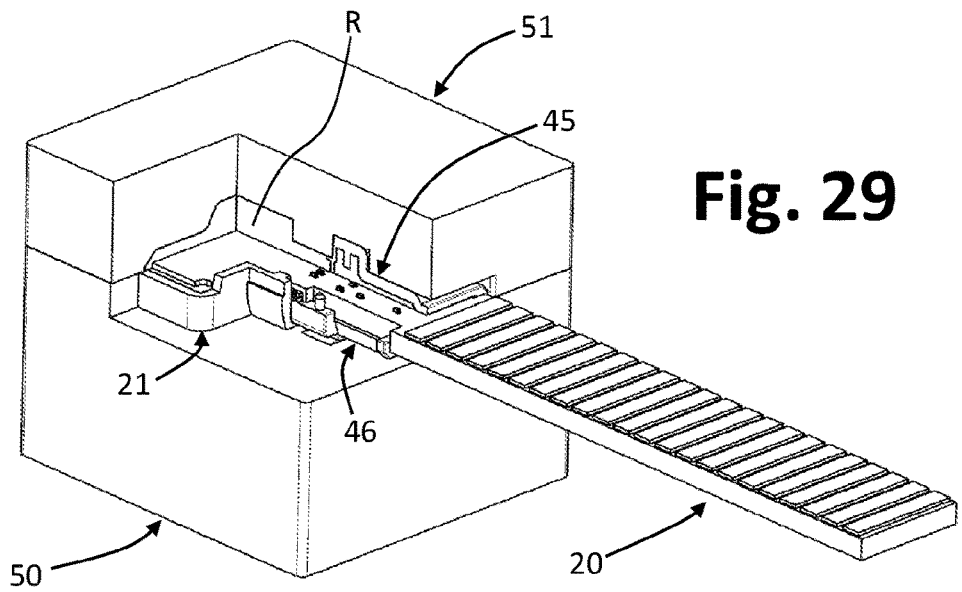
Figure 33:
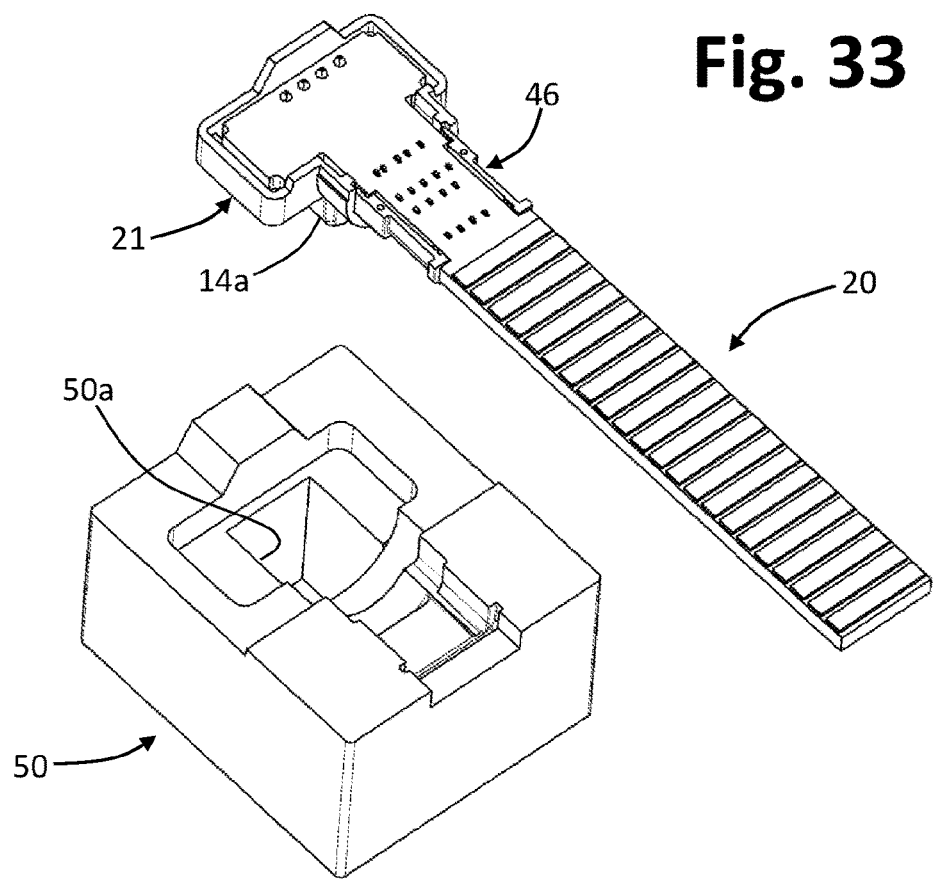
FIGS. 33 and 34 are schematic representations of moulding equipment that can be used for obtaining a semi-finished product that can be used in level-sensor devices according to possible embodiments of the invention.
Figure 34:
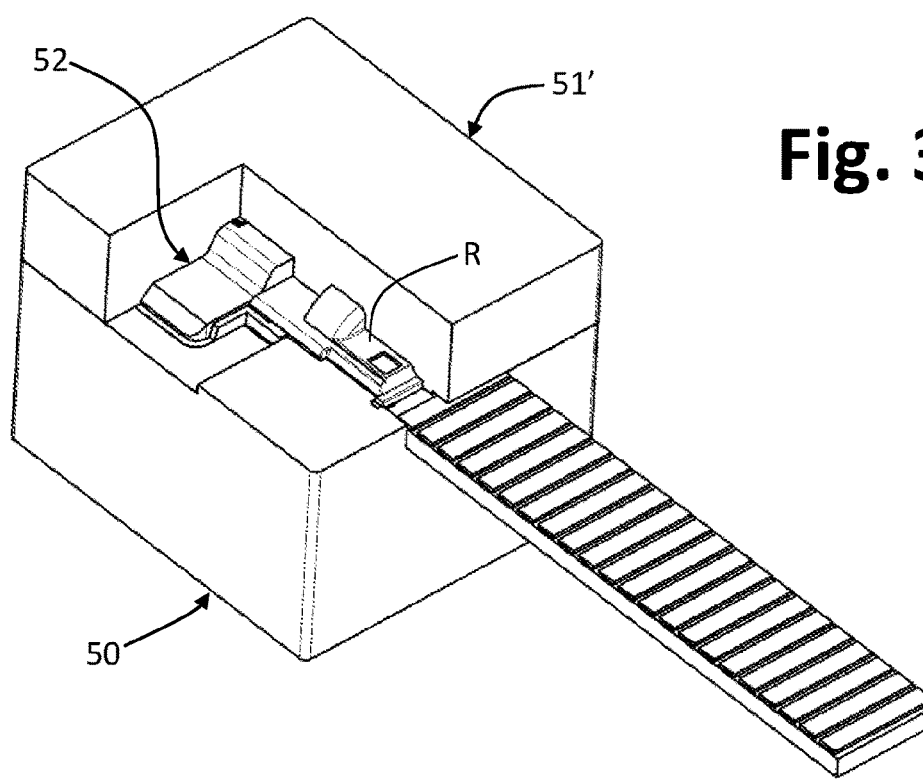

Visible in FIG. 33 is a mould part 50, of a conception similar to that of FIGS. 28-30, with corresponding impression 50*a* shaped for housing the body part 21 and the shell 46 (or a single body defining the body 21 and the shell 46 in a single piece). The second mould part, designated by 51' in FIG. 34, has instead an impression shaped to define the outer profile of the protective covering 52 made of the resin R. The semi-finished product obtained is visible in FIG. 35, from which it may be appreciated how the control portion of the substrate 24 is at least partially coated with the resin R of the covering 52 and/or at least partially set between at least part of the resin R of the covering 52 and the body part 21 with the shell 45.

Also in this case, the semi-finished product extracted from the mould 50-51', as may be seen in FIG. 35, may be positioned in a further mould, for carrying out overmoulding of the material M necessary for formation of the casing portions 15 and of the outer part of the mounting portion 16, as described just above.

The processes and structures exemplified with reference to FIGS. 28-32 and 33-35 enable the overmoulding for obtaining the portions 15 and 16 of the body of the device to be carried out without damaging the electronic components, possibly using materials having high dimensional shrinkage and/or high melting points, even at areas of the substrate 20 in which electronic components 26 are possibly mounted. As has been said, for this purpose, the aforesaid areas are protected by means of the shell or shells described and the protective resin R.

As has been said, the material M may be a high-density polyethylene (HDPE) with melting point of between 190° C. and 230° C., or some other material with similar melting point, such as a polybutene (PB) or a polypropylene (PP). In principle, it is possible to use materials with higher melting points, even of between 270° C. and 350° C., such as polyphthalamide (PPA), polyamide (PA66), and polyphenylene sulphide (PPS). In these cases, the substrate 20 will be made of an adequate heat-resistant material (for example, a polyimide PI), like the material of the shell 45 or shells 45-46 (for example, polyphenylene sulphide PPS).

In various embodiments, the substrate 20 may be completely or substantially completely embedded in the overmoulding material M, preferably a thermosetting material. In solutions of this type, then, the portions 14, 15, and 16 of the body of the device may be made of the overmoulded material M, with possible addition of other auxiliary body parts.

In embodiments of this type, there may be envisaged a positioning and/or supporting element for the terminals 17, which will also be associated to and/or at least partially englobed in the overmoulded material. For example, FIGS. 36 and 37 illustrate a possible embodiment of such a support, designated by 60, having a body made of plastic or polymeric material (for example, a thermosetting material, preferably the same material M, or a polyphenylene sulphide PPS) that is overmoulded on the terminals 17, the latter preferably being obtained starting from a metal strap via blanking and/or deformation operations.

Figure 38:
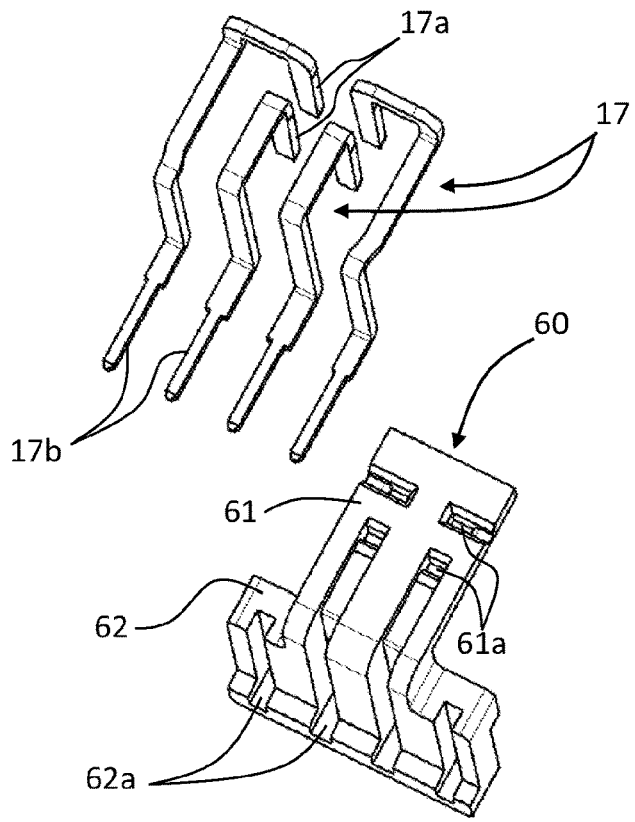
FIGS. 38 and 39 are schematic perspective views, from different angles, of a component similar to that of FIGS. 36-37, according to a variant embodiment.
Figure 39:
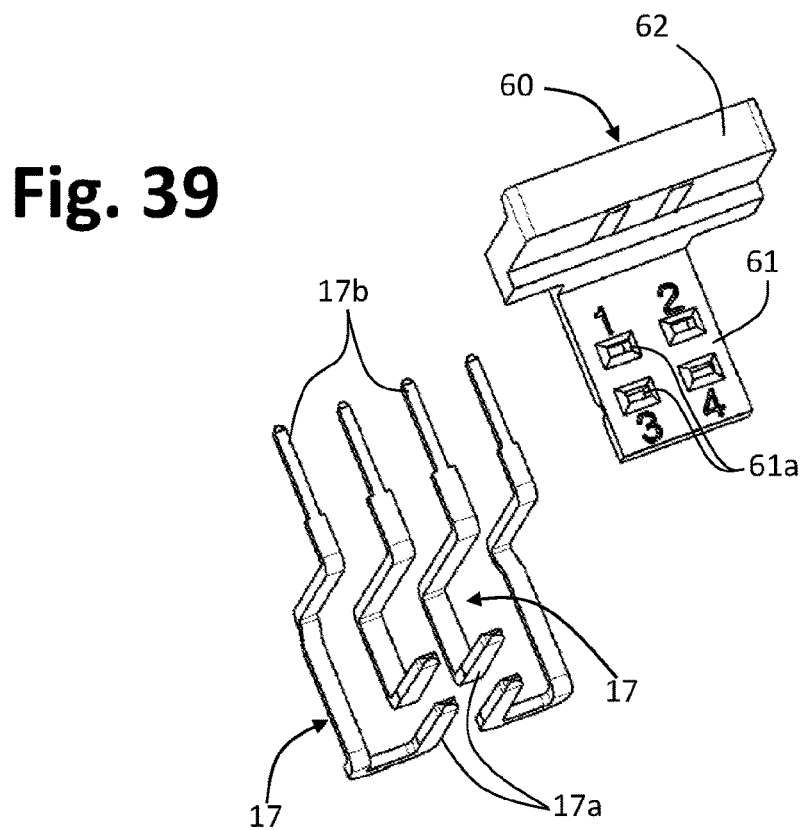

In the example illustrated, the body of the support 60 includes two walls 61 and 62 substantially orthogonal to one another, orthogonally projecting from which are the portions 17*a* and 17*b* of the terminals, respectively, which are purposely shaped. Preferably, the arrangement is such that also the portions 17*a* and 17*b* of one and the same terminal 17 are substantially orthogonal to one another, albeit not excluded are different orientations. Instead of a direct overmoulding of the material of the body of the support 60 on the shaped terminals 17 it is also possible to pre-arrange previously the body itself, by forming in its walls 61 and 62 suitable seats and/or passages 61*a* and 62*b*, as exemplified in FIGS. 38 and 39, for subsequent installation of the terminals 17. The aforesaid seats and/or passages 61*a* and 62*b* may comprise positioning and/or fixing means for the terminals 17, for example of the interference-fit type, designed to enable handling of the semi-finished product comprising the support 60 and the terminals 17, in particular for production purposes, up to a more complete fixing following upon soldering on the support 20 and/or overmoulding of the material of the portion 14.

Advantageously, the support 60 may be shaped differently from what has been illustrated, for example to provide also the connector body 14*a*.

Figure 43:
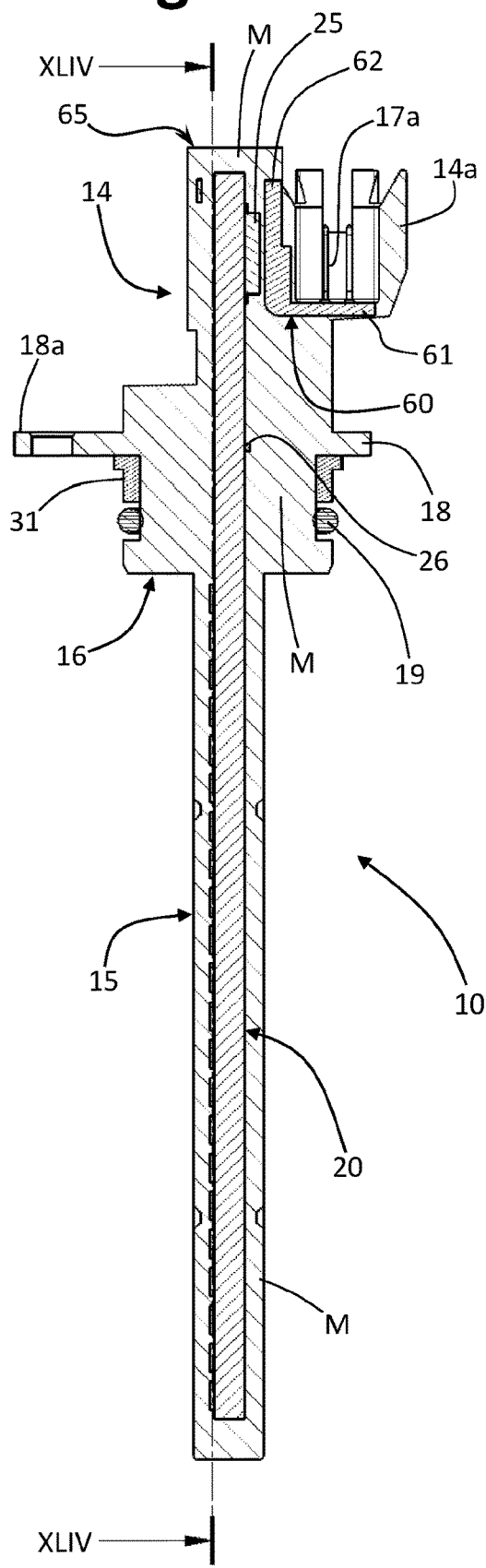
FIGS. 43 and 44 are schematic sections according to the line XLIII-XLIII of FIG. 42 and the line XLIV-XLIV of FIG. 43, respectively.
Figure 44:
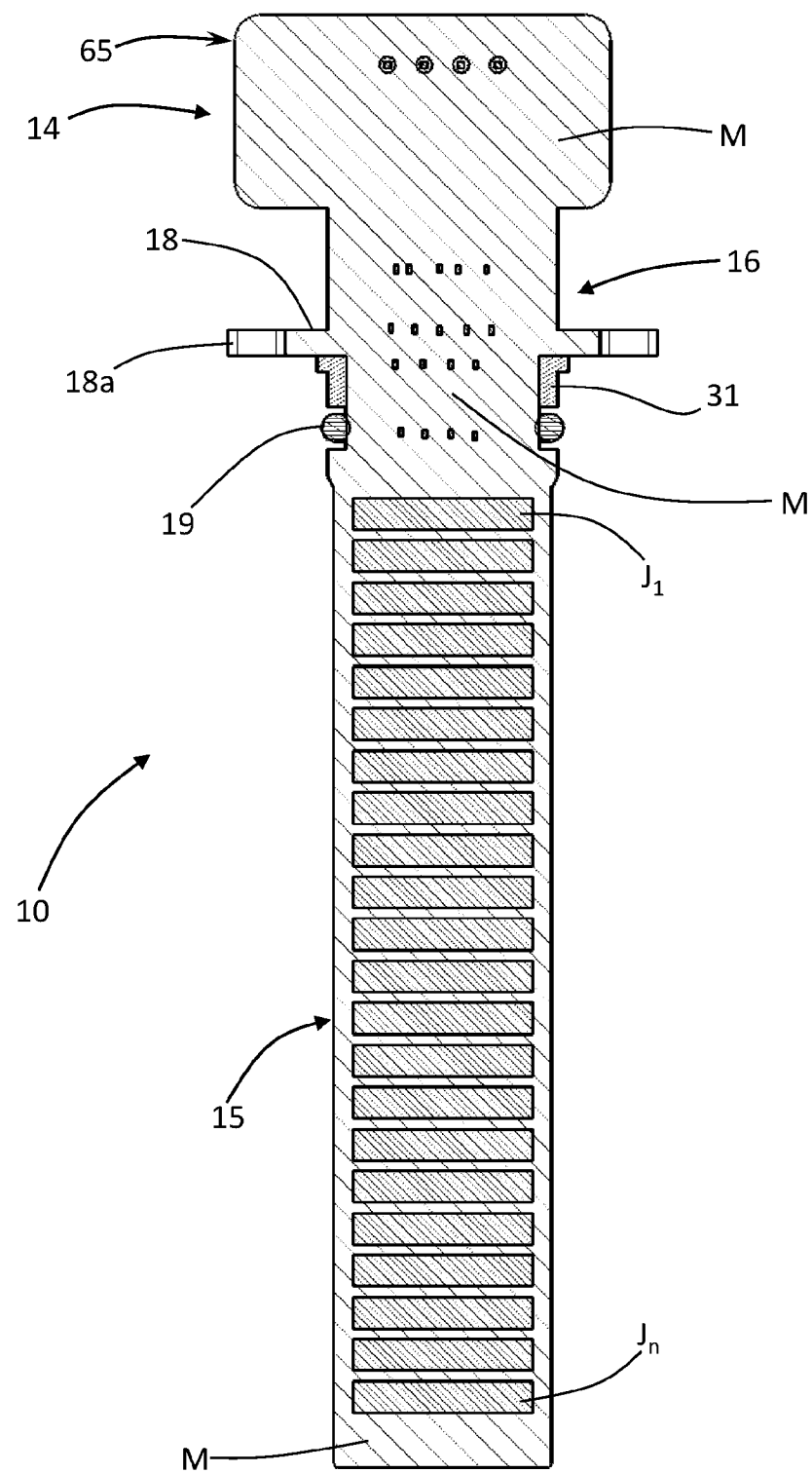

After pre-arrangement of the support 60, for example as visible in FIGS. 36-37, the shaped ends 17b are coupled to the corresponding electrical-connection holes or pads 24a of the region 24 of the substrate 20, as in FIG. 40, thus making the necessary electrical connection. FIG. 40 illustrates the case of soldering with application of material T, for example tin, but, as has been said, other electro-mechanical connection modalities are possible, for example of a press-fit type. Following upon the above connection, the walls 61 and 62 of the support 60 are substantially perpendicular and parallel, respectively, to the substrate 20 (as visible also in FIG. 43). In this way, the portion 17a of the terminals 17 is substantially parallel to the substrate 20. According to other embodiments not represented, the portion 17a of the terminals 17 may instead be perpendicular to the substrate 20.

Next, the semi-finished product of FIG. 40 i.e., the substrate 20 with the terminal support 60 is set in a suitable mould, the parts of which define respective impressions configured for defining the outer profile of the body of the device. In various embodiments, the overmoulded material M is chosen from among thermosetting materials, which have the characteristic of being mouldable at lower pressures as compared than thermoplastic materials and have a coefficient of thermal expansion similar to that of the material constituting the substrate 20, which is preferably FR4. As an alternative to the use of a thermosetting material, the overmoulded material M may be a suitable resin, for example an epoxy resin, or some other type of polymer designed for the purpose.

A device that may be obtained according to what has just been described is exemplified in FIGS. 41-44. In the case exemplified, the ring 31 is also provided, but this is an optional characteristic of the solution. The conformation of the body of the device is clearly visible in the sectional views represented in FIGS. 42-44, from which it may be noted how the substrate 20 is practically completely embedded in the overmoulded material M, including a portion 65 that surrounds the proximal end area of the substrate itself and at least part of the terminal support 60, and that preferably provides also the connector body 14a, extending within which is the portion 17a of the terminals. In solutions of this type, then, also the electrical and/or electronic components 25, 26 are embedded in the overmoulded material M, possibly after application of a coating via a thin protective layer of polymer or resin, for example of a conformal-coating type, in particular to define a multilayer covering.

In various embodiments, the body of the device is overmoulded so as to coat the substrate substantially completely, however leaving exposed one or more limited areas thereof, necessary for enabling subsequent mounting and electrical connection of electrical interconnection elements, such as a connector. Solutions of this type are particularly advantageous, as compared to the ones represented in FIGS. 36-44, when one and the same configuration of sensor 10 has to being provided with some variants of electrical connection to an external system. An example in this sense is represented schematically in FIGS. 45-51.

Figure 45:
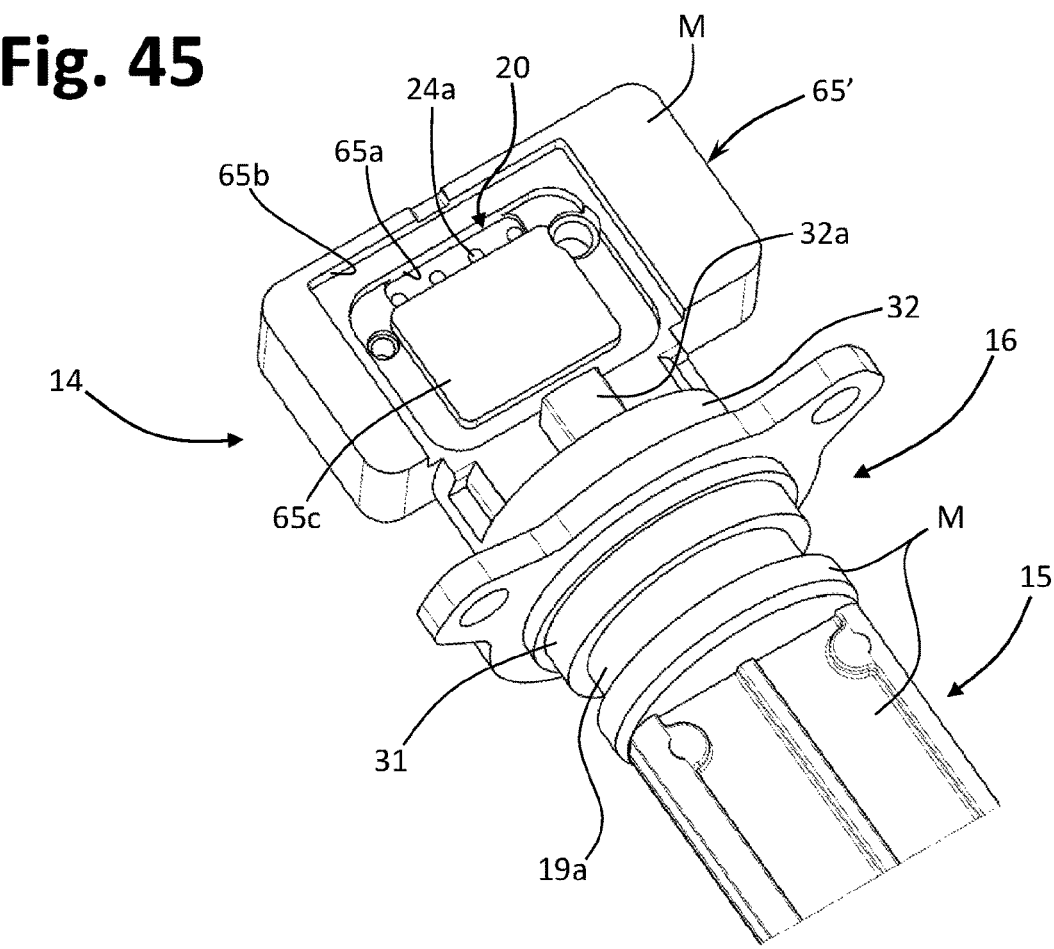
FIGS. 45 and 46 are partial and schematic perspective views of respective semi-finished products that can be used in level-sensor devices according to further possible embodiments of the invention.
Figure 46:
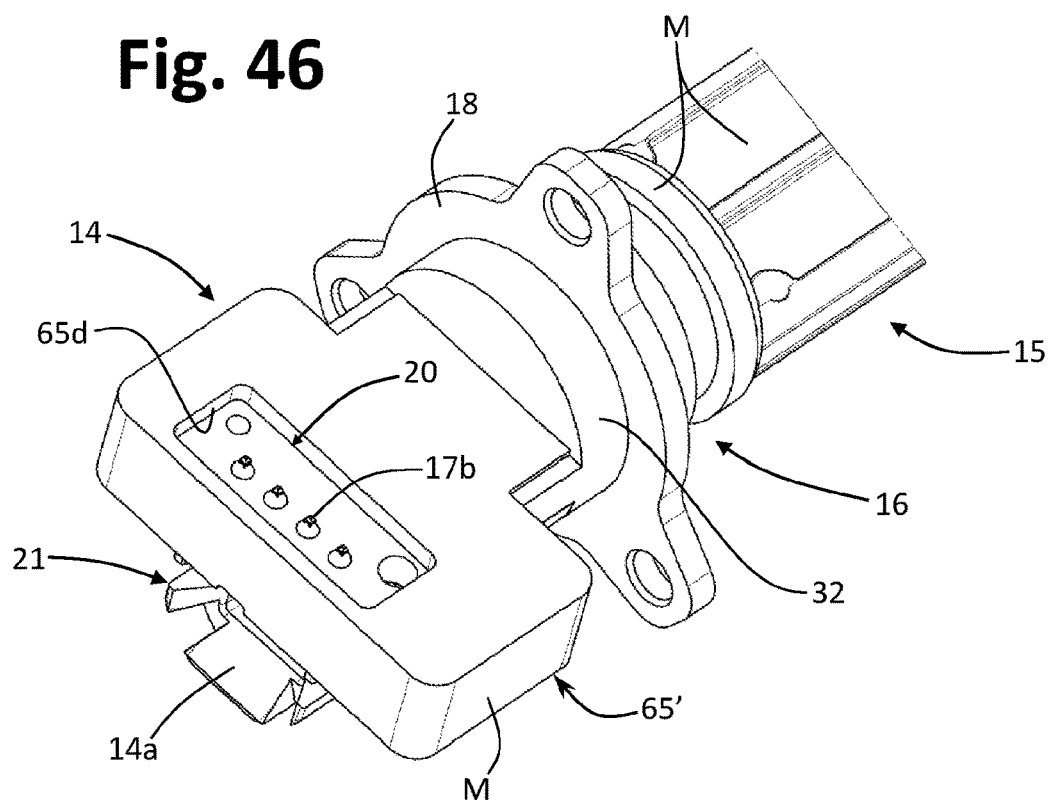

With initial reference to FIGS. 45-46, the body of the device is mostly made by overmoulding on the circuit board 20 the material M, preferably a thermosetting material or a resin. The overmoulded material M includes a part 65' designed to enclose the proximal end portion of the substrate itself, leaving small areas thereof necessary for making of the electrical connection exposed. With reference in particular to FIG. 45, the part 65' is preferably overmoulded so as to present a first opening 65a that leaves a first area of the substrate 20 exposed, herein at its major face bearing the controller 25, where the first end of the electrical-connection holes or pads 24a is located. Preferably, this opening 65a is formed within a recess or seat 65b defined by the overmoulded material M, possibly including a layer 65c that coats the controller and/or at least one part of the electronic circuit. In the case exemplified, the material M also defines the fixing part 32, with a corresponding formation 32a. The part 65' is preferably overmoulded so as to present a second opening, which leaves also a second area of the substrate 20 exposed, at the second major face of the latter, where the second end of the connection holes 24a is located. This second opening is designated by 65d in FIG. 46 (note that this figure illustrates the condition where the terminals are already connected). In alternative embodiments, the aforesaid first and second openings could even be absent, for example in the case of connections of the terminals 17 to the support 20 via connections of a press-fit type or other electrical tab connections, previously welded to the substrate 20 and projecting from the overmoulding material M.

Figure 47:
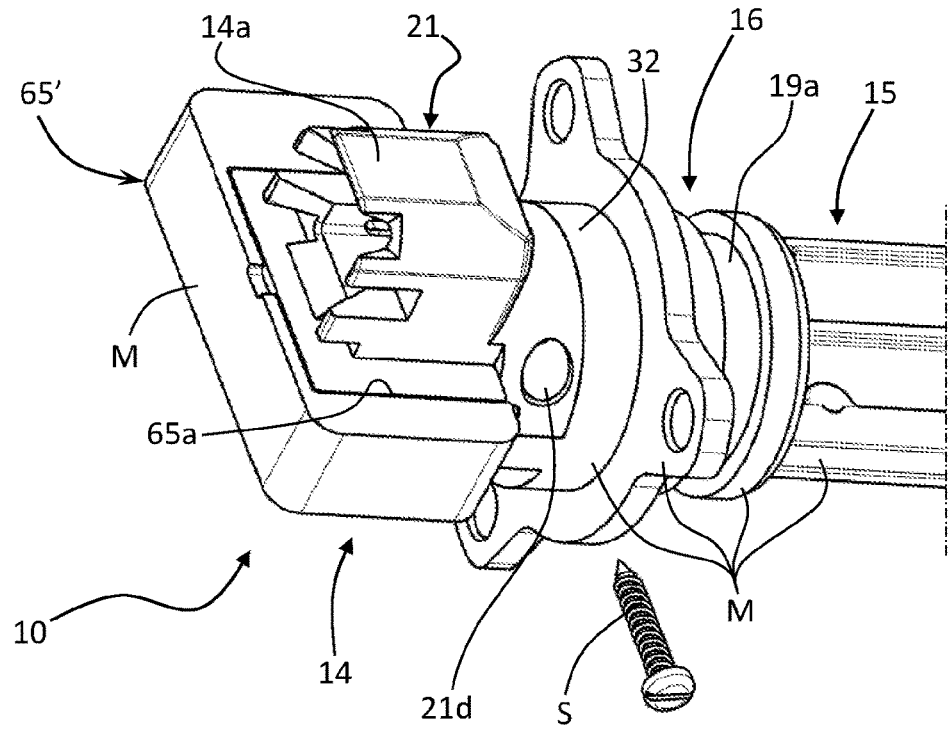
FIGS. 47 and 48 are schematic perspective views of a level-sensor device that uses the semi-finished product of FIG. 46.
Figure 48:
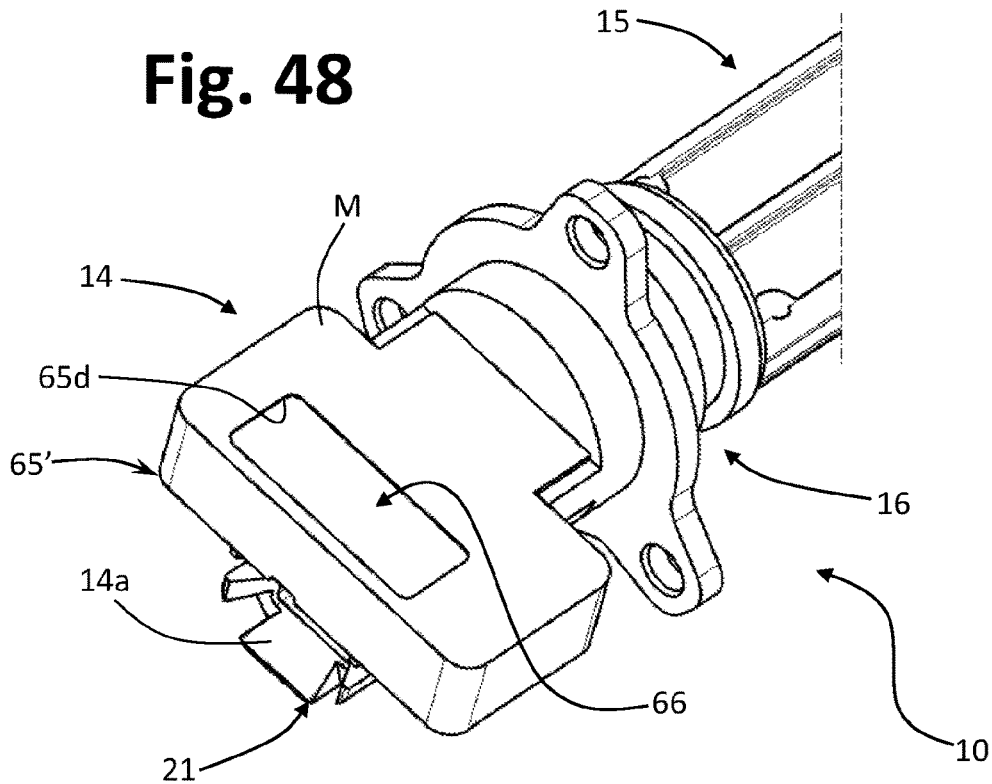

Next, mounted at the seat 65b of FIG. 45 is a body part 21 integrating a connector body 14a with the corresponding terminals 17, as illustrated in FIG. 47. The part 21 may have a mechanical-connection arrangement similar to that of FIG. 4, i.e., with axial seat (similar to the one designated by 21b in FIG. 4), delimited laterally by two walls provided with respective coaxial holes (similar to the ones designated by 21c and 21d in FIGS. 4 and 3), for coupling with the formation 32a (FIG. 45), according to the modalities already described previously, and hence with the aid of a screw S or other engagement means. Following upon positioning of the body part 21 in the seat 65b of FIG. 45, the portions 17b of the terminals are connected to the corresponding connection elements 24a of the substrate 20, in order to provide a connection of a press-fit type or else, as in the case exemplified in FIG. 46, a connection with soldering at the opposite face of the substrate 20, thanks to the presence of the opening 65d defined by the overmoulded material M. Next, the opening 65d may be closed, for example via further overmoulding or by applying a suitable sealing resin 66 that fills the opening 65d, as exemplified in FIG. 48, or else via a purposely provided lid. In the case of application of a lid, there may in any case be previously provided application of a thin layer of resin.

Figure 51:
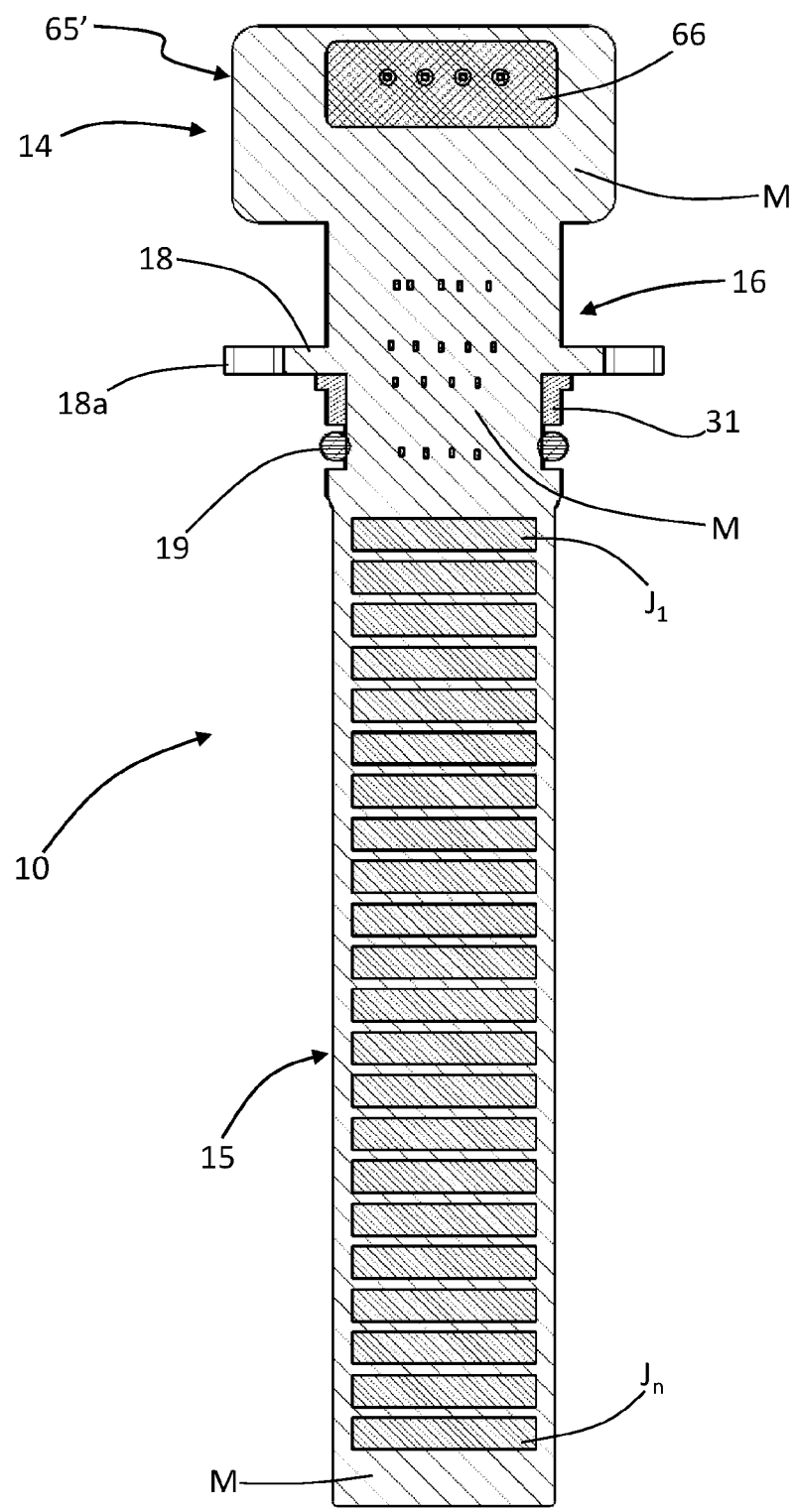

The device 10 thus obtained is visible in the cross-sectional views appearing in FIGS. 49-51, where it may be noted how, in this case, the overmoulded material M defines practically entirely the casing body of the device 10 that encloses the substrate 20, and hence its portions 14, 15, and 16, with the fixing part 32 and the part 65'. The only further elements, in addition to the possible ring 31, are represented by the body part 21 that integrates or defines the electrical connector and the resin or lid 66.

In the previous figures, the electrodes J, J' have been represented schematically as having a substantially rectangular geometrical configuration. This shape is not, however, to be deemed essential in so far as, in various embodiments, the electrodes associated to one or both of the faces of the substrate 20 may have a different shape.

In embodiments in themselves autonomously inventive, i.e., even in the absence of a restricted portion of the circuit substrate 20, instead of rectangular electrodes, electrodes of a different shape or with irregular profile are provided, such as electrodes having a chamfer at least at two opposite lateral ends (i.e., basically with chamfered corners at at least one of the corresponding transverse or lateral sides) and/or electrodes with a recess or a restricted portion in a respective intermediate or central area. Embodiments of this type are exemplified in FIGS. 52-54.

Figure 52:
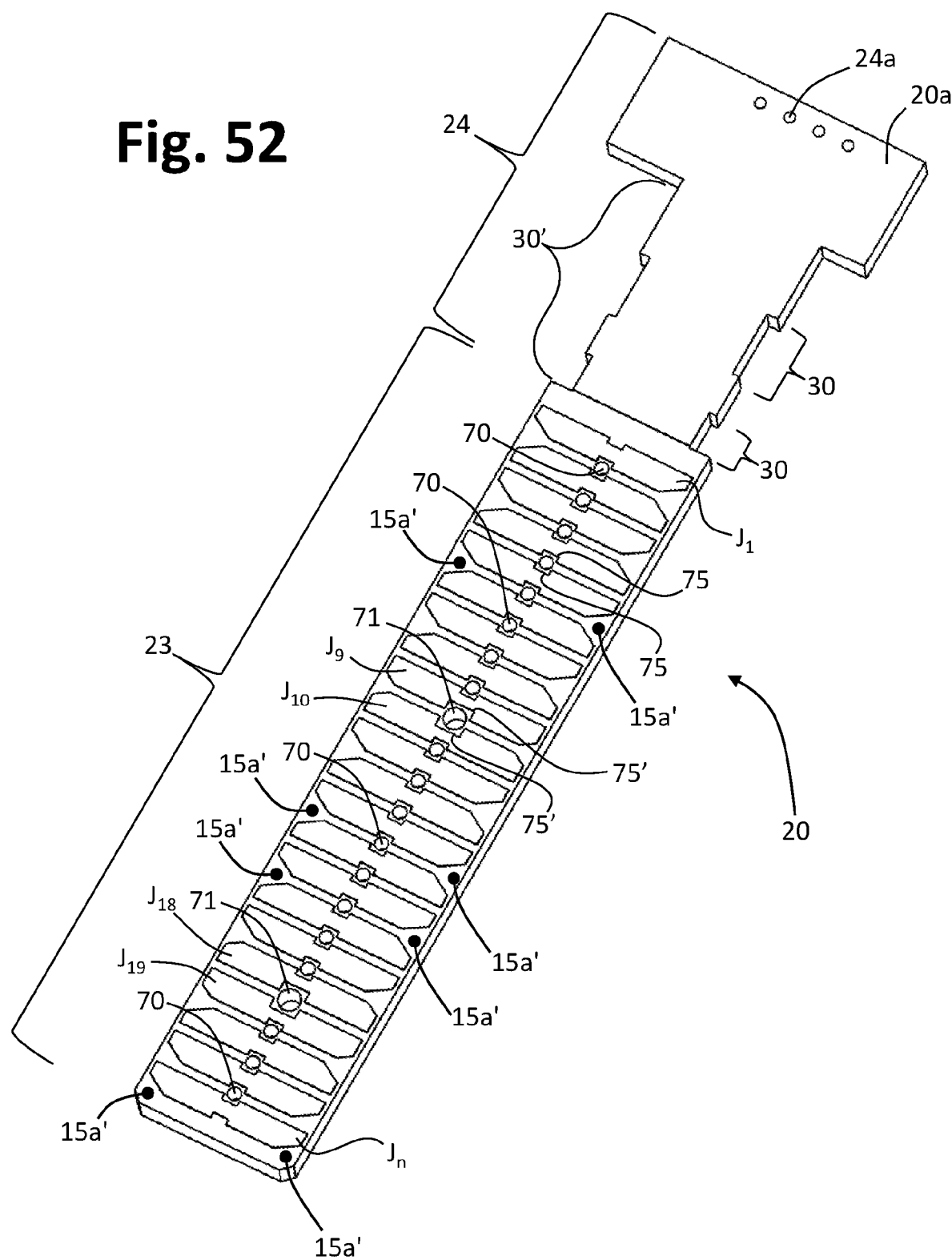
FIG. 52 is a schematic perspective view of a circuit component that can be used in level-sensor devices according to embodiments of the invention.
Figure 53:
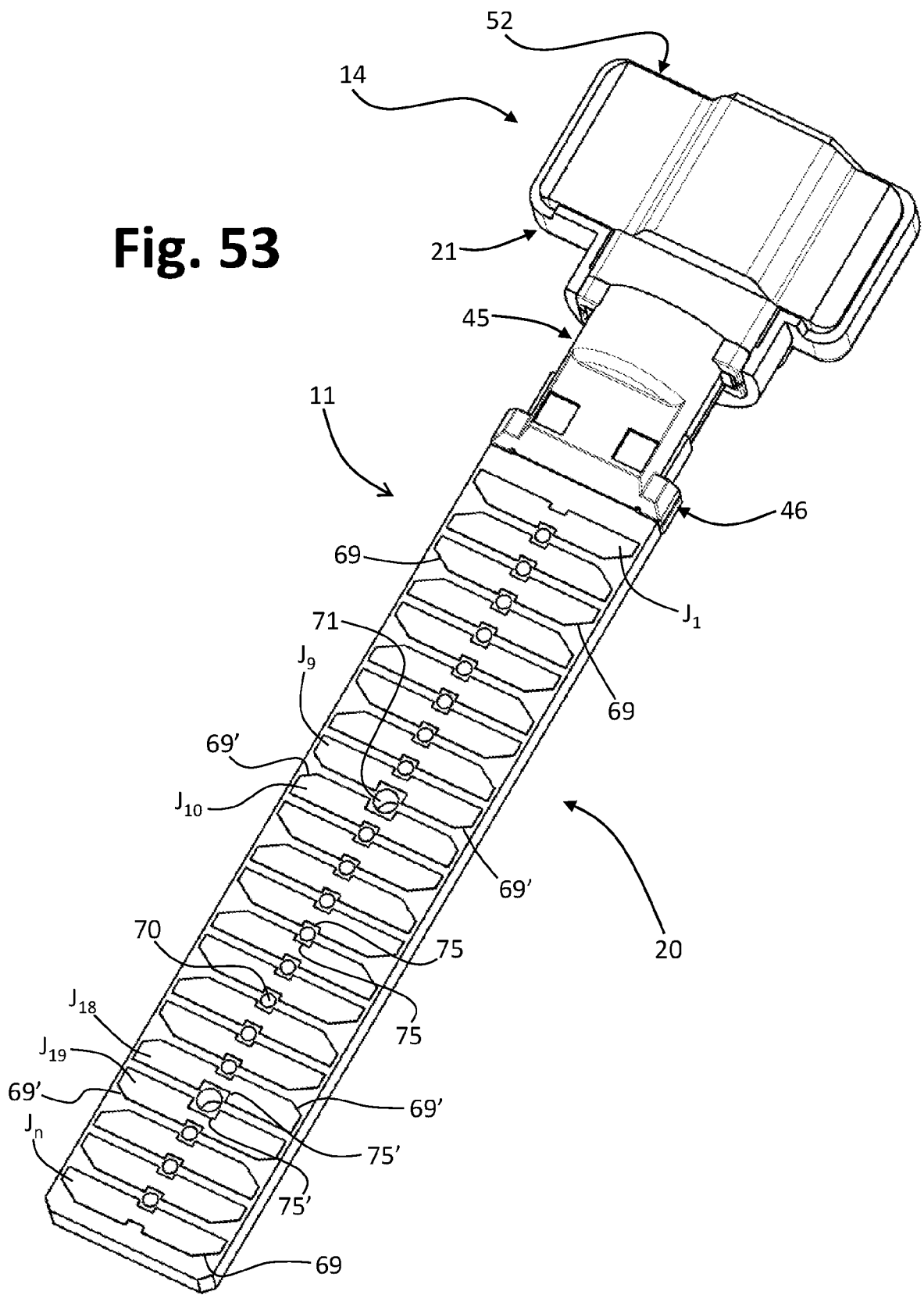
FIG. 53 is a schematic perspective view of a semi-finished product that uses a component of the same type as the one represented in FIG. 52.

The chamfers of some of the electrodes J are designated by 69 and 69' in FIG. 53, whereas the recesses of some of the electrodes J are designated by 75 and 75' in FIGS. 52 and 53. The shape of the electrodes, of the chamfers, and of the recesses are here exemplified via linear stretches; however, their profiles could be different, for example obtained via curved stretches or combinations of curved and linear stretches or complex profiles.

In various embodiments, two adjacent electrodes J are arranged with the aforesaid chamfered corners in specular positions so as to leave a respective area of the region 23 of the substrate 20 exposed. In the example illustrated, these exposed areas some of which are designated by 15a' in FIG. 52 have an approximately triangular or trapezial shape; however, the aforesaid sharp edges of the electrodes J could be rounded with different shapes, for example with a curved profile, so as to delimit substantially semicircular areas 15a' or the like. In various embodiments, at least some of the electrodes J are shaped so as to define respective passages or recesses, such as the recesses designated by 75' in FIGS. 52 and 53, in order to determine the presence of exposed areas of the substrate 20.

In embodiments in themselves autonomously inventive, i.e., also in the absence of a restricted portion 30, the circuit substrate 20 has a plurality of through openings at least in its sensing region, preferably arranged in the longitudinal direction of the region itself, and very preferably aligned to one another in the aforesaid direction, where the through openings are occupied by respective parts of the overmoulded material M that is to provide the sensing portion 15 of the casing body of the device.

An example of such an embodiment is illustrated in FIG. 52, where some of the aforesaid openings—in the form of circular holes—are designated by 70 and 71. The presence of the openings 70 and 71 enables a decided improvement in the flow of the material M in the molten state injected in the mould, during the overmoulding step, between the two opposite impressions of the mould parts used. The presence of the openings likewise improves fixing of the solidified material M of the portion 15 of the body of the device 10—which is the one that is longitudinally most extensive— to the circuit substrate 20, to the advantage of structural strength.

Preferably, the portions of the coating and insulating material M present in the openings 70 and 71 provide a bridge or a connection between the material of the opposite surfaces 20a and 20b of the substrate 20 and improve fixing of the material itself with respect to the aforesaid surfaces 20a and 20b. For example, the above bridges or connections are useful to prevent the material M of the portion 15 from possibly detaching and/or moving away from the surfaces 20a and 20b and/or from the electrodes J, and/or to prevent any axial movement or sliding of the material M of the portion 15 on the surfaces 20a and 20b, for example following upon different degrees of expansion of the materials at the different temperatures. In this regard, it should be considered that the different degrees of expansion due to temperature, for example of the material M of the portion 15 and the material of the substrate 20, could lead to detachment and/or mutual sliding such as to determine alterations or errors in the measurement (for example, also on account of interposition of an albeit minimal layer of air, or else on account of damage to electrodes and/or conductive paths and/or electronic components owing to repeated microrubbing of the material M with respect to the substrate 20).

According to possible variants not represented, for the purposes of a better fixing of the overmoulding material M to the substrate 20 and/or in order to prevent mutual axial movements, the substrate has seats and/or reliefs at its lateral faces 20c and/or 20d.

As already mentioned, in embodiments in themselves autonomously inventive, i.e., also in the absence of a restricted portion of the circuit substrate 20, and in the presence of an array of openings 70, 71, the electrodes are shaped so as to define respective passages or recesses at the aforesaid holes.

With reference, for example, to FIGS. 52 and 53 it may be noted how the electrodes J define respective recesses, some of which are designated by 75, in an intermediate area of their transverse sides: as may be noted, the openings 70 occupy partially the facing or specular recesses 75 of two adjacent electrodes J. As will be appreciated, also the presence of these recesses 75 enables the electrodes J to be kept sufficiently close to one another in the direction of the level-sensing axis, to the advantage of sensitivity and resolution of measurement of the sensor device. The preferred presence of recesses 75 on both of the transverse sides of each electrode J makes it possible to have a series of geometrically equal or specular electrodes, with a consequent uniformity of the corresponding capacitance, i.e., a uniformity of detection of the capacitance or of the electrical field at each electrode. Even in the presence of a number of openings 70 decidedly smaller than that of the electrodes J it is hence in any case preferable for all the electrodes to be provided with recesses 75 or in any case with equivalent surfaces.

In various embodiments, such as the one exemplified in FIGS. 52-53, the array of openings provided in the substrate includes first openings 70 and second openings 71 different from one another, in particular first openings 70 having a smaller diameter or section of passage than second openings 71. The larger openings 71, when they are envisaged, have the function of providing resting seats or points for positioning and/or centring elements of the overmoulding mould, as exemplified hereinafter.

For this reason, in preferred embodiments, the adjacent electrodes between which an opening 71 is located are provided on the respective transverse facing sides—with recesses 75' that are more extensive than the recesses 75 provided at the openings 70. The concept may be appreciated from FIGS. 52 and 53, with reference to the facing recesses 75' of the electrodes $J_9$ and $J_{10}$ (FIG. 52) and to those of the electrodes $J_{18}$ and $J_{19}$ (FIG. 53). In this way, notwithstanding the presence of wider openings 71, the electrodes J of the series can be kept sufficiently close, at a substantially constant distance, in the direction of the sensing axis.

The fact that certain electrodes of the series here the electrodes $J_9$, $J_{10}$, $J_{18}$, and $J_{19}$ in FIG. 52—have wider recesses 75' is compensated by the presence, on the electrodes themselves, of chamfers 69' that are more limited than the chamfers 69 of the other electrodes of the series in such a way that all the electrodes of the series in any case have the same useful surface. In other words, hence, even though the electrodes $J_9$, $J_{10}$, $J_{18}$, and $J_{19}$ have a shape geometrically different from the other electrodes $J_1$-$J_7$, $J_{11}$-$J_{17}$ and $J_{10}$-$J_{22}$, the surface of all the electrodes $J_1$-$J_{22}$ remains substantially the same, with consequent uniformity of the corresponding capacitance or electrical field, and uniformity of detection at each electrode.

The presence of the exposed areas determined by the presence of the chamfers and/or of the recesses mentioned previously is advantageously envisaged for enabling resting of appropriate centring and/or positioning elements of the mould used for overmoulding of the material M, where these elements are designed to recede during the moulding step in a strict sense, i.e., the step of injection of the material in the mould. For a better understanding of this aspect, FIG. 55 exemplifies schematically possible moulding equipment, similar to the equipment represented in FIGS. 9-11. As may be noted, in the example, the two mould parts 41 and 42 each define at least one respective housing in which movable inserts or plugs 44 are mounted (assume that the aforesaid elements that are not visible in relation to one of the two mould parts 41, 42 and of the two plugs 44 are made in a way similar to the ones visible in relation to the other mould part or carriage).

Defined on the bottom of each housing 42f are passages 42d, 42e engaged in which are respective portions 44a and 44b of the inserts 44, projecting from which are corresponding positioning and/or centring elements 44' and 44", respectively. Corresponding to each positioning and/or centring element 44', 44", within the impression 42a of the corresponding mould part 41, 42, is a corresponding hole, some of such holes being designated by 42b, 42c.

When the two mould parts are closed with the circuit substrate set in between (as in FIG. 10), the positioning and/or centring elements 44', 44" project from the corresponding holes 42b, 42c within the impressions, bearing upon respective points of the two faces of the substrate, represented by the exposed areas designated by 15a' and/or by the exposed areas determined by the recesses 75' of the electrodes J with the corresponding through openings 71 of the substrate: in this way, the substrate itself is held in position and/or centred with respect to the impressions 42a facing the two mould parts.

After start of injection of the material M into the mould 41, 42, when the impressions have been at least partially filled with the material in the molten state, the inserts 44 are made to recede slightly, causing a corresponding recession of the positioning and/or centring elements 44', 44" so that in any case also the areas 15a' will be covered by the overmoulding material and the exposed areas determined by the recesses 75' and the openings 71 will be filled therewith. In these areas and holes, however, the overmoulding material M could be thicker, for example in the form of cylindrical or semi-cylindrical or annular portions, such as the ones designated by 15a and 15a' in FIG. 54.

If in these thicker portions of the overmoulding material an underlying portion of a rectangular electrode were present (i.e., in the absence of variations of the profile of the electrodes, such as the chamfers 69, the exposed areas 15a', and the exposed areas determined by the recesses 75'), the aforesaid electrode portion would be insensitive or less sensitive to the capacitive detection of level, precisely on account of the large insulation thickness determined by the overmoulded material of the aforesaid cylindrical portions 15a or annular portions 15a'. In other words, the active surface (or capacitance or electrical field) of certain electrodes would be smaller than that of other electrodes of the same array, with consequent lower or different sensitivity and hence lower sensing precision, due to a non-linear detection in the aforesaid areas with electrode portions covered by a greater thickness of overmoulded material. Again in other words, the first electrodes not covered by the thicker portions 15a, 15a' would have a first capacitance or electrical field (which is higher), whereas the second electrodes partially covered by the portions 15a, 15a' would have a second capacitance or electrical field (which is lower): the level measurement would hence be vitiated at the aforesaid second electrodes.

On the other hand, according to the solution described herein, the fact of providing all the electrodes J with a profile distinguished by chamfers and/or recesses—also where resting of elements for centring of the mould of the type designated by 44', 44" is not envisaged, and hence also where the presence of thickened portions of the material M is not envisaged—makes it possible to have a series of electrodes that are the same or equivalent at the level of electrically active surface or area, with a consequent uniformity of the corresponding capacitance or electrical field, i.e., uniformity of detection at each electrode J.

This uniformity between the active surfaces or areas of the electrodes J may be useful also for the purposes of a more correct and convenient compensation of the variations of capacitance or of the electrical field at the various temperatures. For example, by detecting at different temperatures the variations of capacitance or electrical field of a reference electrode having a pre-defined surface, such as a first electrode $J_1$ close to a temperature sensor 27a, it is possible to make compensations in temperature of the capacitance or electrical field of all the other electrodes J having the same active surface or area as that of the compensation electrode $J_1$ (whereas compensation of electrodes having a different active surface or area could be vitiated or problematical).

It should be noted, with reference to FIG. 52, that in various embodiments the last electrode J at the distal end of the sensing region 23 (electrode $J_n$) has an orientation similar to that of the last but one electrode in the series, i.e., without any chamfers in specular positions between the aforesaid two electrodes. This, however, enables definition of two corresponding areas 15a' at the end part of the substrate 20, if also in this part the thickened portions 15a were to be envisaged.

The presence of chamfers 69 between two adjacent electrodes J enables the latter to be kept sufficiently close to guarantee a good level-measurement resolution, instead of having to set the electrodes at a distance to such an extent as to define between them sufficiently wide areas for receiving, during moulding, the positioning elements 44', 44" or, following upon moulding, thickened portions of the casing, of the type designated by 15a, 15a'. Moreover, the fact that the areas 15a' are defined via chamfers 69 of two adjacent electrodes enables minimization of the reduction of active surface of each electrode. As explained, the sensitivity of the sensor device depends upon the value of capacitance or electrical field, which is a function of the surface of the electrodes: provision of chamfers or recesses on pairs of adjacent electrodes in any case enables a wide surface to be maintained for the electrodes themselves, as compared to the case of a reduction of their width.

Irrespective of the specific conformation of the electrodes J, FIG. 52 is aimed at illustrating also how, in various embodiments, the control region 24 of the substrate 20 can include even more than one restricted portion 30.

In configurations of this type, the presence of the wider part of substrate 20 comprised between the two restricted portions 30 (which here, in any case, has a smaller width than the sensing region 23) enables further improvement of the anchorage of the overmoulded material M to the substrate itself.

Figure 54:
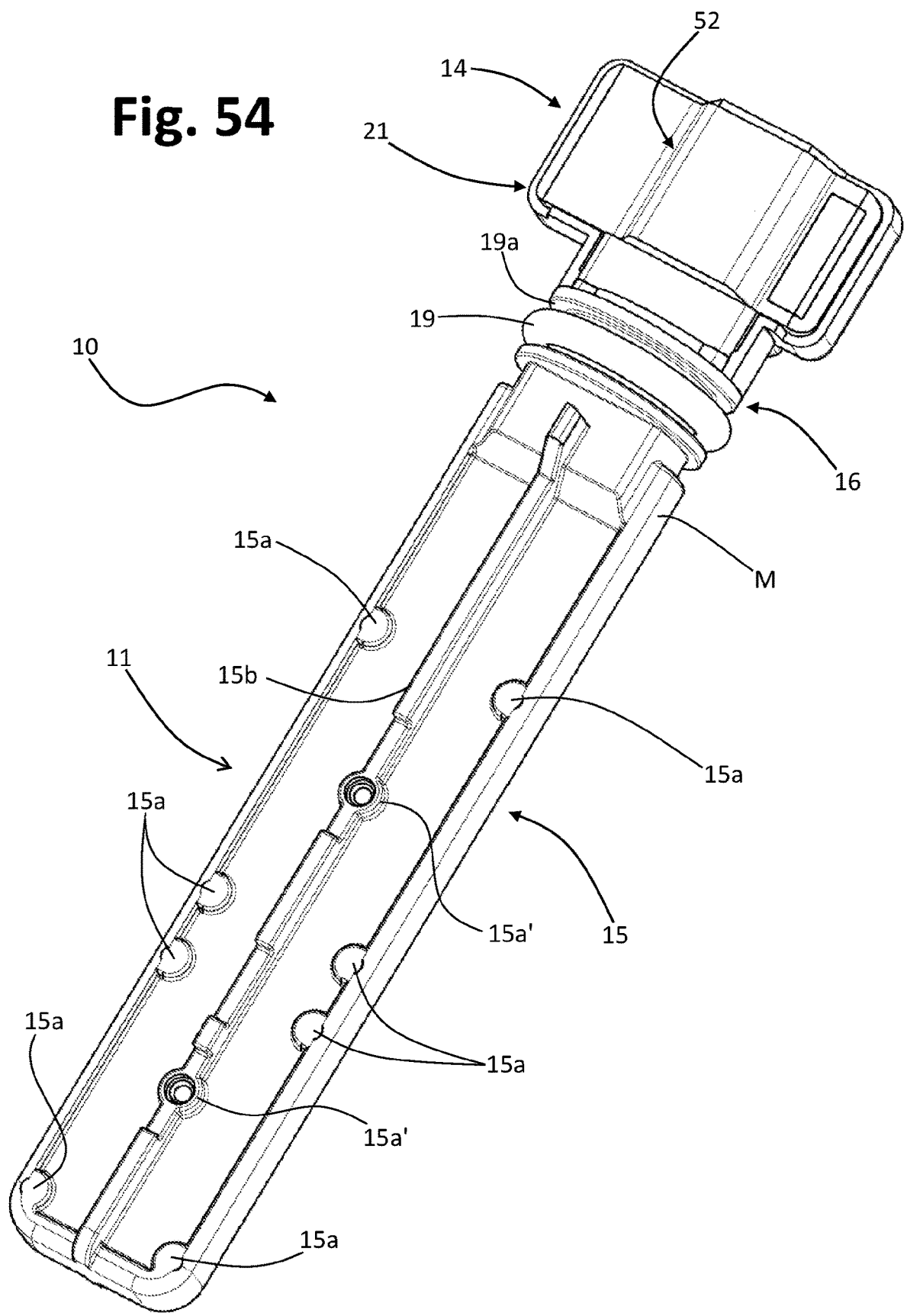
FIG. 54 is a schematic perspective view of a level-sensor device that uses a semi-finished product of the same type as the one represented in FIG. 53.
Figure 55:
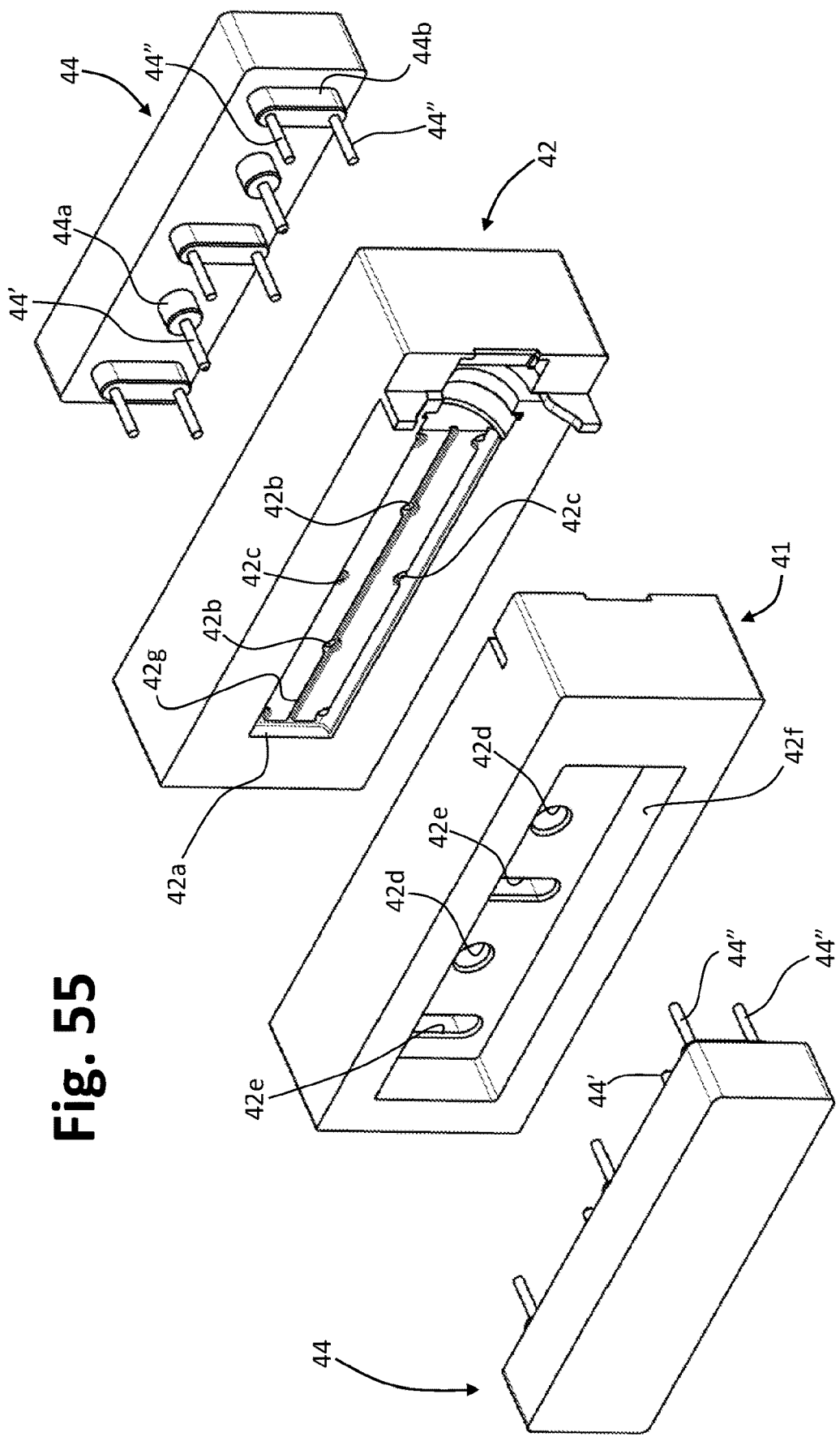
FIG. 55 is a schematic representation of moulding equipment that can be used for producing the device of FIG. 54.

In various embodiments, at least one mould part 41, 42 is prearranged in such a way that the corresponding impression 42a has a longitudinal channel—for example of the same type as the one designated by 42g in FIG. 55—that, in the condition where the mould is closed, extends in a region corresponding to through openings 70, 71 of the substrate 20 that are aligned longitudinally. The aforesaid channel facilitates flow of the overmoulding material in the mould and filling of the aforesaid openings. Moreover, advantageously, it is possible to define a thickened part of the material M, which provides a sort of longitudinal ribbing of the body portion 15. Such a ribbing, which is useful for strengthening further the sensing portion 15 of the body of the device, is designated by 15b in FIG. 54. Obviously, such a ribbing may be defined also at the opposite side of the body portion 15, not visible in FIG. 54, and/or in a different position.

Obviously, the electrodes, the chamfers, and the recesses could have shapes different from what is exemplified in the figures, provided that the concepts set forth above are preserved. It is likewise evident that the characteristics described with reference to FIGS. 52-54 may be applied to all the embodiments, also the ones described previously with reference to FIGS. 1-51.

FIG. 53 illustrates schematically a semi-finished product obtained by providing a circuit substrate 20 according to FIG. 52 with a corresponding portion of the casing body, in particular with the connection portion 14, here obtained in a way substantially similar to what has been described with reference to FIGS. 25-30, i.e., including a body part 21 with associated shells 45, 46, overmoulded on which is a protection 52 made of polymer or resin. Next, overmoulded on the semi-finished product of FIG. 53 is the material M necessary to obtain the sensing portion 15 and the mounting portion 16, as may be seen in FIG. 54, where the annular sealing element 19 is also mounted.

FIG. 54 also illustrates how, in various possible embodiments, the mounting portion 16 of the body of the device 10 may be without a radially projecting flange, for example for a snap-action mounting, or mounting with a sealant or via welding, of the sensor device at the corresponding opening 6 of the tank. Obviously, also in the case of FIG. 54, the portion 16 may be obtained with a corresponding flange.

Figure 56:
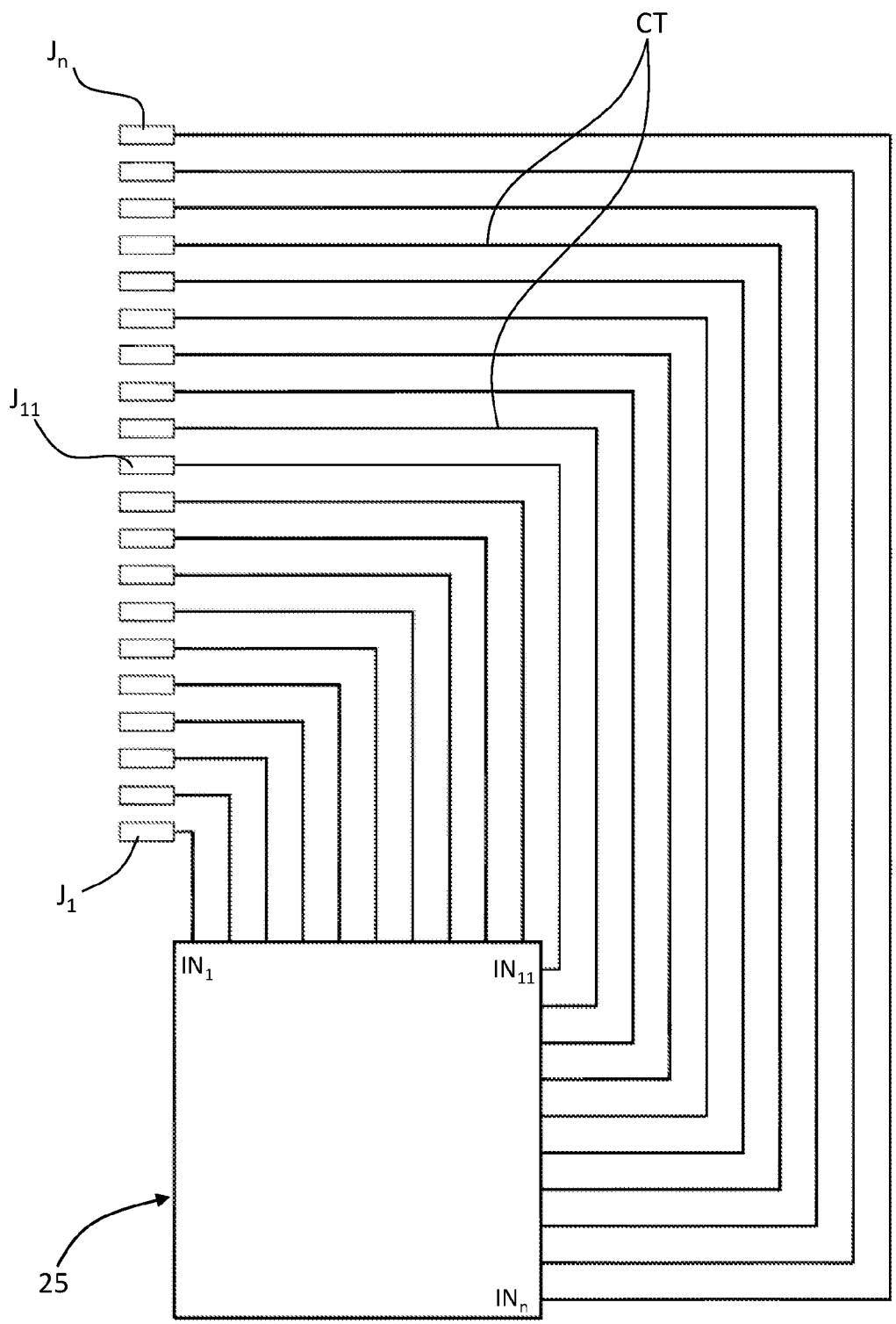
FIG. 56 is a partial and schematic representation aimed at illustrating a possible configuration of connection of electrodes of a level-sensor device according to possible embodiments of the invention.

As mentioned previously, in various embodiments, the electrodes provided on the sensing region 23 of the substrate 20 are connected to respective inputs of the controller 25. FIG. 56 is a schematic illustration of a controller 25—for example a microcontroller—, which, merely by way of example, includes "n" signal inputs IN (here twenty in number), connected to which, via corresponding conductive paths CT of the type mentioned previously, are as many electrodes J in single configuration, i.e., not connected in common or in parallel to other electrodes.

In various embodiments, detection of the value of capacitance or of electrical field at each of the inputs IN is made in an indirect way, for example on the basis of the measurement of a voltage or else by converting a capacitance at input into an equivalent resistance and then converting the current measured via the equivalent resistance into a digital count. In these cases, preferably, the inputs IN of the controller 24 are analog inputs, and the controller implements or has associated to it an analog-to-digital converter. The aforesaid values are digitized within the controller 24, to assume the form of a pure number, or raw datum, following upon the quantization process; the values detected (and/or equivalent values and/or processed values) may be stored in memory circuits of the controller 25 and/or of the control circuit arrangement of the device.

In various embodiments, associated to each input IN is a sampling or measurement circuit including a controllable switch and a capacitor, here also defined as sampling switch and sampling capacitor. The controllable switch can be switched between a first position, in which the sampling capacitor is connected to a voltage source, and a second position, in which the capacitor itself is connected to a respective electrode J (or to a number of electrodes J connected in common). Preferably, the aforesaid voltage is a d.c. voltage, for example a supply voltage of the circuit arrangement provided on the substrate 20. Preferably, the controller 25 comprises or has associated to it means for electrically disconnecting, or else connecting to ground, one or more of the inputs IN (i.e., the corresponding electrodes J) different from the one each time considered for the purposes of measurement, as well as means for causing switching of the controllable switch from the first position to the second position so as to discharge the sampling capacitor in a way proportional to the value of capacitance associated to the corresponding electrode J (or set of electrodes J connected in common). In an implementation, there may be envisaged connection to ground of all the inputs IN (or electrodes J) different from the one each time considered for the purposes of measurement. In a possible variant embodiment, instead of a connection to ground, the input or inputs IN (i.e., the corresponding electrodes J) different from the one considered for the purposes of measurement may be disconnected or else connected to a different pre-defined voltage, i.e., a different reference voltage, preferably a potential or voltage different from the voltage on the input IN or electrode J each time considered for the purposes of measurement of capacitance (for example, a voltage intermediate between the positive supply voltage and ground or else a negative voltage or potential).

Moreover the controller 25 has means for determining the voltage at the input IN when the controllable switch is in its second position, this voltage representing the capacitance associated to the electrode J (or to the set of electrodes J connected in common). The controller 25 has then control means or comparators, for comparing the voltage determined present at the input IN with at least a corresponding reference value or threshold, and thereby deducing whether the liquid is facing or not the electrode J (or else at least one of the electrodes of the set of electrodes J connected in common). In various embodiments, the scan or sampling of the inputs IN is performed using a sample-and-hold circuit associated to an analog-to-digital converter, and the measurement of capacitance of each electrode J (or set of electrodes J) is made as comparison of measurement with respect to the intrinsic capacitance of the aforesaid circuit.

Figure 57:
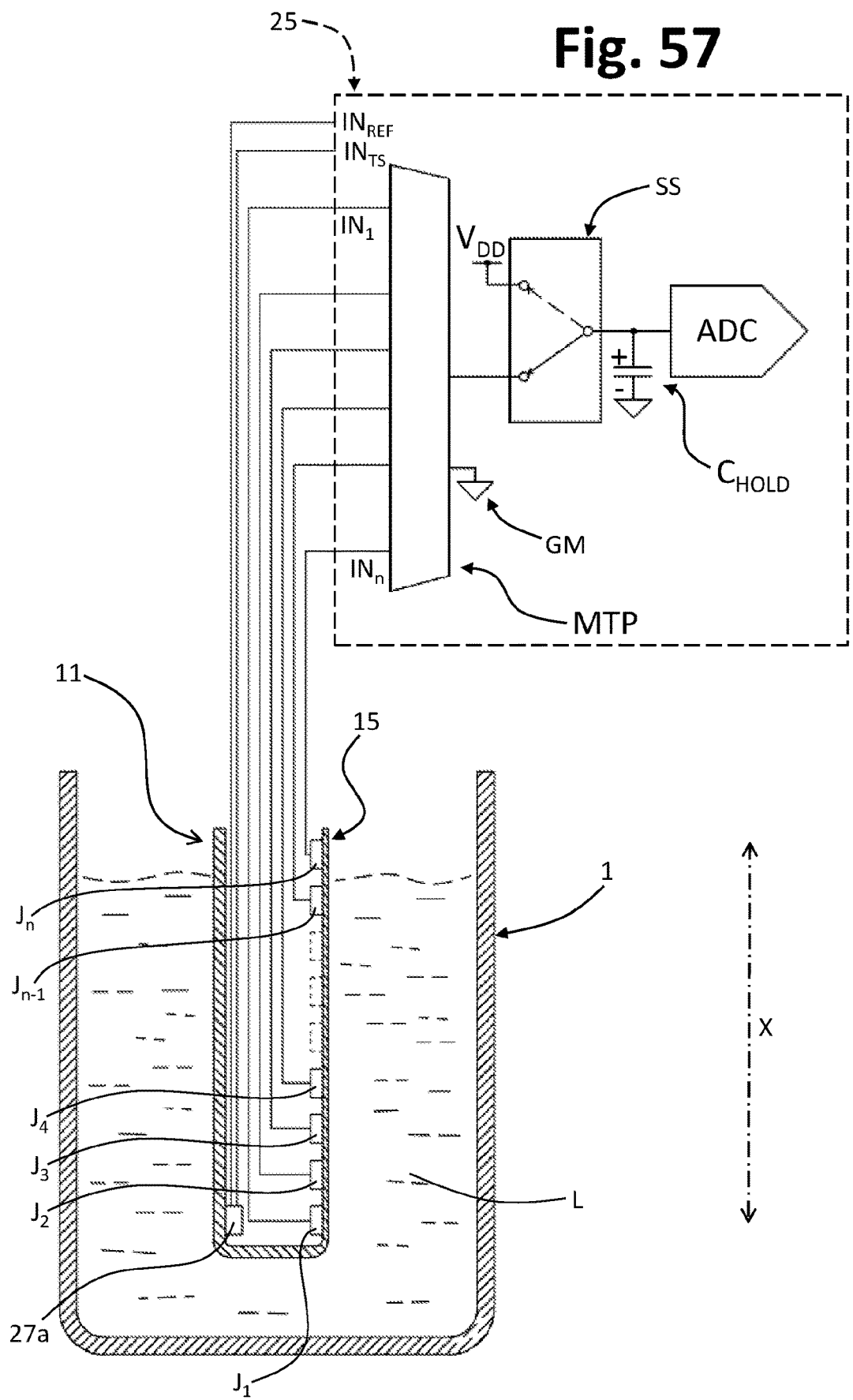
FIG. 57 is a partial and schematic representation aimed at exemplifying a possible circuit configuration of a level-sensor device according to FIG. 56.

A schematic example of operation of a sensor device according to the configuration of FIG. 56 i.e., with single electrodes connected to respective inputs IN of the controller 25 is illustrated schematically in FIG. 57. It should be noted that represented in this figure, merely for requirements of greater clarity, is a level-sensor device mounted from above, i.e., with a configuration reversed with respect to that of FIG. 1. The corresponding electrodes J, however, are illustrated in the same order as in FIG. 56, and hence with the electrode $J_1$ set lowest and the electrode $J_n$ set highest. Also in the configuration of FIG. 57 at least one temperature sensor is provided, here the temperature sensor 27a set in a position corresponding to the electrode $J_1$ set lowest, connected to at least one corresponding input $IN_{TS}$ of the controller 24; in the example, the sensor 27a is also connected to a suitable reference input or node $IN_{REF}$.

Visible in FIG. 57 is the tank 1, with the sensing part 11 of the sensor inside and with the electrodes $J_1$-$J_n$ contained in the corresponding sensing portion 15 that is at least partially immersed in the liquid, designated by L (the substrate 20 is not represented here for reasons of clarity). In the example illustrated, the analog inputs IN of the controller 25 are connected to multiplexer means, here represented by a multiplexer MTP preferably implemented in the controller itself, which substantially operates as an electronic selector switch, associated to which is a sample-and-hold circuit, which, for example, comprises a holding capacitor $C_{HOLD}$ and a sampling switch SS. The switch SS can be switched between a first position, for connection to the voltage $V_{DD}$ (for example, the supply voltage of the controller 25) and a second position, for connection to an output of the multiplexer MTP, i.e., a position of connection to the electrodes J.

As has been said, the circuit arrangement or its controller 25 may comprise electronic means or switches for disconnecting or connecting to ground or to a different potential one or more inputs IN, i.e., the corresponding electrodes J, different from the one each time connected to the sample-and-hold circuit. In the case of FIG. 57, for example, the multiplexer MTP is built so as to switch each time each input IN to the sample-and-hold circuit and one or more of the other inputs IN (possibly all) to ground, as represented schematically by the ground symbol GM in FIG. 57. As mentioned, instead of a connection to ground, there may be envisaged opening of the connection or a connection to a different pre-defined voltage (in this perspective, the symbol GM may be understood also as representing an open connection or a connection to the aforesaid pre-defined voltage).

Via the multiplexer MTP, the inputs IN, and hence the electrodes J, are sequentially connected to the switch SS. As has been said, when each of the inputs IN is connected by the multiplexer MTP to the switch SS, the multiplexer also disconnects or connects to ground or to a different pre-defined voltage one or more of the other inputs IN, preferably at least the inputs IN corresponding to the electrodes J set adjacent to or in the proximity of the electrode J each time connected to the sample-and-hold circuit. The switch SS is switched cyclically, in a way synchronised with operation of the multiplexer MTP, between the first position, for charging of the capacitor $C_{HOLD}$, and the second position, for connection of the capacitor itself to the input IN currently selected by the multiplexer MTP, and hence to the corresponding electrode J. With the switch SS in its second position, a charge balance is substantially obtained between the capacitance of the capacitor $C_{HOLD}$ and the capacitance associated to the electrode J considered, which here is assumed as being the electrode $J_1$. In other words, with this charge balance, the capacitor $C_{HOLD}$ is discharged in a way proportional to the capacitance of the capacitor defined by the electrode $J_1$ and by the electrode $J_2$ that is adjacent to the electrode $J_1$ and is connected to ground or to the aforesaid different pre-defined voltage (it should be considered that, for the purposes of the aforesaid detection or discharge, also other adjacent electrodes J could contribute, such as the electrode $J_3$ shown, if it is connected to ground or to a different pre-defined potential, but in a negligible way and hence not considered herein, for the purposes of a simpler and clearer explanation of operation of the system). Via the ADC the amount of charge, i.e., a residual voltage of the capacitor $C_{HOLD}$, is hence determined. A datum (raw datum) representing the above charge is then compared with a pre-defined reference value or threshold, in order to deduce whether the electrode $J_1$ considered is facing or not the liquid L. By way of example of a configuration with connection to ground, when at least one pair of electrodes J is facing the liquid L, i.e., when the sensing electrode J and at least one electrode J connected to ground or to a different voltage are facing the liquid (for example, the electrodes $J_1$ and $J_2$ of FIG. 57) associated thereto is a first value of capacitance, whereas otherwise (as in the case of the electrodes J and $J_{n-1}$ of FIG. 57) associated thereto is a second value of capacitance, different from the first value.

Following upon the aforesaid balance between the charges of the capacitor $C_{HOLD}$ and of the electrode $J_1$, the raw datum representing of the value of voltage across the capacitor and/or at the input $IN_1$ may substantially coincide with or else be greater or smaller than a given reference threshold, previously stored in the controller 25. For example, in an embodiment, the controller 25 may be programmed in such a way that detection at an input IN of a voltage or raw datum equal to the pre-defined threshold or higher than the latter indicates the fact that the electrode considered is facing the liquid L (as in the case of the electrode $J_1$), whereas detection at the input IN of a voltage or raw datum below the threshold indicates the fact that the electrode is not facing the liquid (as in the case of the electrode $J_n$).

As may be appreciated, by making the sequential sampling described, the controller 25 is able to identify the two electrodes J corresponding to the liquid-to-air transition in the tank 1 (here the electrodes $J_{n-1}$ and $J_n$): once the presence of the liquid-to-air transition has been detected, the controller 25 can infer the level of the liquid on the basis of the fact that the electrode of the two electrodes J associated to which is the value of voltage lower than the threshold is the first electrode in air (or conversely, the electrode associated to which is the voltage value equal to or higher than the threshold is the last electrode facing the fluid). For this purpose, preferably stored or pre-defined in the memory means and/or in the program or software that equips the controller 25 is information representing values in length (height) corresponding to the position of each electrode J, or in any case the distance between the electrodes J in the direction of the sensing axis X, so as to be able to establish or calculate the level according to the pre-defined unit of measurement. The electronics of the sensor device transmits or generates signals to the outside world, in particular via its electrical connector, which represent the level information and possibly information regarding the state of each electrode (such as a state in air or in liquid) and/or the values detected by each electrode and/or values associated thereto.

It will be appreciated that the operation described with reference to FIG. 57 can be obtained also with control circuits and methodologies different from the ones exemplified above, of a conception that is clear to the person skilled in the branch (for example, according to the teachings of any one of WO2015/181770, WO2016/042456, and WO2016/042459 filed in the name of the present applicant).

Figure 58:
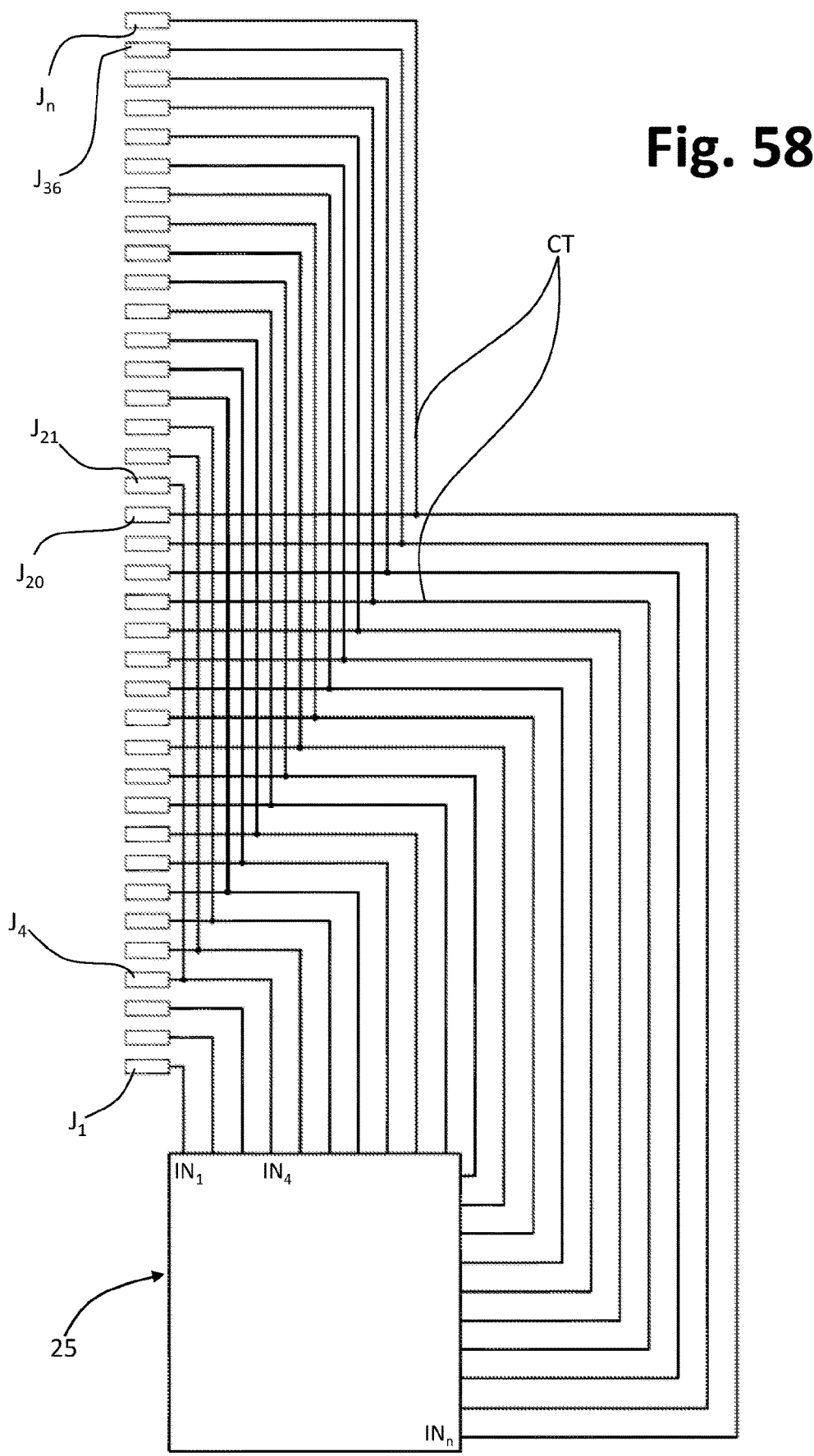
FIG. 58 is a schematic representation aimed at illustrating a further possible configuration of connection of electrodes of level-sensor devices according to possible embodiments of the invention.

In possible variant embodiments, the sensing electrodes J comprise first sensing electrodes, connected to respective inputs IN of the controller 25, and second sensing electrodes that are electrically connected in common or in parallel to the first sensing electrodes. An example of this type is illustrated schematically in FIG. 58, where the aforesaid first electrodes range from the electrode $J_4$ to the electrode $J_{20}$, whereas the second electrodes range from the electrode $J_{21}$ to the electrode $J_n$; in this example, the electrodes $J_1$-$J_3$ may be reference electrodes. In the configuration of FIG. 58, it is basically possible to identify a first sub-series of first electrodes, which range from the electrode $J_4$ to the electrode $J_{20}$, and a second sub-series of second electrodes, which range from the electrode $J_{21}$ to the electrode $J_n$, substantially connected to one another in parallel. The number of sub-series of electrodes may obviously be different.

In an embodiment of this type, the aforesaid control means or comparators implemented in the controller 25 are prearranged for comparing the voltage determined at the input IN corresponding to two electrodes connected in common (for example, the electrodes $J_4$ and $J_{21}$ in parallel) with at least two corresponding reference thresholds in order to deduce whether the liquid is facing or not the first sensing electrode (the electrode $J_4$) and/or the corresponding second sensing electrode (the electrode $J_{21}$). The measurement may be made substantially according to the modalities described previously. In various embodiments, the value obtained from the measurement is compared with a number of thresholds equal to the number of electrodes connected in common increased by 1. With reference to the example here considered of two electrodes J in parallel, then, the value assumed may be compared with three pre-defined distinct thresholds: a value equal to a first threshold or within a given neighbourhood thereof (for example, +/−40%) indicates that neither of the electrodes is facing the liquid; a value equal to a second threshold or within a given neighbourhood thereof (for example, +/−40%) indicates that one of the electrodes (which is known on the basis of its physical position) is facing the liquid and the other electrode is not; finally, a value equal to a third threshold or within a given neighbourhood thereof (for example, +/−40%) indicates that both of the electrodes are facing the fluid.

It should again be emphasised that the calculations and/or processing regarding operation of the device according to the invention may be totally or in part made or implemented outside the device itself, i.e., not necessarily using a control circuit 25, 26 and/or a controller 25 directly on the substrate 20. The control circuit arrangement could in fact be implemented totally or in part (obviously, except for the electrodes J) in an external electronic circuit, such as an electronic control unit on board a vehicle. Such an external circuit could hence be prearranged—i.e., comprise means—for receiving signals or data that can be obtained via the sensing part 11 of the device 10, and for processing the signals in order to implement at least part of the level-sensing functions or methodologies. In implementations of this type, then, the device according to the invention may comprise parts in remote positions, such as a sensing part, substantially corresponding to the part previously designated by 11, and a processing and/or control part, for example integrated in an electronic control unit or in a circuit, which is set in a remote position with respect to the container associated to which is the sensing part, and is prearranged for receiving therefrom the necessary signals or data.

In various embodiments, the electronic control of the sensor device 10 is prearranged for transmission and/or reception of data, preferably in a serial format, very preferably via a serial interface or protocol, such as a SENT (Single-Edge Nibble Transmission) protocol or CAN (Controller Area Network) protocol. Preferably, transmission and/or reception of data is performed via the connection portion 14, in particular via the electrical terminals 17.

The data or values transmitted may represent level information obtained following upon detection carried out via the electrodes J (such as values of capacitance and/or impedance and/or electrical field and/or equivalent or calculated raw data), and possible further information, such as a value of temperature (for example, the temperature of the liquid in the tank) and/or information regarding possible fault conditions. The data or values transmitted and/or received may also regard at least some of the electrodes J, such as calibration and/or threshold and/or reference values. The controller 25 of the device 10 may store data or information transmitted and/or received and/or the results of processing operations.

From the foregoing description the characteristics of the present invention emerge clearly, as likewise do its advantages, principally represented by the simplicity of construction of the level-sensor device proposed, by its contained cost, and by its precision and reliability.

It is clear that numerous variations may be made by the person skilled in the branch to the devices and methods described by way of example, without thereby departing from the scope of the invention, as defined by the annexed claims.

In possible embodiments not represented, the control region of the substrate 20 could be shorter than the one designated by 24 in the annexed drawings, and/or be without a widened part at its proximal end region. In these embodiments, the portion of the casing body of the device that encloses such a "shorter" control region may be configured for performing substantially the functions of the body portions 14 and 16 described previously (for example, such a control region could substantially correspond to the part designated by 30' in various figures). In these cases, however, the control region will be sufficiently long to enable provision, in the part of the casing body that encloses it, of the elements necessary for sealed mounting—including a possible mounting by welding—at the opening 6 of the container 1. Moreover, a restricted substrate portion 30 could extend axially throughout the length of the control region of the substrate 20, or else a plurality of restricted portions 30 (as in the case of FIG. 52) could involve the control region throughout its length.

The invention has been described with particular reference to detection of level of a liquid medium, in particular a urea-based additive, but, as already mentioned, the sensor described may be used in combination with different substances and materials, even ones potentially subject to solidification by freezing.

In some applications, there may be required a level measurement with different sensing areas, each having a different measurement resolution, which are located in different positions of the sensing part 11 of the sensor device 10: this requirement leads, for example, to positioning of electrodes with different geometry—in terms of shape and size—along the sensing region 23 of the substrate, to guarantee the resolution or tolerance of measurement required in that given area. This choice is in some cases constrained by the requirement of minimizing the cost of the controller 25, which is also linked to the number of its inputs and hence of electrodes that it is able to manage: for this reason, in some applications, it may prove convenient to increase the size of the electrodes in the areas where a maximum sensing resolution is not necessary (typically at the two extremes). In this perspective, according to possible variant embodiments, the array of capacitive elements provided on a major face, or on each major face of the substrate 20, at its sensing region 23, may comprise a number of series of electrodes, diversified from one another in terms of shapes and/or size.

The invention claimed is:

1. A capacitive level-sensor device for detecting the level of a medium contained in a container, the device comprising:
a circuit substrate made of electrically insulating material, which extends longitudinally according to a level-sensing axis, the circuit substrate having a first major face and a second major face opposite to one another, which define therebetween a substrate thickness, and two opposite longitudinal edges, which define therebetween a substrate width, the circuit substrate having a first longitudinal end and a second longitudinal end;

a first array of electrodes or capacitive elements on a sensing region of the circuit substrate that includes said first longitudinal end, the first array of electrodes or capacitive elements comprising at least one first series of first electrodes coplanar to one another at the first major face of the circuit substrate, the first electrodes being spaced apart from one another along the level-sensing axis;

a circuit, which comprises circuit components associated to a second region of the circuit substrate that is axially comprised between said second longitudinal end and the first series of electrodes;

a casing body, which comprises at least:
 a sensing portion, which is electrically insulating and fluid-tight and covers at least the sensing region of the circuit substrate; and
 a mounting portion, which covers at least partially the second region of the circuit substrate and is configured for fluid-tight fixing at an opening of the container, wherein the sensing portion and at least part of the mounting portion comprise at least one material overmoulded on at least part of the circuit substrate, wherein the second region of the circuit substrate includes at least one restricted substrate portion, having a substrate width smaller than the substrate width of the sensing region, wherein at least part of the at least one restricted substrate portion extends axially in the mounting portion, and wherein the at least one overmoulded material of the mounting portion defines a seat for an annular seal element, the seat being in a position corresponding to the at least one restricted substrate portion of the second region of the circuit substrate.

2. The sensor device according to claim 1, wherein:
the first electrodes have two opposite side edges and two opposite transverse edges, the two opposite side edges defining therebetween a maximum electrode width and the two opposite transverse edges defining therebetween an electrode height, and
a difference between the maximum electrode width of the first electrodes and the substrate width of the sensing region is less than a distance between two facing transverse edges of two first electrodes that are adjacent to one another in the direction of the level-sensing axis.

3. The sensor device according to claim 2, wherein the first electrodes extend substantially throughout the substrate width and/or have an electrode width that is equal to or greater than a width of the at least one restricted substrate portion.

4. The sensor device according to claim 1, comprising a second array of electrodes or capacitive elements on the sensing region of the circuit substrate, the second array of capacitive elements comprising at least one second series of second electrodes coplanar to one another at the second major face of the circuit substrate, the second electrodes being spaced apart from one another along the level-sensing axis.

5. The sensor device according to claim 4, wherein:
at least one first electrode, or each first electrode, is connected to at least one corresponding second electrode by means of an electrical-connection part, which extends at least partially through the circuit substrate or else extends at least partially over one said longitudinal edge of the circuit substrate; or
the second electrodes on the second major face of the circuit substrate are in positions staggered with respect to the first electrodes on the first major face of the circuit substrate, having as reference the level-sensing axis.

6. The sensor device according to claim 1, wherein at least part of the circuit components are set in an area of the second region of the circuit substrate that is at least partially surrounded or protected by a protective element, and wherein the mounting portion is at least partially overmoulded on the protective element.

7. The sensor device according to claim 1, wherein:
the casing body has an electrical-connection portion, for electrical connection of the device to an external system, the mounting portion extending axially between the electrical-connection portion and the sensing portion; and
the electrical-connection portion includes at least one of the following:
 a first body part and a second body part coupled together with interposition of at least one portion of the second region of the circuit substrate that includes said second longitudinal end and/or at least one part of the at least one overmoulded material of the mounting portion;
 a first body part and a second body part, set between which is at least one portion of the second region of the circuit substrate that includes said second longitudinal end, at least part of the at least one material of the mounting portion being overmoulded on at least one of said first body part and said second body part;
 a part of the at least one material overmoulded on the second region of the circuit substrate.

8. The sensor device according to claim 7, wherein:
the first body part defines a connector body having associated terminals electrically connected to circuit components arranged on the second region of the circuit substrate; and/or
the second body part comprises a second material overmoulded on the first body part and on at least one area of the second region of the circuit substrate that extends in the first body part.

9. The sensor device according to claim 1, wherein:
the at least one overmoulded material encloses the circuit substrate substantially completely, and/or
at least one portion of the circuit substrate has a coating that comprises at least one thin protective layer, the coating being covered at least partially with the at least one overmoulded material.

10. The sensor device according to claim 9, wherein:
associated to the circuit substrate are terminals electrically connected to circuit components arranged in the second region of the circuit substrate; and
the terminals are partially embedded in a part of the at least one overmoulded material.

11. The sensor device according to claim 1, wherein the at least one overmoulded material encloses the second region of the circuit substrate, leaving exposed at least one area of at least one of the first and second major faces of the circuit substrate at said second region, there being associated to the exposed area a corresponding covering element.

12. The sensor device according to claim 1, including at least one of the following:
one said casing body made at least partially of the at least one material overmoulded on the circuit substrate so as to define in a single piece the sensing portion and at least part of a mounting portion, configured for fluid-tight fixing at an opening of the container;
one said casing body made at least partially of the at least one material overmoulded on the circuit substrate so as to define at least partially an electrical-connection portion for electrical connection of the sensor device and/or at least part of a mounting portion;
one said first series of first electrodes provided with a chamfer or a recess at at least one side end;
one said first series of first electrodes provided with at least one recess or restricted portion at least in an intermediate area of a respective transverse edge;
one said circuit substrate having a plurality of through openings at least in its sensing region, where said through openings are occupied by respective parts of the overmoulded material;
one said first series of first electrodes shaped so as to define respective recesses or restricted portions at through openings provided in the sensing region of the circuit substrate;
an overmoulding material selected from among a high-density polyethylene, a polybutene, a polypropylene, or else among a polyphthalamide, a polyamide, a polyphenylene sulphide;
one said first series of first electrodes having an electrode width that is equal to or greater than the width of the at least one restricted substrate portion.

13. The sensor device according to claim 1, including at least one of the following:
one or more covering or protection elements configured as distinct moulded components, associated to the circuit substrate and at least partially coated with an overmoulded material;
a proximal end area of the circuit substrate enclosed and protected between at least one body part configured as distinct moulded component and at least part of a covering made of a material overmoulded on the circuit substrate;
at least one portion of the circuit substrate surrounded by a tubular body, an overmoulded material being present within the tubular body;
at least one portion of the casing body that comprises a number of layers of material, of which at least one layer is overmoulded at least partially on the circuit substrate;
at least one portion of the circuit substrate having a coating that comprises at least three layers of material;
a casing body comprising at least two overmoulded materials different from one another;
a casing body comprising a first material for coating at least one part of the circuit substrate that is softer than a second material for coating another part of the circuit substrate.

14. The sensor device according to claim 1, wherein the circuit components include at least one of electrical-connection elements, electrical terminals, and a control unit having a plurality of first inputs electrically connected to which are the first electrodes.

15. A capacitive level-sensor device for detecting the level of a medium contained in a container, the device comprising:
a circuit substrate made of electrically insulating material, which extends longitudinally according to a level-sensing axis, the circuit substrate having a first major face and a second major face opposite to one another, which define therebetween a substrate thickness, and two opposite longitudinal edges, which define therebetween a substrate width, the circuit substrate having a first longitudinal end and a second longitudinal end;
a first array of electrodes or capacitive elements on a sensing region of the circuit substrate that includes said first longitudinal end, the first array of electrodes or capacitive elements comprising at least one first series of first electrodes coplanar to one another at the first major face of the circuit substrate, the first electrodes being spaced apart from one another along the level-sensing axis;
a circuit, which comprises circuit components associated to a second region of the circuit substrate that is axially comprised between said second longitudinal end and the first series of electrodes;
a casing body, which comprises at least:
a sensing portion, which is electrically insulating and fluid-tight and covers at least the sensing region of the circuit substrate; and
a mounting portion, which covers at least partially the second region of the circuit substrate and is configured for fluid-tight fixing at an opening of the container,
wherein the sensing portion and at least part of the mounting portion comprise at least one material overmoulded on at least part of the circuit substrate,
wherein the second region of the circuit substrate includes at least one restricted substrate portion, having a substrate width smaller than the substrate width of the sensing region,
wherein at least part of the at least one restricted substrate portion extends axially in the mounting portion,
and wherein the casing body integrates an annular element, which surrounds a part of said at least one restricted portion of the second region of the circuit substrate and a corresponding part of the at least one material overmoulded on the circuit substrate belonging to the mounting portion.

16. A capacitive level-sensor device, for detecting the level of a medium contained in a container, the device comprising:
a circuit substrate made of electrically insulating material that extends longitudinally according to a level-sensing axis, the circuit substrate having a first major face and a second major face opposite to one another, which define therebetween a substrate thickness, and two opposite longitudinal edges, which define therebetween a substrate width, the circuit substrate having a first longitudinal end and a second longitudinal end;
a first array of electrodes or capacitive elements on a sensing region of the circuit substrate that includes said first longitudinal end, the first array of electrodes or capacitive elements comprising at least one first series of first electrodes coplanar to one another at a first major face of the circuit substrate, the first electrodes being spaced apart from one another along the level-sensing axis;
a circuit, which comprises circuit components associated to a second region of the circuit substrate that is axially comprised between said second longitudinal end and the first series of electrodes;
a casing body, which comprises at least:
a sensing portion, which is electrically insulating and fluid-tight and covers at least the sensing region of the circuit substrate; and a mounting portion, which covers at least partially the second region of the circuit substrate and is configured for fluid-tight fixing at an opening of the container, wherein the sensing portion and at least part of the mounting portion comprise at least one material overmoulded on at least part of the circuit substrate, wherein the second region of the circuit substrate includes at least one restricted substrate portion, having a substrate width smaller than the substrate width of the sensing region, wherein at least part of the at least one restricted substrate portion extends axially in the mounting portion, and wherein:
- the first electrodes have two opposite side edges and two opposite transverse edges, the two opposite side edges defining therebetween a maximum electrode width and the two opposite transverse edges defining therebetween an electrode height, and
- a difference between the maximum electrode width of the first electrodes and the substrate width of the sensing region is less than a distance between two facing transverse edges of two first electrodes that are adjacent to one another in the direction of the level-sensing axis.

17. The device according to claim 16, including at least one of the following:
- a second array of electrodes or capacitive elements in the sensing region of the circuit substrate, the second array of electrodes or capacitive elements comprising at least one second series of second electrodes coplanar to one another at a second major face of the circuit substrate, the second electrodes being spaced apart from one another along the level-sensing axis;
- one said circuit substrate made of electrically insulating material that includes at least one restricted substrate portion;
- one said casing body made of the at least one material overmoulded on the circuit substrate, which coats the circuit substrate substantially completely;
- one said casing body made at least partially of the at least one material overmoulded on the circuit substrate so as to define in a single piece a sensing portion and at least part of a mounting portion, configured for fluid-tight fixing at an opening of the container;
- one said casing body made at least partially of the at least one material overmoulded on the circuit substrate so as to define at least partially also an electrical-connection portion for electrical connection of the sensor device;
- one said first series of first electrodes provided with a chamfer at least at two opposite lateral ends;
- one said first series of first electrodes provided with at least one recess or restricted portion at least in an intermediate area of a respective transverse edge;
- one said circuit substrate having a plurality of through openings, at least in its sensing region, where said through openings are occupied by respective parts of the overmoulded material;
- one said first series of first electrodes shaped so as to define respective recesses or restricted portions at through openings provided in the sensing region of the circuit substrate;
- an overmoulding material selected from among a high-density polyethylene, a polybutene, a polypropylene, or else from among a polyphthalamide, a polyamide, a polyphenylene sulphide;
- a shaped metal ring, which surrounds a respective part of the at least one overmoulded material of the mounting portion;
- one or more covering or protection elements configured as distinct moulded components, associated to the circuit substrate and at least partially coated with an overmoulded material;
- a proximal end area of the circuit substrate enclosed and protected between at least one body part configured as distinct moulded component and at least part of a covering made of a material overmoulded on the circuit substrate;
- at least one portion of the circuit substrate surrounded by a tubular body, an overmoulded material being present within the tubular body;
- at least one portion of the casing body which comprises a number of layers of material, of which at least one layer is overmoulded at least partially on the circuit substrate;
- at least one portion of the circuit substrate having a coating that comprises at least three layers of material;
- a casing body comprising at least two overmoulded materials different from one another;
- a casing body comprising a first material for coating at least one part of the circuit substrate that is softer than a second material for coating another part of the circuit substrate;
- a circuit substrate having a coating that comprises a thin protective layer.

18. The sensor device according to claim 16, wherein the first electrodes extend substantially throughout the substrate width and/or have an electrode width that is equal to or greater than a width of the at least one restricted substrate portion.

* * * * *